US009353946B2

(12) United States Patent
Hamrin et al.

(10) Patent No.: US 9,353,946 B2
(45) Date of Patent: May 31, 2016

(54) GRADUAL OXIDATION WITH HEAT TRANSFER

(75) Inventors: Douglas Hamrin, Laguna Niguel, CA (US); Richard Martin, Manhattan Beach, CA (US); Jeffrey Armstrong, Exeter, NH (US)

(73) Assignee: ENER-CORE POWER, INC., Irvine, CA (US)

( * ) Notice: Subject to any disclaimer, the term of this patent is extended or adjusted under 35 U.S.C. 154(b) by 977 days.

(21) Appl. No.: 13/417,140

(22) Filed: Mar. 9, 2012

(65) Prior Publication Data
US 2013/0232985 A1 Sep. 12, 2013

(51) Int. Cl.
| F23N 5/00 | (2006.01) |
| F23R 3/00 | (2006.01) |
| F02C 9/40 | (2006.01) |
| F23G 7/06 | (2006.01) |

(52) U.S. Cl.
CPC ... *F23N 5/00* (2013.01); *F02C 9/40* (2013.01); *F23G 7/066* (2013.01); *F23R 3/005* (2013.01); *F23C 2202/10* (2013.01); *F23C 2203/10* (2013.01); *F23C 2203/20* (2013.01); *F23G 2206/202* (2013.01); *F23R 2900/00002* (2013.01); *Y02E 20/366* (2013.01); *Y02T 50/677* (2013.01)

(58) Field of Classification Search
CPC .............. F02C 6/003; F02C 6/18; F02C 3/22; F02C 3/205; F23R 3/40; F23R 3/005; F23C 13/00; F23C 6/047; F23C 99/006; F05D 2270/303

USPC .................. 60/774, 722, 723, 733, 777, 39.5, 60/39.281, 791, 39.182; 422/168, 173; 431/268, 2, 5, 7

See application file for complete search history.

(56) References Cited

U.S. PATENT DOCUMENTS

| 2,303,381 A | 12/1942 | New |
| 2,433,932 A | 1/1948 | Stosick |

(Continued)

FOREIGN PATENT DOCUMENTS

| CH | 319366 A | 2/1957 |
| GB | 2080934 A | 2/1982 |

(Continued)

OTHER PUBLICATIONS

Wünning, "Flameless Combustion and its Applications," <http://www.bine.info/fileadmin/content/Publikationen/Projekt-Infos/Zusatzinfos/2006-07_Flameless_Combustion.pdf>, Jul. 2007.

(Continued)

*Primary Examiner* — Steven Sutherland
(74) *Attorney, Agent, or Firm* — McDermott Will & Emery LLP

(57) ABSTRACT

Described herein are embodiments of systems and methods for oxidizing gases. In some embodiments, a reaction chamber is configured to receive a fuel gas and maintain the gas at a temperature within the reaction chamber that is above an autoignition temperature of the gas. The reaction chamber may also be configured to maintain a reaction temperature within the reaction chamber below a flameout temperature. In some embodiments, heat and product gases from the oxidation process can be used, for example, to drive a turbine, reciprocating engine, and injected back into the reaction chamber.

19 Claims, 37 Drawing Sheets

(56) References Cited

U.S. PATENT DOCUMENTS

| | | |
|---|---|---|
| 2,443,841 A | 6/1948 | Sweeney |
| 2,624,172 A | 1/1953 | Houdry |
| 2,630,678 A | 3/1953 | Pratt |
| 2,655,786 A | 10/1953 | Carr |
| 2,793,497 A | 5/1957 | Hellmuth |
| 2,795,054 A | 6/1957 | Bowen, III |
| 3,313,103 A | 4/1967 | Johnson |
| 3,661,497 A | 5/1972 | Castellucci et al. |
| 3,731,485 A | 5/1973 | Rudolph et al. |
| 3,732,911 A | 5/1973 | Lowe et al. |
| 3,769,922 A | 11/1973 | Furlong et al. |
| 3,790,350 A | 2/1974 | Haensel |
| 3,797,231 A | 3/1974 | McLean |
| 3,810,732 A | 5/1974 | Koch |
| 3,846,979 A | 11/1974 | Pfefferle |
| 3,928,961 A | 12/1975 | Pfefferle |
| 3,942,264 A | 3/1976 | Zenkner |
| 3,943,705 A | 3/1976 | DeCorso et al. |
| 3,975,900 A | 8/1976 | Pfefferle |
| 4,052,143 A | 10/1977 | Sandviknes |
| 4,111,644 A | 9/1978 | Buckholdt |
| 4,116,005 A | 9/1978 | Willyoung |
| 4,125,359 A | 11/1978 | Lempa |
| 4,163,366 A | 8/1979 | Kent |
| 4,168,950 A | 9/1979 | Seemann et al. |
| 4,187,672 A | 2/1980 | Rasor |
| 4,192,642 A | 3/1980 | Lempa |
| 4,202,168 A | 5/1980 | Acheson et al. |
| 4,202,169 A | 5/1980 | Acheson et al. |
| 4,209,303 A | 6/1980 | Ricks |
| 4,221,558 A | 9/1980 | Santisi |
| 4,239,481 A | 12/1980 | Morck, Jr. |
| 4,252,070 A | 2/1981 | Benedick |
| 4,289,475 A | 9/1981 | Wall et al. |
| 4,321,790 A | 3/1982 | Vadas et al. |
| 4,361,478 A | 11/1982 | Gengler et al. |
| 4,379,689 A | 4/1983 | Morck, Jr. |
| 4,400,356 A | 8/1983 | McVay et al. |
| 4,403,941 A | 9/1983 | Okiura et al. |
| 4,416,620 A | 11/1983 | Morck |
| 4,418,530 A | 12/1983 | Bodrov et al. |
| 4,442,901 A | 4/1984 | Zison |
| 4,447,690 A | 5/1984 | Grever |
| 4,449,918 A | 5/1984 | Spahr |
| 4,467,610 A | 8/1984 | Pearson et al. |
| 4,469,176 A | 9/1984 | Zison et al. |
| 4,472,935 A | 9/1984 | Acheson et al. |
| 4,487,573 A | 12/1984 | Gottschlich et al. |
| 4,493,770 A | 1/1985 | Moilliet |
| 4,509,333 A | 4/1985 | Nussdorfer et al. |
| 4,509,374 A | 4/1985 | Sugimoto et al. |
| 4,534,165 A | 8/1985 | Davis, Jr. et al. |
| 4,643,667 A | 2/1987 | Fleming |
| 4,646,660 A | 3/1987 | Bjorkman et al. |
| 4,681,612 A | 7/1987 | O'Brien et al. |
| 4,688,495 A | 8/1987 | Galloway |
| 4,731,989 A | 3/1988 | Furuya et al. |
| 4,733,528 A | 3/1988 | Pinto |
| 4,741,690 A | 5/1988 | Heed |
| 4,754,607 A | 7/1988 | Mackay |
| 4,769,149 A | 9/1988 | Nobilet et al. |
| 4,779,545 A | 10/1988 | Breen et al. |
| 4,794,753 A | 1/1989 | Beebe |
| 4,823,711 A | 4/1989 | Kroneberger et al. |
| 4,828,481 A | 5/1989 | Weil et al. |
| 4,838,020 A | 6/1989 | Fujitsuka |
| 4,838,782 A | 6/1989 | Wills |
| 4,841,722 A | 6/1989 | Bjorge |
| 4,850,857 A | 7/1989 | Obermuller |
| 4,864,811 A | 9/1989 | Pfefferle |
| 4,870,824 A | 10/1989 | Young et al. |
| 4,874,310 A | 10/1989 | Seemann et al. |
| 4,888,162 A | 12/1989 | Brian |
| 4,941,415 A | 7/1990 | Pope et al. |
| 4,953,512 A | 9/1990 | Italiano |
| 4,974,530 A | 12/1990 | Lyon |
| 5,000,004 A | 3/1991 | Yamanaka et al. |
| 5,003,773 A | 4/1991 | Beckwith |
| 5,044,931 A | 9/1991 | Van Eerden et al. |
| 5,059,405 A | 10/1991 | Watson et al. |
| 5,108,717 A | 4/1992 | Deller et al. |
| 5,131,838 A | 7/1992 | Gensler et al. |
| 5,154,599 A | 10/1992 | Wunning |
| 5,161,366 A | 11/1992 | Beebe |
| 5,165,884 A | 11/1992 | Martin et al. |
| 5,183,401 A | 2/1993 | Dalla Betta et al. |
| 5,190,453 A | 3/1993 | Le et al. |
| 5,203,796 A | 4/1993 | Washam et al. |
| 5,225,575 A | 7/1993 | Ivanov et al. |
| 5,232,357 A | 8/1993 | Dalla Betta et al. |
| 5,248,251 A | 9/1993 | Dalla Betta et al. |
| 5,250,489 A | 10/1993 | Dalla Betta et al. |
| 5,258,349 A | 11/1993 | Dalla Betta et al. |
| 5,259,754 A | 11/1993 | Dalla Betta et al. |
| 5,263,314 A | 11/1993 | Anderson |
| 5,271,729 A | 12/1993 | Gensler et al. |
| 5,271,809 A | 12/1993 | Holzhausen |
| 5,281,128 A | 1/1994 | Dalla Betta et al. |
| 5,285,123 A | 2/1994 | Kataoka et al. |
| 5,309,707 A | 5/1994 | Provol et al. |
| 5,320,518 A | 6/1994 | Stilger et al. |
| 5,326,253 A | 7/1994 | Dalla Betta et al. |
| 5,326,537 A | 7/1994 | Cleary |
| 5,329,757 A | 7/1994 | Faulkner et al. |
| 5,329,955 A | 7/1994 | Gensler et al. |
| 5,375,563 A | 12/1994 | Khinkis et al. |
| 5,384,051 A | 1/1995 | McGinness |
| 5,405,260 A | 4/1995 | Della Betta et al. |
| 5,406,704 A | 4/1995 | Retallick |
| 5,425,632 A | 6/1995 | Tsurumi et al. |
| 5,461,864 A | 10/1995 | Betta et al. |
| 5,506,363 A | 4/1996 | Grate et al. |
| 5,511,972 A | 4/1996 | Dalla Betta et al. |
| 5,512,250 A | 4/1996 | Betta et al. |
| 5,518,697 A | 5/1996 | Dalla Betta et al. |
| 5,524,432 A | 6/1996 | Hansel |
| 5,524,599 A | 6/1996 | Kong et al. |
| 5,533,890 A | 7/1996 | Holst et al. |
| 5,557,014 A | 9/1996 | Grate et al. |
| 5,560,128 A | 10/1996 | Marega et al. |
| 5,592,811 A | 1/1997 | Dodge et al. |
| 5,601,790 A | 2/1997 | Stilger et al. |
| 5,602,298 A | 2/1997 | Levin |
| 5,626,017 A | 5/1997 | Sattelmayer |
| 5,635,139 A | 6/1997 | Holst et al. |
| 5,637,283 A | 6/1997 | Stilger et al. |
| 5,650,128 A | 7/1997 | Holst et al. |
| 5,685,156 A | 11/1997 | Willis et al. |
| 5,697,776 A | 12/1997 | Van Eerden et al. |
| 5,709,541 A | 1/1998 | Gensler et al. |
| 5,729,967 A | 3/1998 | Joos et al. |
| 5,770,584 A | 6/1998 | Kucera et al. |
| 5,770,784 A | 6/1998 | Heywood et al. |
| 5,794,431 A | 8/1998 | Utamura et al. |
| 5,806,298 A | 9/1998 | Klosek et al. |
| 5,816,705 A | 10/1998 | Vander Heyden et al. |
| 5,817,286 A | 10/1998 | Martin et al. |
| 5,819,524 A | 10/1998 | Bosley et al. |
| 5,819,673 A | 10/1998 | Heywood et al. |
| 5,832,713 A | 11/1998 | Maese et al. |
| 5,842,357 A | 12/1998 | Siwajek et al. |
| 5,850,731 A | 12/1998 | Beebe et al. |
| 5,850,733 A | 12/1998 | Bosley et al. |
| 5,857,419 A | 1/1999 | Van Eerden et al. |
| 5,862,858 A | 1/1999 | Wellington et al. |
| 5,895,599 A | 4/1999 | Nivoche |
| 5,896,740 A * | 4/1999 | Shouman .................. 60/39.182 |
| 5,921,763 A | 7/1999 | Martin |
| 5,944,503 A | 8/1999 | Van Eerden et al. |
| 5,987,875 A | 11/1999 | Hilburn et al. |
| 6,000,930 A | 12/1999 | Kelly et al. |
| 6,015,540 A | 1/2000 | McAdams et al. |
| 6,017,172 A | 1/2000 | Ukegawa et al. |
| 6,019,172 A | 2/2000 | Wellington et al. |

(56) References Cited

U.S. PATENT DOCUMENTS

| | | |
|---|---|---|
| 6,033,207 A | 3/2000 | Cummings |
| 6,053,699 A | 4/2000 | Turnquist et al. |
| 6,070,404 A | 6/2000 | Bosley et al. |
| 6,071,114 A | 6/2000 | Cusack et al. |
| 6,095,793 A | 8/2000 | Greeb |
| 6,098,396 A | 8/2000 | Wen et al. |
| 6,107,693 A | 8/2000 | Mongia et al. |
| 6,109,018 A | 8/2000 | Rostrup-Nielsen et al. |
| 6,116,014 A | 9/2000 | Dalla Betta et al. |
| 6,126,913 A | 10/2000 | Martin et al. |
| 6,136,144 A | 10/2000 | Martin et al. |
| 6,141,953 A | 11/2000 | Mongia et al. |
| 6,158,222 A | 12/2000 | Retallick |
| 6,164,908 A | 12/2000 | Nishida et al. |
| 6,205,768 B1 | 3/2001 | Dibble et al. |
| 6,217,832 B1 | 4/2001 | Betta et al. |
| 6,226,976 B1 | 5/2001 | Scott et al. |
| 6,251,347 B1 | 6/2001 | Campbell et al. |
| 6,257,869 B1 | 7/2001 | Martin et al. |
| 6,261,093 B1 | 7/2001 | Matros et al. |
| 6,269,625 B1 | 8/2001 | Dibble et al. |
| 6,269,882 B1 | 8/2001 | Wellington et al. |
| 6,289,666 B1 | 9/2001 | Ginter |
| 6,313,544 B1 | 11/2001 | Mongia et al. |
| 6,334,769 B1 | 1/2002 | Retallick et al. |
| 6,339,924 B1 | 1/2002 | Hoyer et al. |
| 6,339,925 B1 | 1/2002 | Hung et al. |
| 6,345,495 B1 | 2/2002 | Cummings |
| 6,383,462 B1 | 5/2002 | Lang |
| 6,391,267 B1 | 5/2002 | Martin et al. |
| 6,393,727 B1 | 5/2002 | Seelig et al. |
| 6,393,821 B1 | 5/2002 | Prabhu |
| 6,469,181 B1 | 10/2002 | Gruber et al. |
| 6,485,289 B1 | 11/2002 | Kelly et al. |
| 6,487,860 B2 | 12/2002 | Mayersky et al. |
| 6,497,615 B1 | 12/2002 | Klager |
| 6,514,472 B2 | 2/2003 | Menacherry et al. |
| 6,521,566 B1 | 2/2003 | Magno et al. |
| 6,539,720 B2 | 4/2003 | Rouse et al. |
| 6,551,068 B2 | 4/2003 | Blotenberg |
| 6,595,001 B2 | 7/2003 | Rautenbach et al. |
| 6,595,003 B2 | 7/2003 | Dalla Betta et al. |
| 6,612,112 B2 | 9/2003 | Gilbreth et al. |
| 6,634,176 B2 | 10/2003 | Rouse et al. |
| 6,639,328 B2 | 10/2003 | Wacknov |
| 6,641,625 B1 | 11/2003 | Clawson et al. |
| 6,655,137 B1 | 12/2003 | Sardari |
| 6,657,332 B2 | 12/2003 | Balas |
| 6,657,348 B2 | 12/2003 | Qin et al. |
| 6,675,583 B2 | 1/2004 | Willis et al. |
| 6,696,130 B1 | 2/2004 | Kasai et al. |
| 6,698,412 B2 | 3/2004 | Dalla Betta |
| 6,715,295 B2 | 4/2004 | Gadde et al. |
| 6,715,296 B2 | 4/2004 | Bakran et al. |
| 6,718,772 B2 | 4/2004 | Dalla Betta et al. |
| 6,720,685 B2 | 4/2004 | Balas |
| 6,732,531 B2 | 5/2004 | Dickey |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,784,565 B2 | 8/2004 | Wall et al. |
| 6,787,933 B2 | 9/2004 | Claude et al. |
| 6,796,129 B2 | 9/2004 | Yee et al. |
| 6,796,789 B1 | 9/2004 | Gibson et al. |
| 6,804,946 B2 | 10/2004 | Willis et al. |
| 6,810,678 B1 | 11/2004 | Luk |
| 6,812,586 B2 | 11/2004 | Wacknov et al. |
| 6,812,587 B2 | 11/2004 | Gilbreth et al. |
| 6,815,932 B2 | 11/2004 | Wall |
| 6,824,328 B1 | 11/2004 | Vinegar et al. |
| 6,832,480 B1 | 12/2004 | Anguil |
| 6,864,595 B2 | 3/2005 | Wall |
| 6,892,542 B2 | 5/2005 | Voinov |
| 6,895,760 B2 | 5/2005 | Kesseli |
| RE38,784 E | 8/2005 | Maese et al. |
| 6,923,001 B2 | 8/2005 | Laster et al. |
| RE38,815 E | 10/2005 | Maese et al. |
| 6,951,110 B2 | 10/2005 | Kang |
| 6,960,840 B2 | 11/2005 | Willis et al. |
| 6,962,055 B2 | 11/2005 | Chen et al. |
| 6,983,605 B1 | 1/2006 | Hook et al. |
| 7,007,486 B2 | 3/2006 | Sprouse et al. |
| 7,007,487 B2 | 3/2006 | Belokon et al. |
| 7,017,329 B2 | 3/2006 | Farhangi et al. |
| 7,045,913 B2 | 5/2006 | Ebrahim et al. |
| 7,053,590 B2 | 5/2006 | Wang |
| 7,062,917 B2 | 6/2006 | Wunning et al. |
| 7,093,445 B2 | 8/2006 | Corr, II et al. |
| 7,096,671 B2 | 8/2006 | Bland et al. |
| 7,117,676 B2 | 10/2006 | Farhangi et al. |
| 7,117,694 B2 | 10/2006 | Braun et al. |
| 7,121,097 B2 | 10/2006 | Yee et al. |
| 7,124,589 B2 | 10/2006 | Neary |
| 7,140,188 B2 | 11/2006 | Hosokawa et al. |
| 7,168,949 B2 | 1/2007 | Zinn et al. |
| RE39,596 E | 5/2007 | Dodge et al. |
| 7,353,655 B2 | 4/2008 | Bolis et al. |
| 7,378,065 B2 | 5/2008 | Filippi et al. |
| 7,425,127 B2 | 9/2008 | Zinn et al. |
| 7,430,869 B2 | 10/2008 | Su et al. |
| 7,469,647 B2 | 12/2008 | Widmer et al. |
| 7,624,564 B2 | 12/2009 | Stuttaford et al. |
| 7,703,271 B2 | 4/2010 | Minkkinen et al. |
| 7,823,388 B2 | 11/2010 | Murakami |
| 2002/0015670 A1 | 2/2002 | Shah et al. |
| 2002/0060556 A1 | 5/2002 | Wall |
| 2002/0063479 A1 | 5/2002 | Mitchell et al. |
| 2002/0066270 A1 | 6/2002 | Rouse et al. |
| 2002/0067872 A1 | 6/2002 | Weissert |
| 2002/0069648 A1 | 6/2002 | Levy et al. |
| 2002/0078694 A1 | 6/2002 | Nazeer et al. |
| 2002/0079760 A1 | 6/2002 | Vessa |
| 2002/0084702 A1 | 7/2002 | Balas |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0104316 A1 | 8/2002 | Dickey et al. |
| 2002/0125779 A1 | 9/2002 | Qin et al. |
| 2002/0128076 A1 | 9/2002 | Lubell |
| 2002/0166324 A1 | 11/2002 | Willis et al. |
| 2002/0195031 A1 | 12/2002 | Walker |
| 2003/0102730 A1 | 6/2003 | Balas |
| 2003/0110773 A1 | 6/2003 | Rouse et al. |
| 2003/0111842 A1 | 6/2003 | Gilbreth et al. |
| 2003/0157395 A1 | 8/2003 | Ren et al. |
| 2003/0192318 A1 | 10/2003 | Sprouse et al. |
| 2003/0192319 A1 | 10/2003 | Sprouse et al. |
| 2004/0003598 A1 | 1/2004 | Farhangi |
| 2004/0011523 A1 | 1/2004 | Sarada |
| 2004/0021235 A1 | 2/2004 | Corr et al. |
| 2004/0040312 A1 | 3/2004 | Hoffjann et al. |
| 2004/0074223 A1 | 4/2004 | Willis et al. |
| 2004/0100101 A1 | 5/2004 | Willis et al. |
| 2004/0103669 A1 | 6/2004 | Willis et al. |
| 2004/0119291 A1 | 6/2004 | Hamrin et al. |
| 2004/0129188 A1 | 7/2004 | Traina |
| 2004/0148942 A1 | 8/2004 | Pont et al. |
| 2004/0160061 A1 | 8/2004 | Rouse et al. |
| 2004/0167270 A1 | 8/2004 | Chang et al. |
| 2004/0178641 A1 | 9/2004 | Wall |
| 2004/0206090 A1 | 10/2004 | Yee et al. |
| 2004/0219079 A1 | 11/2004 | Hagen et al. |
| 2004/0238654 A1 | 12/2004 | Hagen et al. |
| 2004/0255588 A1 | 12/2004 | Lundberg et al. |
| 2005/0022499 A1 | 2/2005 | Belokon et al. |
| 2005/0028530 A1 | 2/2005 | Doebbeling et al. |
| 2005/0076648 A1 | 4/2005 | Farhangi |
| 2005/0196714 A1 | 9/2005 | Carroni et al. |
| 2005/0201909 A1 | 9/2005 | Carroni et al. |
| 2005/0217178 A1 | 10/2005 | Aoyama |
| 2006/0016195 A1 | 1/2006 | Dalla Betta et al. |
| 2006/0037432 A1 | 2/2006 | Deevi et al. |
| 2006/0049080 A1 | 3/2006 | Bacha et al. |
| 2006/0052499 A1 | 3/2006 | Chang et al. |

(56) References Cited

U.S. PATENT DOCUMENTS

| | | |
|---|---|---|
| 2006/0054318 A1 | 3/2006 | Sarada |
| 2006/0063845 A1 | 3/2006 | O'Rear et al. |
| 2006/0063869 A1 | 3/2006 | Chang et al. |
| 2006/0063870 A1 | 3/2006 | Chang et al. |
| 2006/0074134 A1 | 4/2006 | O'Rear et al. |
| 2006/0080968 A1 | 4/2006 | Griffin et al. |
| 2006/0096294 A1 | 5/2006 | Farhangi et al. |
| 2006/0096297 A1 | 5/2006 | Griffin et al. |
| 2006/0138022 A1 | 6/2006 | Miller et al. |
| 2006/0138024 A1 | 6/2006 | Miller et al. |
| 2006/0150635 A1 | 7/2006 | Su et al. |
| 2006/0196807 A1 | 9/2006 | Rosenbaum et al. |
| 2006/0199743 A1 | 9/2006 | Rosenbaum et al. |
| 2006/0202059 A1 | 9/2006 | Carroni et al. |
| 2006/0213183 A1 | 9/2006 | Althaus |
| 2006/0260308 A1 | 11/2006 | Ingersoll |
| 2006/0272331 A1 | 12/2006 | Bucker et al. |
| 2007/0054226 A1 | 3/2007 | Carroni et al. |
| 2007/0180832 A1 | 8/2007 | Kenyon et al. |
| 2007/0240425 A1 | 10/2007 | Malavasi et al. |
| 2007/0261408 A1 | 11/2007 | Carrea et al. |
| 2008/0222913 A1 | 9/2008 | Ronning et al. |
| 2008/0256938 A1 | 10/2008 | Miretti |
| 2009/0100820 A1 | 4/2009 | Prabhu |
| 2009/0100821 A1 | 4/2009 | Prabhu |
| 2009/0136406 A1 | 5/2009 | Johnson et al. |
| 2009/0272097 A1 | 11/2009 | Lawson et al. |
| 2010/0139282 A1 | 6/2010 | Prabhu |
| 2010/0233642 A1 | 9/2010 | Mozzi et al. |
| 2010/0275611 A1 | 11/2010 | Prabhu |
| 2010/0319355 A1 | 12/2010 | Prabhu |
| 2011/0067407 A1 | 3/2011 | Berdou et al. |
| 2011/0212010 A1 | 9/2011 | Bell |
| 2011/0219780 A1 | 9/2011 | Prabhu |
| 2012/0141343 A1 | 6/2012 | Shiban |
| 2012/0167552 A1 | 7/2012 | Mori et al. |
| 2013/0104563 A1 | 5/2013 | Oelfke et al. |
| 2013/0111913 A1 | 5/2013 | Hamrin et al. |
| 2013/0111920 A1 | 5/2013 | Hamrin et al. |
| 2013/0232874 A1 | 9/2013 | Maslov |
| 2013/0232876 A1 | 9/2013 | Armstrong et al. |
| 2013/0232939 A1 | 9/2013 | Armstrong et al. |
| 2013/0232940 A1 | 9/2013 | Armstrong |
| 2013/0232942 A1 | 9/2013 | Watts |
| 2013/0232943 A1 | 9/2013 | Lampe et al. |
| 2013/0232944 A1 | 9/2013 | Lampe et al. |
| 2013/0232945 A1 | 9/2013 | Armstrong et al. |
| 2013/0232946 A1 | 9/2013 | Hamrin et al. |
| 2013/0232947 A1 | 9/2013 | Armstrong et al. |
| 2013/0232982 A1 | 9/2013 | Maslov |
| 2013/0232983 A1 | 9/2013 | Maslov |
| 2013/0232984 A1 | 9/2013 | Lampe et al. |
| 2013/0233213 A1 | 9/2013 | Martin et al. |
| 2013/0236369 A1 | 9/2013 | Maslov et al. |
| 2013/0236370 A1 | 9/2013 | Maslov |
| 2013/0236371 A1 | 9/2013 | Maslov |
| 2013/0236372 A1 | 9/2013 | Denison et al. |
| 2013/0236839 A1 | 9/2013 | Lampe et al. |
| 2013/0236841 A1 | 9/2013 | Armstrong et al. |
| 2013/0236845 A1 | 9/2013 | Hamrin et al. |

FOREIGN PATENT DOCUMENTS

| | | |
|---|---|---|
| JP | 11-13483 A | 1/1999 |
| JP | 2003-536364 | 2/2003 |
| WO | WO-92/20963 A1 | 11/1992 |
| WO | WO-96/14370 A2 | 5/1996 |
| WO | WO-01/92702 A1 | 12/2001 |

OTHER PUBLICATIONS

Gutmark, Abstract Submitted for the DFD06 Meeting of the American Physical Society, Electronic form version 1.4, <http://absimage.aps.org/image/DFD06/MWS_DFD06-2006-000152.pdf>, Jul. 26, 2006.

"Flameless Thermal Oxidizers" <http://www.selasfluid.com/international/web/le/us/likelesfus.nsf/docbyalias/flameless_thermal>, Copyright 2008, 3 pages, retrieved May 13, 2010.

Stadler, H. "Experimental and Numerical Investigation of Flameless Pulverised Coal Combustion" <http://darwin.bth.rwth-aachen.de/opus3/voltexte/2010/pdf/3323.pdf>, Aug. 2010, retrieved Sep. 14, 2011.

* cited by examiner

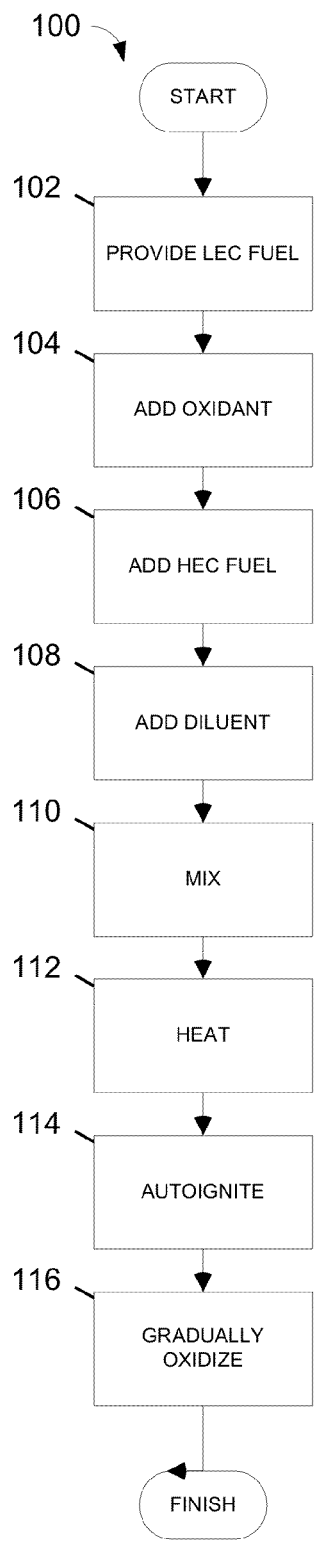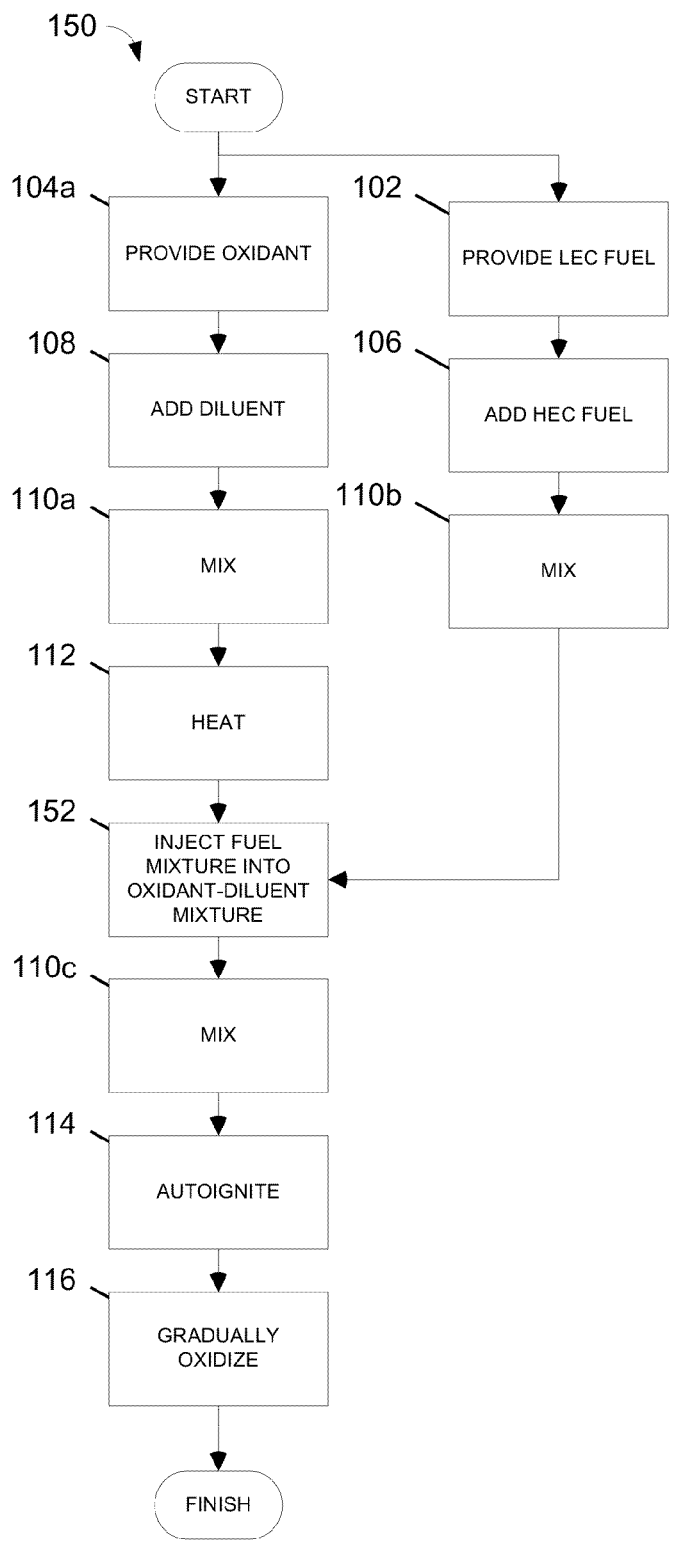
FIG. 1-5    FIG. 1-6

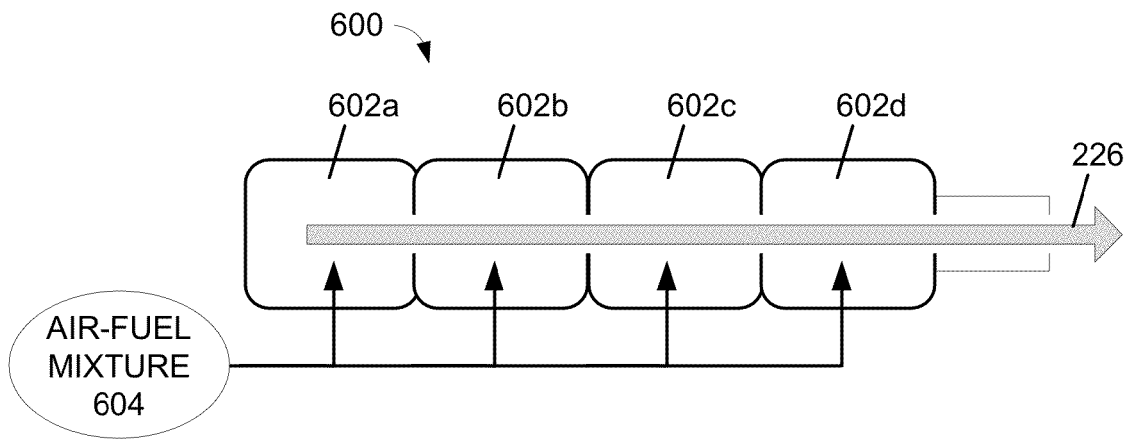
FIG. 1-13
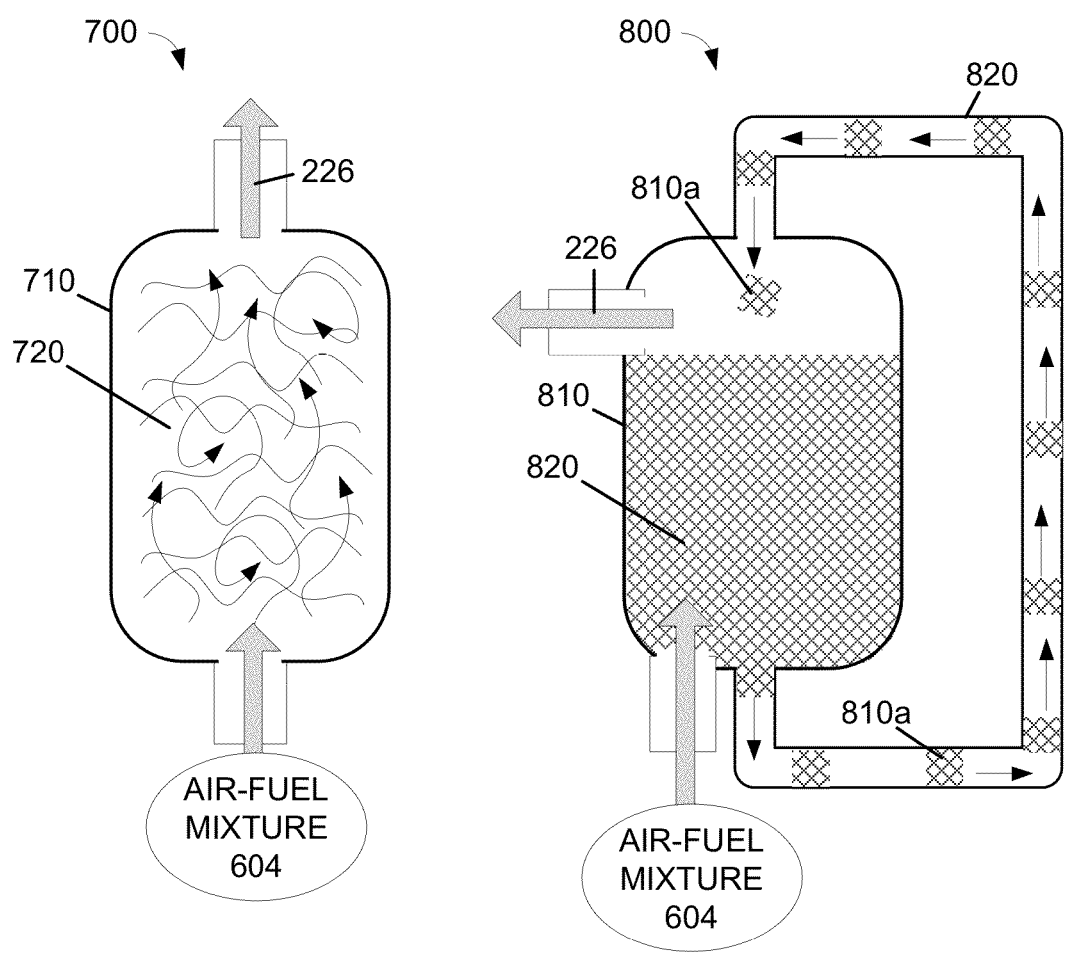
FIG. 1-14
FIG. 1-15A

GRADUAL OXIDATION WITH HEAT TRANSFER

BACKGROUND

In some industrial processes such as power generation, steam generation, and thermally driven chemical processing, heat can be provided directly or indirectly by the combustion of high-energy-content (HEC) fuels, such as propane or natural gas.

Emissions from landfills and other sources of gas containing volatile organic compounds (VOCs) are considered pollutants. These waste streams often contain too little fuel to sustain combustion on their own. Some methods of disposing of VOC-containing waste streams use thermal oxidizers of the following types: (1) Fired- or supplemental-fired thermal oxidizers, (2) Catalytic thermal oxidizers, (3) Oxidizers with heat recovery, and (4) Regenerative thermal oxidizers (RTOs).

Fired- or supplemental-fired thermal oxidizers can include a burner, a residence chamber, a mixing chamber, and an exhaust stack. FIG. 1-1A illustrates a configuration wherein an air-fuel mixture 6 is provided to the burner 2 to create a continuous flame and the waste stream 7 is introduced into the flame and continues to oxide as the hot gases pass through the mixing chamber 3 and residence chamber 4. If the waste stream 7 is within flammability limits, it may be directly combusted in the burner 2 in place of the air-fuel mixture 6. The mixing chamber 3 is required if the waste stream and burner are separately supplied. The residence chamber 4 provides enough time to complete the oxidative chemical reactions. The exhaust stack 5 conveys the products of oxidation to the atmosphere.

Catalytic oxidizers, as shown in FIG. 1-1B, avoid the creation of thermal NOx by keeping the oxidation reaction temperature low. A waste stream 7 containing VOCs is provided into a catalytic reaction chamber 8 having a large internal surface area coated with a catalyst. Catalytic materials include noble metals such as platinum, palladium, and iridium as well as, for certain VOCs, copper oxide, vanadium, and cobalt. The concentration of VOCs in the waste stream 7 must be low enough that the reaction temperatures will not exceed the catalyst maximum use temperature. The waste stream 7 typically has to be heated to a specific temperature range appropriate for the catalytic reactivity.

The use of a recuperator 9, as shown in FIG. 1-1C, can reduce the operating costs of fired thermal oxidizers and catalytic oxidizers. The exhaust from the reaction chamber 1, which may be by way of example either of the systems of FIG. 1-1A or 1-1B, is supplied to a high-temperature recuperator 9 to heat either the VOC-laden waste stream 7, as shown in FIG. 1-1C, or the separate combustion air-fuel mixture if supplied separately, as shown in FIG. 1-1A. Use of a recuperator 9 can reduce or eliminate the need for supplemental fuel to heat the reactants to their oxidation temperature.

Lastly, RTOs can be used to oxidize VOCs. In an RTO, heat is stored on an intermediate heat sink material, usually a ceramic solid, for recovery during an alternate cycle. The cycle uses heat from a previously heated flow to preheat the VOC-laden waste stream to a higher temperature. If the temperature is sufficiently high, oxidation will take place due to autoignition, as discussed in greater detail later in the present disclosure. If the temperature is not high enough, supplemental firing from another fuel and air source may be required. The higher-temperature exhaust is then conveyed through a colder heat sink to capture the energy.

There are different approaches to achieve the cycling of the heat exchange material. FIGS. 1-1D illustrates a system using two regenerative oxidizers. In the depicted configuration, the waste stream 7 is introduced into hot regenerative oxidizer #1. The waste stream is heated as it passes through regenerative oxidizer #1, thereby incrementally cooling the heat sink material with the oxidizer #1 starting at the inlet. After the waste stream 7 autoignites, the hot exhaust gas exits from the oxidizer #1 and is provided to the inlet of oxidizer #2, thereby "regenerating" the stored thermal energy in the heat sink material in oxidizer #2. The oxidized waste stream cools as it passes through oxidizer #2. When oxidizer #2 is sufficiently heated, the system is reconfigured such that the flow from the waste stream 7 is provided to the inlet of oxidizer #2 and the exhaust from oxidizer #2 is provided to the inlet of oxidizer #1 to regenerate oxidizer #1. The process cycles between the two configurations so that the oxidizer that was previously cooled while heating the waste stream 7 is heated, and visa-versa. Some RTO designs make use of rotating hardware to variably change the flow streams between cycles or to move the regenerative oxidizers between cycles. Another approach is to use a single regenerative oxidizer but to reverse the flow direction for each cycle. One end of the oxidizer will be preheating while the other end is capturing heat after the oxidative reaction. The reversing of flow direction is necessary because the end of the oxidizer proximal to the inlet cools to the point where it can no longer heat the incoming waste stream 7 to a temperature that will initiate the reaction.

SUMMARY

In some circumstances, it is advantageous to dispose of low-energy-content (LEC) fuel, such as the methane that evolves from some landfills, while minimizing undesirable components such as carbon monoxide (CO) and NOx in the exhaust. In other circumstances, it is desirable to provide heat from a HEC fuel, such as propane, to drive an industrial process or generate power without creating these same undesirable components. To accomplish these operations, an air-fuel mixture formed from one or both of LEC and HEC fuels must reach a temperature that is high enough to convert the VOCs and hydrocarbons in the fuel to carbon dioxide ($CO_2$) and water ($H_2O$) while keeping the maximum temperature of the air-fuel mixture below the temperature at which thermal NOx will form. Any conventional open-flame combustion process is a candidate to be replaced by a process that reduces the formation of NOx compounds through a reduced-temperature oxidation process.

There also is a desire to utilize the energy that is otherwise wasted when an LEC fuel is simply being disposed of by being oxidized to convert the VOCs to $CO_2$ and $H_2O$. One of the drawbacks of existing power-generation systems driven by gas turbines is that a HEC fuel is burned to provide the heat that drives the turbine. It would be advantageous to provide this heat using the essentially "free" LEC fuel and avoid or decrease the expense of purchasing fuel.

The processes described above in FIGS. 1-1A through 1-1D have various drawbacks. With respect to the thermal oxidizer of FIG. 1-1A, for example, if supplemental fuel is required to provide the air-fuel mixture 6, the cost of the fuel is additive to the cost of the process. In addition, the reaction temperatures in the burner 2 are high enough to form thermal NOx, discussed in greater detail later in the present disclosure.

Catalysts can have challenges associated with their use. Noble-metal catalysts are rare and expensive. The process requires that the waste stream be heated to a specific range using any of a variety of means, including heat recovery as described below, but often is additive to the cost of the process. Catalysts can be rendered chemically inactive due to processes like sintering, fouling, or volatilization. Waste fuels, such as landfill gas, often contain contaminants that can significantly shorten the life of the catalyst. To control the reaction temperatures to avoid volatilization, the fuel composition and process variables are maintained within predefined limits, adding cost to monitor and adjust these variables.

Recuperators have several disadvantages. The recuperator is an additional investment cost for a thermal oxidation system. Recuperators also add pressure drop to the system, increasing the power requirement for the flow conveyance apparatus, i.e. fans, that move the waste stream 7 and air-fuel mixtures 6 through the system. If the recuperator contains small passages, they can be subject to fouling and corrosion from various exhaust gas constituents. If the temperature of the exhaust gas from the reaction chamber is above the maximum service temperature for the materials of a recuperator, additional process equipment is required to cool to exhaust prior to introducing the exhaust into the recuperator.

Regenerative oxidizers have the drawbacks that the reconfiguration of the flow path between cycles requires significant complexity in either high-temperature valving and piping or in physically moving the hot regenerative oxidizers. The reconfiguration also interrupts the process, requiring some system for accumulating the waste stream 7 during the reconfiguration operation.

The gradual oxidation (GO) process disclosed herein avoids the drawbacks associated with conventional systems for processing waste streams containing VOCs. The GO process, once through the start-up process, operates on LEC fuel and does not require additional HEC fuel to sustain the oxidation process. The GO process does not require the use of an expensive catalyst, thereby reducing the required investment and avoiding the operational hazard of poisoning the catalyst. The disclosed GO process transfers the heat produced by the oxidation of the waste stream into the incoming flow, thereby avoiding the problem of incrementally cooling the media as seen in regenerative oxidizers and eliminating the need for expensive and potentially unreliable valves as well as the need for an accumulator to handle the incoming waste stream while the regenerative system is reconfigured between cycles.

There also are circumstances wherein it is desirable to use a HEC fuel while minimizing the formation of undesirable NOx compounds and CO as well as reducing unburned hydrocarbons in the exhaust. One of the drawbacks of existing power-generation systems driven by gas turbines using a HEC fuel is that the combustion process occurs at a temperature at which NOx may form and that there may be some level of remaining hydrocarbons as the mixture falls below the lower flammability limit during the combustion process.

The disclosed systems use a GO process that occurs within an oxidizer (also referred to herein as a gradual oxidizer, a GO chamber, and a GO reaction chamber) in place of a conventional combustion chamber to generate the heat that drives the system. In certain configurations, the oxidizer contains a material, such as a ceramic, that is structured to be porous to a gas flow and retains its structure at temperatures above 1200° F.

In certain embodiments, a system for oxidizing fuel described herein includes an oxidizer having a reaction chamber with an inlet and an outlet, the reaction chamber configured to receive a gas comprising an oxidizable fuel through the inlet, the oxidizer configured to maintain gradual oxidation of the fuel within the reaction chamber; and means for drawing heat from the reaction chamber, such that when an adiabatic reaction temperature within the reaction chamber approaches a flameout temperature, heat is drawn out of the reaction chamber to reduce an actual temperature within the reaction chamber to a temperature that does not exceed the flameout temperature.

In certain embodiments, the means for drawing heat from the reaction chamber comprises a heat exchanger. In certain embodiments, the means for drawing heat from the reaction chamber comprises a fluid. In certain embodiments, the means for drawing heat from the reaction chamber comprises a means for generating steam. In certain embodiments, the means for drawing heat is configured to draw heat from the reaction chamber when the actual temperature within the reaction chamber increases to the flameout temperature In certain embodiments, the system also includes a means for raising a temperature of the gas, at the inlet of the reaction chamber to above the autoignition temperature of the fuel. In certain embodiments, the means comprises a heat exchanger within the oxidizer. In certain embodiments the reaction chamber is configured to maintain gradual oxidation of the oxidizable fuel without a catalyst. In certain embodiments, the means is configured to draw heat out of the reaction chamber when the temperature within the reaction chamber exceeds 2300° F. In certain embodiments, the system also includes a turbine that receives gas from the reaction chamber outlet and expands the gas. In certain embodiments, the system also includes a compressor that receives and compresses gas, comprising a fuel mixture, prior to introduction of the fuel mixture into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a system for oxidizing fuel described herein includes an oxidizer having a reaction chamber with an inlet and an outlet, the reaction chamber configured to receive a gas comprising an oxidizable fuel through the inlet, the oxidizer configured to maintain a gradual oxidation process within the reaction chamber; and a heat exchanger configured to draw heat from the reaction chamber when an adiabatic reaction temperature within the reaction chamber approaches a flameout temperature, such that an actual temperature within the reaction chamber is reduced to a level that does not exceed the flameout temperature.

In certain embodiments, the heat exchanger is configured to draw heat from the reaction chamber when the actual temperature of the reaction chamber increases to the flameout temperature. In certain embodiments, the system also includes a turbine that receives gas from the reaction chamber and expands the gas. In certain embodiments, the system also includes a compressor that receives and compresses gas, comprising a fuel mixture, prior to introduction of the fuel mixture into the reaction chamber. In certain embodiments, the heat exchanger is configured to raise a temperature of the gas, at the inlet of the reaction chamber, to above the autoignition temperature of the fuel. In certain embodiments, the heat exchanger comprises a fluid introduced into the reaction chamber. In certain embodiments, the heat exchanger is configured to evacuate the fluid from the reaction chamber. In certain embodiments, the heat exchanger comprises a means for generating steam. In certain embodiments, the reaction chamber is configured to maintain gradual oxidation of the oxidizable fuel without a catalyst. In certain embodiments, the heat exchanger is configured to draw heat out of the reaction chamber when the temperature within the reaction chamber exceeds 2300° F. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of receiving a gas comprising an oxidizable fuel into an oxidizer having a reaction chamber with an inlet and an outlet, the reaction chamber configured to maintain a gradual oxidation process of the fuel within the reaction chamber; and drawing heat from the reaction chamber when an adiabatic reaction temperature within the reaction chamber approaches a flameout temperature, such that an actual temperature within the reaction chamber does not exceed the flameout temperature.

In certain embodiments, the method includes the step of expanding gas from the reaction chamber in a turbine. In certain embodiments, the method also includes the step of compressing the fuel with a compressor prior to introduction of the fuel mixture into the reaction chamber. In certain embodiments, the method includes the step of drawing heat from the reaction chamber comprises introducing a fluid into the reaction chamber. In certain embodiments, the method includes the step of evacuating the fluid from the reaction chamber. In certain embodiments, the fluid is evacuated from the reaction chamber in the form of steam. In certain embodiments, the reaction chamber maintains gradual oxidation of the oxidizable fuel without a catalyst. In certain embodiments, heat is drawn out of the reaction chamber when the temperature within the reaction chamber exceeds 2300° F. In certain embodiments, oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of receiving a gas comprising an oxidizable fuel into an oxidizer having a reaction chamber with an inlet and an outlet, the reaction chamber configured to maintain a temperature within the reaction chamber to gradually oxidize the fuel within the reaction chamber; and reducing the temperature within the reaction chamber, such that an actual temperature within the reaction chamber remains below a flameout temperature.

In certain embodiments, reducing the temperature comprises drawing heat from the reaction chamber. In certain embodiments, the method includes the step of expanding gas from the reaction chamber in a turbine. In certain embodiments, the method includes the step of compressing the fuel with a compressor prior to introduction of the fuel mixture into the reaction chamber. In certain embodiments, reducing the temperature comprises introducing a fluid into the reaction chamber. In certain embodiments, the method includes the step of evacuating the fluid from the reaction chamber. In certain embodiments, the fluid is evacuated from the reaction chamber in the form of steam. In certain embodiments, the reaction chamber maintains gradual oxidation of the oxidizable fuel without a catalyst. In certain embodiments, the temperature is reduced such that the temperature within the reaction chamber does not exceed 2300° F. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing a fuel described herein includes the steps of determining a temperature within a reaction chamber of an oxidizer, the reaction chamber having an inlet and an outlet and being configured to maintain gradual oxidation of an oxidizable fuel; and outputting a signal to reduce the temperature within the reaction chamber when the temperature within the reaction chamber approaches a flameout temperature, such that the temperature remains beneath the flameout temperature.

In certain embodiments, the signal comprises instructions to draw heat from the reaction chamber by introducing a liquid into the reaction chamber. In certain embodiments, the signal comprises instructions to evacuate the fluid from the reaction chamber. In certain embodiments, the instructions to evacuate the fluid from the reaction chamber comprise instructions to evacuate the fluid in the form of steam. In certain embodiments, the signal to draw heat from the reaction chamber is output when the temperature within the reaction chamber exceeds 2300° F. In certain embodiments, the signal to draw heat from the reaction chamber is output when the temperature exceeds a flameout temperature of at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing a fuel described herein includes the steps of determining a temperature within a reaction chamber of an oxidizer, the reaction chamber having an inlet and an outlet and being configured to maintain gradual oxidation of an oxidizable fuel; and outputting a signal to a heat exchanger to draw heat from the reaction chamber when the temperature within the reaction chamber approaches a flameout temperature.

In certain embodiments, the signal comprises instruction to remove heat from the reaction chamber. In certain embodiments, the signal comprises instruction to reduce the temperature by introducing a fluid into the reaction chamber. In certain embodiments, the signal comprises instruction to evacuate the fluid from the reaction chamber. In certain embodiments, the instruction to evacuate the fluid from the reaction chamber comprises evacuating the fluid in the form of steam. In certain embodiments, the method also includes the step of repeatedly calculating, based on data of the oxidizable fuel, an adiabatic reaction temperature within the reaction chamber. In certain embodiments, the signal to reduce the temperature within the reaction chamber is output when the temperature within the reaction chamber exceeds 2300° F. In certain embodiments, the signal to draw heat from the reaction chamber is output when the temperature approaches a flameout temperature of at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide. In certain embodiments, the signal to draw heat from the reaction chamber is output when the temperature increases to the flameout temperature.

In certain embodiments, a method for oxidizing a fuel described herein includes the steps of determining a temperature within a reaction chamber of an oxidizer, the reaction chamber having an inlet and an outlet and being configured to maintain gradual oxidation of an oxidizable fuel; and determining, with a sensor, when the temperature within the reaction chamber approaches a flameout temperature of the fuel within the reaction chamber.

In certain embodiments, the method includes the step of outputting a signal to reduce the temperature within the reaction chamber when a calculated adiabatic reaction temperature within the reaction chamber exceeds the flameout temperature. In certain embodiments, the calculated adiabatic reaction temperature is based on the oxidizable fuel and an oxidant within the reaction chamber. In certain embodiments, the signal comprises instruction to remove heat from the reaction chamber. In certain embodiments, the signal comprises instruction to reduce the temperature by introducing a liquid into the reaction chamber. In certain embodiments, the signal to reduce the temperature within the reaction chamber is output when the temperature within the reaction chamber exceeds 2300° F. In certain embodiments, the signal to draw heat from the reaction chamber is output when the temperature exceeds a flameout temperature of at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a system for oxidizing fuel described herein includes an oxidizer having a reaction chamber with an inlet and an outlet, the reaction chamber configured to receive a gas comprising an oxidizable fuel through the inlet, the oxidizer configured to maintain an oxidation process without a catalyst; a detection module that detects when at least one of a reaction temperature within the reaction chamber approaches a flameout temperature of the fuel within the reaction chamber and a reaction chamber inlet temperature approaches an autoignition threshold; and a correction module that outputs instructions, based on the detection module, to change at least one of removal of heat from the reaction chamber, and the inlet temperature of the reaction chamber; wherein the correction module is configured to at least one of maintain an actual temperature within the reaction temperature to below the flameout temperature and maintain the inlet temperature above the autoignition threshold of the fuel.

In certain embodiments, the correction module outputs instructions to remove heat from the reaction chamber by a heat exchanger. In certain embodiments, the correction module outputs instructions to remove heat from the reaction chamber by a fluid. In certain embodiments, the correction module outputs instructions to raise the inlet temperature. In certain embodiments, a heat exchanger positioned within the reaction chamber. In certain embodiments, the reaction chamber is configured to maintain oxidation of the oxidizable fuel beneath the flameout temperature. In certain embodiments, the correction module outputs instructions to remove heat from the reaction chamber when the temperature within the reaction chamber exceeds 2300° F. In certain embodiments, a turbine that receives gas from the reaction chamber and expands the gas. In certain embodiments, the system also includes a compressor that receives and compresses gas, comprising a fuel mixture, prior to introduction of the fuel mixture into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a system for oxidizing fuel described herein includes an oxidizer having a reaction chamber with an inlet and an outlet, the reaction chamber configured to receive a gas comprising an oxidizable fuel through the inlet, the oxidizer configured to maintain an oxidation process without a catalyst; a detection module that detects when at least one of a reaction temperature within the reaction chamber approaches a flameout temperature of the fuel within the reaction chamber and a reaction chamber inlet temperature approaches an autoignition threshold; and a correction module that outputs instructions, based on the detection module, to at least one of maintain an actual temperature within the reaction temperature to below the flameout temperature or maintain the inlet temperature above the autoignition threshold of the fuel.

In certain embodiments, the correction module outputs instructions to a heat exchanger to remove heat from the reaction chamber. In certain embodiments, the correction module outputs instructions to remove heat from the reaction chamber by a fluid. In certain embodiments, the correction module outputs instructions to raise the inlet temperature. In certain embodiments, the system also includes a heat exchanger positioned within the reaction chamber. In certain embodiments, the reaction chamber is configured to maintain oxidation of the oxidizable fuel beneath the flameout temperature. In certain embodiments, the correction module outputs instructions to remove heat from the reaction chamber when the temperature within the reaction chamber exceeds 2300° F.

In certain embodiments, a system for oxidizing fuel described herein includes an oxidizer having a reaction chamber with an inlet and an outlet, the reaction chamber configured to receive a gas comprising an oxidizable fuel through the inlet, the oxidizer configured to maintain an oxidation process without a catalyst; and a processor that detects when at least one of a reaction temperature within the reaction chamber approaches a flameout temperature of the fuel within the reaction chamber and a reaction chamber inlet temperature drops approaches an autoignition threshold.

In certain embodiments, a correction module that, based on the processor, reduces an actual temperature within the reaction chamber to remain beneath the flameout temperature of the fuel by removing heat from the reaction chamber. In certain embodiments, a correction module that, based on the processor, raises the inlet temperature above the autoignition threshold of the fuel by increasing a residence time of the oxidizable fuel within the reaction chamber.

In certain embodiments, a method for oxidizing fuel described herein includes the steps of receiving a gas comprising an oxidizable fuel into an oxidizer having a reaction chamber with an inlet and an outlet, the reaction chamber configured to maintain an oxidation process of the gas; and changing at least one of removal of heat from the reaction chamber and an inlet temperature of the reaction chamber when at least one of an actual temperature within the reaction chamber approaches or increases to a flameout temperature of the fuel and the reaction chamber inlet temperature approaches or drops below an autoignition threshold of the fuel.

In certain embodiments, the actual temperature of the reaction chamber is maintained below the flameout temperature. In certain embodiments, the inlet temperature of the reaction chamber is increased to a level that will support oxidation of the fuel without a catalyst. In certain embodiments, the inlet temperature is increased to above the autoignition threshold. In certain embodiments, a temperature of the gas is increased by a heat exchanger located within the reaction chamber. In certain embodiments, the method also includes the step of expanding gas from the reaction chamber outlet in a turbine or a piston engine. In certain embodiments, the method also includes the step of compressing the fuel with a compressor prior to introduction of the fuel mixture into the reaction chamber. In certain embodiments, removal of heat from the reaction chamber comprises introducing a liquid into the reaction chamber. In certain embodiments, the method also includes the step of evacuating the liquid from the reaction chamber. In certain embodiments, the liquid is evacuated from the reaction chamber in the form of steam. In certain embodiments, the reaction chamber maintains gradual oxidation of the oxidizable fuel without a catalyst. In certain embodiments, heat is removed from the reaction chamber when the temperature within the reaction chamber exceeds 2300° F. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of receiving a gas comprising an oxidizable fuel into an oxidizer having a reaction chamber with an inlet and an outlet, the reaction chamber configured to maintain a gradual oxidation process; and increasing at least one of removal of heat from the reaction chamber when an adiabatic reaction temperature within the reaction chamber approaches a flameout temperature of the fuel; and an inlet temperature of the reaction chamber when the reaction chamber inlet temperature drops below an autoignition threshold of the fuel.

In certain embodiments, an actual temperature of the reaction chamber is maintained below the flameout temperature. In certain embodiments, the inlet temperature of the reaction chamber rises to a level that will support oxidation of the fuel without a catalyst. In certain embodiments, the inlet temperature rises above the autoignition temperature. In certain embodiments, a gas temperature is increased by a heat exchanger located outside the reaction chamber, and the gas is passed through the heat exchanger prior to being introduced into the reaction chamber.

In certain embodiments, a method for oxidizing fuel described herein includes the steps of receiving a gas comprising an oxidizable fuel into an oxidizer having a reaction chamber with an inlet and an outlet, the reaction chamber configured to maintain a gradual oxidation process without a catalyst; and increasing at least one of removal of heat from the reaction chamber when a reaction temperature within the reaction chamber approaches a flameout temperature of the fuel, such that an actual temperature of the reaction chamber is maintained below the flameout temperature; and an inlet temperature of the reaction chamber when the reaction chamber inlet temperature drops below an autoignition threshold of the fuel, such that the inlet temperature of the reaction chamber is maintained above a level that will support oxidation of the fuel without a catalyst. In certain embodiments, the inlet temperature is maintained above the autoignition temperature.

In certain embodiments, a system for oxidizing fuel described herein includes an oxidizer having a reaction chamber with an inlet and an outlet, the reaction chamber configured to receive a gas comprising an oxidizable fuel through the inlet and to maintain an oxidation process within the reaction chamber; a detection module that detects when a reaction chamber inlet temperature of the gas approaches or drops below an autoignition threshold of the gas entering the first reaction chamber; and a correction module that outputs instructions, based on the detection module, to change the inlet temperature of the gas to maintain the inlet temperature above autoignition threshold, such that the gas within the reaction chamber oxidizes without a catalyst.

In certain embodiments, the correction module outputs instructions to a heat exchanger to raise the inlet temperature. In certain embodiments, the heat exchanger is positioned within the reaction chamber. In certain embodiments, the reaction chamber is configured to maintain oxidation of the gas beneath a flameout temperature of the fuel within the reaction chamber. In certain embodiments, the system also includes a turbine or a piston engine that receives gas from the reaction chamber and expands the gas. In certain embodiments, the system also includes a compressor that receives and compresses gas, comprising a fuel mixture, prior to introduction of the fuel mixture into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a system for oxidizing fuel described herein includes an oxidizer having a reaction chamber with an inlet and an outlet, the reaction chamber configured to receive a gas comprising an oxidizable fuel through the inlet and to maintain an oxidation process within the reaction chamber; a detection module that detects when a reaction chamber inlet temperature of the gas drops toward an autoignition threshold of the fuel; and a correction module that, based on the detection module, maintains the inlet temperature above the autoignition threshold.

In certain embodiments, the correction module outputs instructions to a heat exchanger to maintain the inlet temperature. In certain embodiments, the heat exchanger is positioned within the reaction chamber. In certain embodiments, the reaction chamber is configured to maintain an actual temperature within the reaction chamber beneath a flameout temperature of the fuel. In certain embodiments, the system also includes a turbine or a piston engine that receives gas from the reaction chamber and expands the gas. In certain embodiments, the system also includes a compressor that receives and compresses gas, comprising a fuel mixture, prior to introduction of the gas into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a system for oxidizing fuel described herein includes an oxidizer having a reaction chamber with an inlet and an outlet, the reaction chamber configured to receive a gas comprising an oxidizable fuel through the inlet and to maintain an oxidation process; and a heat exchanger that maintains a reaction chamber inlet temperature above an autoignition threshold of the fuel, such that the fuel oxidizes within the reaction chamber above the autoignition threshold and beneath a flameout temperature of the fuel.

In certain embodiments, a detection module that detects when the reaction chamber inlet temperature approaches the autoignition threshold. In certain embodiments, the heat exchanger is positioned within the reaction chamber. In certain embodiments, the system also includes a turbine or a piston engine that receives gas from the reaction chamber and expands the gas. In certain embodiments, the system also includes a compressor that receives and compresses gas, comprising a fuel mixture, prior to introduction of the fuel mixture into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of determining, in a reaction chamber, with an inlet and an outlet, that is configured to maintain an oxidation process of an oxidizable fuel, at least one of an actual reaction temperature of the fuel in the reaction chamber, and an inlet temperature of the reaction chamber; determining, with a sensor, when at least one of the actual reaction temperature approaches or exceeds a flameout temperature of the fuel, and the inlet temperature approaches or drops below an autoignition threshold of the fuel; and determining at least one of a reduction of the actual reaction temperature within the reaction chamber to remain below the flameout temperature, and an increase in the inlet temperature to maintain the inlet temperature above the autoignition threshold.

In certain embodiments, the reduction of the actual reaction temperature comprises removal of heat from the reaction chamber. In certain embodiments, removal of heat from the reaction chamber comprises introducing a fluid into the reaction chamber. In certain embodiments, removal of heat further comprises evacuating the fluid from the reaction chamber. In certain embodiments, the reaction chamber is configured to evacuate the fluid in the form of steam. In certain embodiments, the increase in the inlet temperature comprises directing the fuel through a heat exchanger. In certain embodiments, the heat exchanger is positioned within the reaction chamber. In certain embodiments, the flameout temperature is about 2300° F. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of determining, in a reaction chamber, with an inlet and an outlet, that is configured to maintain an oxidation process of an oxidizable fuel, at least one of an actual reaction temperature of the fuel in the reaction chamber, and an inlet temperature of the gas at the inlet; determining when at least one of the actual reaction temperature approaches or exceeds a flameout temperature of the fuel and a reaction chamber inlet temperature approaches or drops below an autoignition threshold of the fuel; and outputting instructions to at least one of reduce the actual temperature or reduce increase of the actual temperature within the reaction chamber to be maintained below the flameout temperature, and increase the inlet temperature to be above the autoignition threshold of the fuel.

In certain embodiments, the outputting comprises instructions to remove heat from the reaction chamber. In certain embodiments, the method also includes the step of removing heat from the reaction chamber by introducing a fluid into the reaction chamber. In certain embodiments, removing heat further comprises evacuating the fluid from the reaction chamber. In certain embodiments, the fluid is evacuated from the reaction chamber in the form of steam. In certain embodiments, the outputting comprises increasing the inlet temperature by directing the fuel through a heat exchanger. In certain embodiments, the heat exchanger is positioned within the reaction chamber. In certain embodiments, the flameout temperature is about 2300° F. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of receiving a gas comprising an oxidizable fuel into an oxidizer having a reaction chamber with an inlet and an outlet, the reaction chamber configured to maintain an oxidation process; and when a reaction chamber inlet temperature of the gas approaches or drops below an autoignition threshold of the fuel, introducing additional heat to the gas such that the inlet temperature is maintained above the autoignition threshold, and the reaction chamber maintains oxidation of the fuel within the reaction chamber without a catalyst.

In certain embodiments, the additional heat is introduced by a heat exchanger. In certain embodiments, the heat exchanger is positioned within the reaction chamber. In certain embodiments, the reaction chamber maintains oxidation of the oxidizable fuel beneath a flameout temperature of the fuel. In certain embodiments, the method also includes the step of a turbine or a piston engine that receives gas from the reaction chamber and expands the gas. In certain embodiments, a compressor that receives and compresses gas, comprising a fuel mixture, prior to introduction of the fuel mixture into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of receiving a gas comprising an oxidizable fuel into an oxidizer having a first reaction chamber with an inlet and an outlet, the first reaction chamber being configured to maintain an oxidation process of the fuel; and when a reaction chamber inlet temperature of the gas approaches or drops below an autoignition threshold of the fuel, increasing the inlet temperature to a level above the autoignition threshold.

In certain embodiments, the reaction chamber maintains gradual oxidation of the fuel within the reaction chamber without a catalyst. In certain embodiments, the inlet temperature is increased by a heat exchanger. In certain embodiments, the heat exchanger is positioned within the reaction chamber. In certain embodiments, the reaction chamber is configured to maintain oxidation of the fuel beneath a flameout temperature of the fuel. In certain embodiments, the method also includes the step of a turbine or a piston engine that receives gas from the reaction chamber and expands the gas. In certain embodiments, the method also includes the step of a compressor that receives and compresses gas, comprising a fuel mixture, prior to introduction of the fuel mixture into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of in a reaction chamber, with an inlet and an outlet, that is configured to maintain an oxidation process, determining when an inlet temperature of a gas, comprising an oxidizable fuel, at the inlet approaches or drops below an autoignition threshold of the fuel; and outputting a signal to increase the inlet temperature of the gas, such that the inlet temperature remains above the autoignition threshold.

In certain embodiments, the signal comprises instructions to heat the gas with a heat exchanger. In certain embodiments, the heat exchanger is positioned within the reaction chamber. In certain embodiments, the reaction chamber is configured to maintain oxidation of the fuel beneath a flameout temperature of the fuel. In certain embodiments, the reaction chamber is configured to maintain oxidation of the fuel below about 2300° F. In certain embodiments, the method also includes the step of a turbine or a piston engine that receives gas from the reaction chamber and expands the gas. In certain embodiments, the method also includes the step of a compressor that receives and compresses gas, comprising a fuel mixture, prior to introduction of the fuel mixture into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method described herein for oxidizing fuel in a system that receives a gas, comprising an oxidizable fuel, into an oxidizer having a reaction chamber with an inlet and an outlet, the reaction chamber being configured to maintain a gradual oxidation of the fuel without a catalyst, the method comprising detecting when a reaction chamber inlet temperature of the gas approaches or drops below an autoignition threshold of the gas, and outputting instructions to increase the inlet temperature such that the gas inlet temperature is maintained above the autoignition temperature, while a temperature within the reaction chamber remains below a flameout temperature.

In certain embodiments, the instructions increase heat transfer to the gas by a heat exchanger. In certain embodiments, the heat exchanger is positioned within the reaction chamber. In certain embodiments, the reaction chamber is configured to maintain oxidation of the fuel beneath a flameout temperature of the fuel. In certain embodiments, the reaction chamber is configured to maintain oxidation of the fuel beneath about 2300° F. In certain embodiments, the method also includes the step of a turbine or a piston engine that receives gas from the reaction chamber and expands the gas. In certain embodiments, the method also includes the step of a compressor that receives and compresses gas, comprising a fuel mixture, prior to introduction of the gas into the reaction chamber.

In certain embodiments, a method for oxidizing fuel described herein includes the step of in a reaction chamber, having an inlet and an outlet, that is configured to maintain an oxidation process, determining, with a sensor, when an inlet temperature of a gas, comprising an oxidizable fuel, at the inlet approaches an autoignition threshold of the gas; wherein an actual temperature within the reaction chamber is maintained at a level below the flameout temperature and above the autoignition threshold, such that gradual oxidation of the fuel is maintained within the reaction chamber.

In certain embodiments, a signal increase the inlet temperature of the gas to remain above the autoignition threshold. In certain embodiments, the signal comprises instructions to increase heat transfer to the gas by a heat exchanger. In certain embodiments, the heat exchanger is positioned within the reaction chamber.

In certain embodiments, a system for oxidizing fuel described herein includes an oxidizer having a reaction chamber with an inlet and an outlet, the reaction chamber configured to receive a gas comprising an oxidizable fuel through the inlet, and to maintain an oxidation process of the gas; and heat exchange media disposed within the reaction chamber, the media configured to maintain an internal temperature of the reaction chamber below a flameout temperature and to maintain a reaction chamber inlet temperature of the fuel to be greater than an autoignition temperature of the fuel; wherein the media is configured to circulate outside the reaction chamber and thereby draw heat from the reaction chamber to maintain the internal temperature below the flameout temperature.

In certain embodiments, circulation of the media is configured to heat gas at the inlet and to maintain the inlet temperature of the fuel above the autoignition temperature. In certain embodiments, circulation of the media is configured to draw heat from the gas within the reaction chamber to maintain the internal temperature of the gas beneath a flameout temperature of the gas. In certain embodiments, the media comprises a plurality of steel structures that is circulated through the reaction chamber. In certain embodiments, the media comprises a fluid that is circulated through the reaction chamber. In certain embodiments, a speed that the media circulates is based on at least one of the internal temperature and the inlet temperature. In certain embodiments, heat is drawn from the media when the media circulates outside the reaction chamber.

In certain embodiments, a system for oxidizing fuel described herein includes an oxidizer having a reaction chamber with an inlet and an outlet, the reaction chamber configured to receive a gas comprising an oxidizable fuel through the inlet, the oxidizer configured to maintain an oxidation process of the gas within the reaction chamber; and a recirculation pathway that directs at least a portion of product gas, after oxidation within the reaction chamber, toward the inlet of the reaction chamber and introduces the product gas into the reaction chamber at the inlet; wherein introduction of the product gas increases an inlet temperature of the gas to be above the autoignition temperature of the gas.

In certain embodiments, recirculation of the product gas decreases an oxygen content level within the reaction chamber. In certain embodiments, an amount of product gas that is recirculated is based on the inlet temperature. In certain embodiments, an amount of product gas that is recirculated is based on an internal temperature of the reaction chamber.

In certain embodiments, a system for oxidizing fuel described herein includes an oxidizer having a reaction chamber with an inlet and an outlet, the reaction chamber configured to receive a gas comprising an oxidizable fuel through the inlet, the oxidizer configured to maintain an oxidation process of the gas within the reaction chamber; and heat exchange media disposed within the reaction chamber, the media configured to maintain an internal temperature of the reaction chamber below a flameout temperature and to maintain a reaction chamber inlet temperature of the fuel to be greater than an autoignition temperature of the fuel.

In certain embodiments, the heat exchange media comprises a fluid. In certain embodiments, the fluid is circulated, and circulation of the media is configured to heat gas at the inlet and to maintain the inlet temperature of the gas above the autoignition temperature of the gas. In certain embodiments, the heat exchange media comprises sand. In certain embodiments, the heat exchange media comprises a plurality of uniformly stacked structures. In certain embodiments, the heat exchange media comprises a plurality of stacked disk, each having a plurality of apertures through which the gas is permitted to flow. In certain embodiments, heat exchange media is configured to conduct heat within the reaction chamber toward the inlet, whereby gas being received through the inlet is heated to above the autoignition temperature.

In certain embodiments, a split cycle reciprocating engine described herein includes an intake that receives an air-fuel mixture, the mixture comprising a mixture of air and a gas fuel; a compression chamber, coupled to the reciprocating engine that compresses the mixture in a reciprocating piston chamber; an oxidation chamber that is configured to receive the mixture from the compression chamber via a first inlet and to maintain oxidation of the mixture at an internal temperature beneath a flameout temperature of the mixture and sufficient to oxidize the mixture without a catalyst; and an expansion chamber, that receives oxidation product gas from the oxidation chamber and expands the product gas within the expansion chamber via a reciprocating piston.

In certain embodiments, the oxidation chamber is configured to maintain an inlet temperature of the mixture above an autoignition temperature of the mixture. In certain embodiments, the system also includes a heat exchanger that is configured to draw heat from the product gas and heat the mixture prior to introducing the mixture into the oxidation chamber. In certain embodiments, the heat exchanger comprises a tubein-tube heat exchanger. In certain embodiments, the system also includes a heat exchange media disposed within the oxidation chamber. In certain embodiments, the media is configured to maintain the internal temperature of the oxidation chamber below a flameout temperature by conducting heat toward the inlet of the oxidation chamber, and wherein media at the inlet of the oxidation chamber is cooled by the mixture being introduced into the oxidation chamber. In certain embodiments, the fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a split cycle reciprocating engine described herein includes a reciprocation cycle comprising at least one compression chamber having therein a reciprocating piston and at least one expansion chamber having therein a reciprocating piston; and a heating cycle comprising an intake that receives a gas air-fuel mixture comprising a mixture of air and a gas fuel, the intake being configured to direct the mixture to the compression chamber; a reaction chamber, configured to receive the mixture from the compression chamber and to maintain oxidation of the mixture at an internal reaction chamber temperature sufficient to oxidize the mixture without a catalyst; wherein the expansion chamber is configured to receive oxidation product gas from the reaction chamber and to expand the product gas within the expansion chamber via the reciprocating piston.

In certain embodiments, the reaction chamber comprises an inlet, and the reaction chamber is configured to maintain an inlet temperature of the mixture at the inlet above an autoignition temperature of the mixture. In certain embodiments, the system also includes a heat exchanger that is configured to draw heat from product gases of the reaction chamber and heat the mixture prior to introducing the mixture into the reaction chamber. In certain embodiments, the heat exchanger comprises a tube-in-tube heat exchanger. In certain embodiments, the product gases are directed back into the reaction chamber and combined with the air-fuel mixture introduced into the reaction chamber. In certain embodiments, the system also includes a heat exchange media disposed within the reaction chamber. In certain embodiments, the media is configured to maintain the internal temperature of the reaction chamber below a flameout temperature of the mixture by conducting heat toward an inlet of the reaction chamber, and wherein media at the inlet of the oxidation chamber is cooled by the mixture being introduced into the oxidation chamber. In certain embodiments, the fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of receiving a gas air-fuel mixture through an intake, the mixture comprising a mixture of air and a gas fuel; compressing the mixture with a compression chamber, the compression chamber being coupled to a reciprocating engine and compressing the mixture in a reciprocating piston chamber; oxidizing the mixture in a reaction chamber that is configured to receive the mixture from the compression chamber via an inlet and to maintain oxidation of the fuel at an internal temperature of the reaction chamber without a catalyst; and expanding heated product gas from the reaction chamber in a reciprocating piston chamber coupled to the reciprocating piston chamber, thereby driving the reciprocating engine.

In certain embodiments, the internal temperature of the reaction chamber is maintained beneath a flameout temperature of the fuel. In certain embodiments, the steps also include removing heat from the reaction chamber when a temperature in the reaction chamber approaches or raises above the flameout temperature. In certain embodiments, a temperature of the mixture at the inlet is maintained above an autoignition temperature of the mixture. In certain embodiments, the steps also include heating the mixture by a heat exchanger prior to oxidizing the mixture in the reaction chamber. In certain embodiments, the heat exchanger is located within the reaction chamber. In certain embodiments, an inlet temperature of the mixture at the inlet of the reaction chamber is beneath an autoignition temperature of the mixture. In certain embodiments, the mixture is heated within the heat exchanger to a temperature above the autoignition temperature.

In certain embodiments, a method for oxidizing fuel described herein includes the steps of compressing an air-fuel mixture, comprising a mixture of air and a gas fuel, in a reciprocating piston compression chamber coupled to a reciprocating engine; oxidizing the mixture in a reaction chamber, configured to receive the mixture from the compression chamber via a inlet, above an autoignition temperature of the fuel and beneath a flameout temperature of the fuel; and expanding product gas from the reaction chamber in a reciprocating piston chamber coupled to the reciprocating engine, thereby driving the reciprocating engine.

In certain embodiments, an internal temperature of the reaction chamber is maintained beneath a flameout temperature of the mixture. In certain embodiments, the method also includes the step of removing heat from the reaction chamber when an adiabatic temperature in the reaction chamber approaches or raises above the flameout temperature. In certain embodiments, a temperature of the mixture at the inlet is maintained above an autoignition temperature of the mixture. In certain embodiments, the method also includes the step of heating the mixture by a heat exchanger prior to oxidizing the fuel in the reaction chamber. In certain embodiments, the heat exchanger is located within the reaction chamber. In certain embodiments, an inlet temperature of the mixture at the inlet of the reaction chamber is beneath an autoignition temperature of the mixture. In certain embodiments, the mixture is heated within the heat exchanger to a temperature above the autoignition temperature.

In certain embodiments, a method for oxidizing fuel described herein includes the steps of directing an air-fuel mixture, comprising a mixture of air and a gas fuel, to be compressed in a reciprocating compression piston coupled to a reciprocating engine; directing the mixture from the compression piston to a reaction chamber, configured to gradually oxidize the mixture within the reaction chamber above an autoignition temperature of the mixture and beneath a flameout temperature of the mixture; and directing product gas from the reaction chamber to be expanded in a reciprocating expansion piston coupled to the reciprocating engine, thereby driving the reciprocating engine.

In certain embodiments, the method also includes the step of determining, with a sensor, when a temperature in the reaction chamber approaches or exceeds the flameout temperature. In certain embodiments, the method also includes the step of directing removal of heat from the reaction chamber when the temperature in the reaction chamber approaches the flameout temperature, such that the temperature in the reaction chamber is maintained below the flameout temperature. In certain embodiments, the method also includes the step of maintaining an internal temperature within the reaction chamber below about 2300° F.

In certain embodiments, a method for oxidizing fuel described herein includes the steps of determining an oxygen content level within the reaction chamber having an inlet and an outlet and configured to gradually oxidize a fuel, in a gas mixture, without a catalyst; outputting instructions to introduce flue gas, received from the outlet of the reaction chamber and containing product gases from oxidation of the fuel within the reaction chamber, into the reaction chamber based on the determined oxygen content level.

In certain embodiments, introducing the flue gas comprises mixing the flue gas with the gas mixture. In certain embodiments, the method also includes the step of determining if an internal temperature within the reaction chamber approaches a flameout temperature of the fuel. In certain embodiments, the method also includes the step of outputting instructions to reduce the internal temperature within the reaction chamber when an adiabatic temperature within the reaction chamber approaches the flameout temperature of the fuel. In certain embodiments, the instructions comprise removing heat from the reaction chamber. In certain embodiments, outputting instructions is configured to change a flameout temperature of the fuel within the reaction chamber. In certain embodiments, the method also includes the step of determining an inlet temperature of the gas mixture at the reaction chamber inlet. In certain embodiments, the method also includes the step of increasing a temperature of the gas mixture at the inlet when the inlet temperature approaches an autoignition temperature of the fuel, such that the inlet temperature is maintained above the autoignition temperature. In certain embodiments, increasing the temperature comprises mixing the flue gas with the gas mixture at or near the reaction chamber inlet.

In certain embodiments, a method for oxidizing fuel described herein includes the steps of determining at least one of an oxygen content level within the reaction chamber having an inlet and an outlet and configured to gradually oxidize a fuel, in a gas mixture, without a catalyst and an inlet temperature of the gas mixture at the reaction chamber inlet; based on at least one of the determined oxygen content level and the inlet temperature, introducing flue gas, received from the outlet of the reaction chamber and containing heated product gases from oxidation of the fuel within the reaction chamber, into the reaction chamber when at least one of the determined oxygen content level is approaching or beyond a predetermined threshold and the inlet temperature is approaching or below an autoignition temperature of the fuel.

In certain embodiments, introducing the flue gas comprises mixing the flue gas with the gas mixture. In certain embodiments, the method also includes the step of determining if an internal temperature within the reaction chamber approaches a flameout temperature of the fuel. In certain embodiments, the method also includes the step of reducing the internal temperature within the reaction chamber when an adiabatic temperature within the reaction chamber approaches the flameout temperature of the fuel. In certain embodiments, reducing the internal temperature comprises removing heat from the reaction chamber. In certain embodiments, the method also includes the step of comprising increasing the flameout temperature within the reaction chamber by reducing the oxygen content within the reaction chamber.

In certain embodiments, a method for oxidizing fuel described herein includes the steps of determining, with a processor, an oxygen content level within the reaction chamber having an inlet and an outlet and configured to gradually oxidize a fuel, in a gas mixture, without a catalyst; and based on the determined oxygen content level, introducing flue gas, received from the outlet of the reaction chamber and containing heated product gases from oxidation of the fuel within the reaction chamber, into the reaction chamber.

In certain embodiments, introducing the flue gas comprises mixing the flue gas with the gas mixture. In certain embodiments, the flue gas is mixed with the gas mixture at or near the reaction chamber inlet. In certain embodiments, the method also includes the step of determining if an internal temperature within the reaction chamber approaches or exceeds a flameout temperature of the fuel. In certain embodiments, the method also includes the step of reducing the internal temperature within the reaction chamber when an adiabatic temperature within the reaction chamber approaches or exceeds the flameout temperature of the fuel. In certain embodiments, reducing the internal temperature comprises removing heat from the reaction chamber. In certain embodiments, the method also includes the step of changing the flameout temperature within the reaction chamber by changing the oxygen content within the reaction chamber.

In certain embodiments, a method for oxidizing fuel described herein includes the steps of in a first reaction chamber, with an inlet and an outlet, that is configured to maintain a gradual oxidation process without a catalyst, determining when an inlet temperature of a gas mixture, comprising an oxidizable fuel, at the reaction chamber inlet approaches or drops below an autoignition temperature of the fuel; and when the inlet temperature is determined to approach or drop below the autoignition temperature of the fuel, increasing the inlet temperature of the gas mixture by introducing flue gas, comprising at least partially oxidized product gas from the reaction chamber, into the gas mixture at or near the inlet.

In certain embodiments, a method for oxidizing fuel described herein includes the steps of gradually oxidizing a first fuel, in a first gas mixture, in a first reaction chamber that is configured to maintain gradual oxidation of the first fuel within the first reaction chamber without a catalyst; introducing flue gas, comprising heated product gas from oxidation of the first fuel in the first reaction chamber, into a second reaction chamber; introducing a second fuel into the second reaction chamber; and oxidizing the second fuel in the second reaction chamber in a gradual oxidation process without a catalyst; wherein a first internal temperature within the first reaction chamber is maintained beneath a flameout temperature of the first fuel.

In certain embodiments, the method includes the step of maintaining a second internal temperature within the second reaction chamber beneath a flameout temperature of the second fuel. In certain embodiments, the method also includes the step of reducing the second internal temperature within the second reaction chamber when an adiabatic temperature within the second reaction chamber approaches or exceeds the flameout temperature of the second fuel within the second reaction chamber. In certain embodiments, reducing the second internal temperature comprises removing heat from the second reaction chamber. In certain embodiments, the flameout temperature of the second fuel is higher than the flameout temperature of the first fuel. In certain embodiments, the method also includes the step of reducing the first internal temperature within the first reaction chamber when an adiabatic temperature within the first reaction chamber approaches or exceeds the flameout temperature of the first fuel within the first reaction chamber. In certain embodiments, reducing the first internal temperature comprises removing heat from the first reaction chamber. In certain embodiments, the method also includes the step of determining a first inlet temperature of the gas mixture at the first reaction chamber inlet. In certain embodiments, the method also includes the step of increasing the first inlet temperature when the first inlet temperature approaches or drops below an autoignition temperature of the first fuel within the first reaction chamber, such that the first inlet temperature is maintained above the autoignition temperature. In certain embodiments, the method also includes the step of determining a second inlet temperature at a second reaction chamber inlet. In certain embodiments, the method also includes the step of increasing the second inlet temperature when the second inlet temperature approaches or drops below an autoignition temperature of the second fuel within the second reaction chamber, such that the second inlet temperature is maintained above the autoignition temperature. In certain embodiments, the method also includes the step of increasing the second inlet temperature comprises introducing the flue gas to mix with the second fuel at or near the second reaction chamber inlet.

In certain embodiments, a method for oxidizing fuel described herein includes the steps of gradually oxidizing a first fuel, in a first gas mixture, in a first reaction chamber that is configured to maintain gradual oxidation of the first fuel within the first reaction chamber without a catalyst; introducing flue gas, comprising heated product gas from oxidation of the first fuel in the first reaction chamber, into a second reaction chamber configured to maintain gradual oxidation without a catalyst; determining, with a processor, an oxygen content level within the second reaction chamber; introducing a second fuel into the second reaction chamber; and oxidizing the second fuel in the second reaction chamber in a gradual oxidation process without a catalyst.

In certain embodiments, an amount and distribution within the second chamber of the introduction of flue gas into the second chamber is based on the determined oxygen content level. In certain embodiments, a first internal temperature within the first reaction chamber is maintained beneath a flameout temperature of the first fuel. In certain embodiments, the method also includes the step of maintaining a second internal temperature within the second reaction chamber beneath a flameout temperature of the second fuel. In certain embodiments, the method also includes the step of reducing the second internal temperature within the second reaction chamber when an adiabatic temperature within the second reaction chamber approaches or exceeds the flameout temperature of the second fuel within the second reaction chamber. In certain embodiments, reducing the second internal temperature comprises removing heat from the second reaction chamber. In certain embodiments, the method also includes the step of reducing the first internal temperature within the first reaction chamber when an adiabatic temperature within the first reaction chamber approaches or exceeds the flameout temperature of the first fuel within the first reaction chamber. In certain embodiments, reducing the first internal temperature comprises removing heat from the first reaction chamber. In certain embodiments, the method also includes the step of determining a first inlet temperature of the gas mixture at the first reaction chamber inlet. In certain embodiments, the method also includes the step of increasing the first inlet temperature when the first inlet temperature approaches or drops below an autoignition temperature of the first fuel within the first reaction chamber, such that the first inlet temperature is maintained above the autoignition temperature. In certain embodiments, the method also includes the step of determining a second inlet temperature at a second reaction chamber inlet. In certain embodiments, the method also includes the step of increasing the second inlet temperature when the second inlet temperature approaches or drops below an autoignition temperature of the second fuel within the second reaction chamber, such that the second inlet temperature is maintained above the autoignition temperature. In certain embodiments, increasing the second inlet temperature comprises introducing the flue gas to mix with the second fuel at or near the second reaction chamber inlet.

In certain embodiments, a system for oxidizing fuel described herein includes a first reaction chamber with a first inlet and a first outlet, the first reaction chamber configured to receive a first gas comprising a first oxidizable fuel, the first reaction chamber configured to maintain a gradual oxidation process of the first fuel; and a second reaction chamber with a second inlet and a second outlet, the second reaction chamber configured to receive a second gas comprising a second oxidizable fuel, the second reaction chamber configured to maintain a gradual oxidation process of the second fuel; wherein the first and second reaction chambers are configured to maintain an internal temperature in the respective reaction chambers below a flameout temperature of the respective fuel; wherein the second reaction chamber is configured to receive flue gas comprising heated product gas from oxidation of the first fuel in the first reaction chamber, into a second reaction chamber through the second inlet.

In certain embodiments, the system includes a heat exchange media disposed within at least one of the reaction chambers, the media configured to maintain an internal temperature of the reaction chamber below an adiabatic flameout temperature. In certain embodiments, at least one of the first and second reaction chambers is configured to reduce the respective internal temperature when an adiabatic temperature within the respective reaction chamber approaches or exceeds the flameout temperature of the respective fuel. In certain embodiments, at least one of first and second reaction chambers is configured to reduce the respective internal temperature by removing heat from the respective reaction chamber by a heat exchanger. In certain embodiments, the heat exchanger comprises a fluid introduced into the respective reaction chamber. In certain embodiments, the heat exchanger is configured to evacuate the fluid from the respective reaction chamber. In certain embodiments, the heat exchanger comprises a means for generating steam.

In certain embodiments, the heat exchanger is configured to draw heat out of the respective reaction chamber when the temperature within the respective reaction chamber exceeds 2300° F. In certain embodiments, the first reaction chamber is configured to increase a temperature of the first gas at the first inlet when a first inlet temperature, at the first inlet, approaches or drops below an autoignition temperature of the first fuel. In certain embodiments, the second reaction chamber is configured to increase a temperature of the second gas at the second inlet when a second inlet temperature, at the second inlet, approaches or drops below an autoignition temperature of the second fuel.

In certain embodiments, the second reaction chamber is configured to mix the flue gas with the second gas when a second inlet temperature of the second gas at the second inlet approaches or drops below an autoignition temperature of the second fuel. In certain embodiments, distribution of the flue gas within the second reaction chamber is based on at least one of a second inlet temperature of the second gas at the second inlet and the internal temperature of the second reaction chamber. In certain embodiments, the system also includes a turbine or a piston engine that receives gas from at least one of the reaction chambers. In certain embodiments, the turbine receives gas from the second reaction chamber. In certain embodiments, a compressor that receives and compresses gas, comprising a fuel mixture, prior to introduction of the fuel mixture into at least one of the reaction chambers.

In certain embodiments, the compressor is configured to compress the second gas prior to introducing the second gas into the second reaction chamber.

In certain embodiments, a system for oxidizing fuel described herein includes an oxidizer having a reaction chamber configured to receive and oxidize a gas mixture comprising an oxidizable fuel in a gradual oxidation process within the reaction chamber; an inlet configured to introduce fluid into the reaction chamber during the oxidation process, the fluid being at an inlet temperature lower than an internal temperature of the reaction chamber, such that the fluid is heated as it is introduced into the reaction chamber; and an outlet configured to extract the heated fluid from the reaction chamber; wherein the reaction chamber is configured to maintain the internal temperature above an autoignition temperature of the fuel and below a flameout temperature of the fuel.

In certain embodiments, the inlet is configured to introduce a liquid into the reaction chamber. In certain embodiments, the liquid is introduced into the reaction chamber by passing through one or more coils within the reaction chamber. In certain embodiments, the coils are not in fluid communication with the reaction chamber. In certain embodiments, the liquid is introduced into the reaction chamber by injecting the liquid into the reaction chamber, such that the liquid mixes with the gas mixture within the reaction chamber. In certain embodiments, the inlet is configured to introduce the fluid into the reaction chamber as a gas. In certain embodiments, the gas is introduced into the reaction chamber by passing through one or more coils within the reaction chamber. In certain embodiments, the coils do not permit mixing of the gas and the gas mixture within the reaction chamber. In certain embodiments, the gas is introduced into the reaction chamber by injecting the gas into the reaction chamber, such that the gas mixes with the gas mixture within the reaction chamber. In certain embodiments, the outlet is configured to extract the heated fluid from the reaction chamber as a gas. In certain embodiments, the outlet is configured to redirect the gas into the reaction chamber, such that the gas mixes with the gas mixture within the reaction chamber. In certain embodiments, an adiabatic reaction temperature within the reaction chamber approaches a flameout temperature, the fluid is introduced into the reaction chamber. In certain embodiments, the inlet temperature is below an autoignition temperature of the fuel. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of directing a gas mixture, comprising an oxidizable fuel, to an oxidizer having a reaction chamber configured to receive and oxidize the fuel in a gradual oxidation process within the reaction chamber, the reaction chamber being configured to maintain an internal temperature above an autoignition temperature of the fuel and below a flameout temperature of the fuel; and introducing fluid into the reaction chamber during the oxidation process, the fluid being at an inlet temperature lower than the internal temperature of the reaction chamber, such that the fluid is heated as it is introduced into the reaction chamber; and extracting the heated fluid from the reaction chamber.

In certain embodiments, the fluid is introduced into the reaction chamber as a liquid. In certain embodiments, the liquid is introduced into the reaction chamber by passing through one or more coils within the reaction chamber. In certain embodiments, the liquid is injected into the reaction chamber, such that the liquid mixes with the gas mixture within the reaction chamber. In certain embodiments, the fluid is introduced into the reaction chamber as a gas. In certain embodiments, the gas is introduced into the reaction chamber by passing the gas through one or more coils within the reaction chamber. In certain embodiments, the gas is injecting the gas into the reaction chamber, such that the gas mixes with the gas mixture within the reaction chamber. In certain embodiments, the heated fluid is extracted from the reaction chamber as a heated gas. In certain embodiments, the method also includes the step of redirecting the heated gas into the reaction chamber, such that the heated gas mixes with the gas mixture within the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, an oxidizer for oxidizing fuel described herein includes a reaction chamber having one or more inlets that are configured to direct at least one gas of fuels, oxidants, or diluents, into the reaction chamber and one or more outlets that are configured to direct reaction products from the reaction chamber, and a heater that is configured to maintain a temperature of one or more of the at least one gas, at or before the one or more inlets, to above an autoignition temperature of a resulting mixture within the reaction chamber that comprises the at least one gas of fuels, oxidants, or diluents, and wherein the reaction chamber is configured to oxidize the mixture and maintain an adiabatic temperature and a maximum reaction temperature in the reaction chamber below a flameout temperature of the mixture.

In certain embodiments, the reaction chamber comprises a single inlet. In certain embodiments, the oxidizer is configured to change a flow rate that the mixture is introduced into the reaction chamber through the inlet. In certain embodiments, the heater comprises a heat exchanger that transfers heat from the reaction products to the mixture at or before the one or more inlets. In certain embodiments, the heater is configured to mix at least one of oxidants or diluents with fuel at or before the one or more inlets. In certain embodiments, the oxidizer is configured to use heat from the reaction products to generate steam. In certain embodiments, the oxidizer is configured to use heat from the reaction products to drive a generator for power generation. In certain embodiments, the oxidizer is configured to drive a generator by a turbine or a piston engine that is configured to expand the reaction products from the reaction chamber. In certain embodiments, the oxidizer is configured to use heat from the reaction products to heat material that is not passed through the oxidizer. In certain embodiments, the oxidizer is configured to change a flow rate that one or more of the at least one gas of fuels, oxidants, or diluents is introduced into the reaction chamber through the one or more inlets. In certain embodiments, the oxidizer is configured to change a flow rate that the reaction products are directed from the reaction chamber through the outlets. In certain embodiments, the oxidizer also includes a regulator that is configured to change at least one of a flow of the mixture or a pressure of the mixture at or near the inlet.

In certain embodiments, an oxidizer for oxidizing fuel described herein includes a reaction chamber having an inlet that is configured to direct at least one gas of fuels, oxidants, or diluents, into the reaction chamber and an outlet that is configured to direct reaction products from the reaction chamber, and means for maintaining a temperature of the incoming gas, at or before the inlet, to above an autoignition temperature of a resulting mixture within the reaction chamber that comprises the at least one gas of fuels, oxidants, or diluents, wherein the reaction chamber is configured to oxidize the mixture and maintain an adiabatic temperature and a maximum reaction temperature in the reaction chamber below a flameout temperature of the mixture.

In certain embodiments, the reaction chamber comprises a plurality of inlets. In certain embodiments, the reaction chamber comprises a plurality of outlets. In certain embodiments, the means for raising a temperature comprises a heat exchanger that transfers heat from the reaction products to the mixture at or before the inlet. In certain embodiments, the means for raising a temperature is configured to mix diluents with fuel at or before the inlet. In certain embodiments, the oxidizer is configured to use heat from the reaction products to generate steam. In certain embodiments, the oxidizer is configured to use heat from the reaction products to drive a generator for power generation. In certain embodiments, the oxidizer is configured to drive a generator by a turbine or a piston engine that is configured to expand the reaction products from the reaction chamber. In certain embodiments, the oxidizer is configured to use heat from the reaction products to heat material that is not passed through the oxidizer. In certain embodiments, the oxidizer is configured to change a flow rate that the mixture is introduced into the reaction chamber through the inlet. In certain embodiments, the oxidizer is configured to change a flow rate that the reaction products are directed from the reaction chamber through the outlet. In certain embodiments, the oxidizer also includes a regulator that is configured to change at least one of a flow of the mixture or a pressure of the mixture at or near the inlet. In certain embodiments, the oxidizer is configured to change a flow rate that one or more of the at least one gas of fuel, oxidants, or diluents is introduced into the reaction chamber through one or more inlets.

In certain embodiments an oxidizer for oxidizing fuel described herein include a reaction chamber having one or more inlets that are configured to direct at least one gas of fuels, oxidants, or diluents, into the reaction chamber and one or more outlets that are configured to direct reaction products from the reaction chamber; and a heater that is configured to maintain a temperature of one or more of the at least one gas, at or before the one or more inlets, to above an autoignition temperature of a resulting mixture within the reaction chamber that comprises the at least one gas of fuel, oxidants, or diluents, wherein the reaction chamber is configured to oxidize the mixture and maintain an adiabatic temperature within the reaction chamber above a flameout temperature of the mixture and a maximum reaction temperature within the reaction chamber below the flameout temperature of the mixture.

In certain embodiments, the oxidizer comprises a heat extractor that is configured to remove heat from the reaction chamber. In certain embodiments, the heat extractor is configured to remove heat from the reaction chamber by generating steam. In certain embodiments, the reaction chamber comprises a single inlet. In certain embodiments, the oxidizer is configured to change a flow rate that the mixture is introduced into the reaction chamber through the single inlet. In certain embodiments, the heater comprises a heat exchanger that transfers heat from the reaction products to the mixture at or before the one or more inlets. In certain embodiments, the heater is configured to mix diluents with fuel at or before the one or more inlets. In certain embodiments, the oxidizer is configured to use heat from the reaction products to generate steam. In certain embodiments, the oxidizer is configured to use heat from the reaction products to drive a generator for power generation. In certain embodiments, the oxidizer is configured to drive a generator by a turbine or a piston engine that is configured to expand the reaction products from the reaction chamber. In certain embodiments, the oxidizer is configured to use heat from the reaction products to heat material that is not passed through the oxidizer. In certain embodiments, the oxidizer is configured to change a flow rate that the reaction products are directed from the reaction chamber through the outlets. In certain embodiments, the oxidizer is configured to change a flow rate that one or more of the at least one gas of fuel, oxidants, or diluents is introduced into the reaction chamber through the one or more inlets. In certain embodiments, the oxidizer also includes a regulator that is configured to change at least one of a flow of the mixture or a pressure of the mixture at or near the inlet.

In certain embodiments, an oxidizer for oxidizing fuel described herein includes a reaction chamber having an inlet that is configured to direct at least one gas of fuel, oxidants, or diluents, into the reaction chamber and an outlet that is configured to direct reaction products from the reaction chamber, means for maintaining a temperature of the mixture, at or before the plurality of inlets, to above an autoignition temperature of the mixture, and means for maintaining a temperature of the incoming gas, at or before the inlet, to above an autoignition temperature of a resulting mixture within the reaction chamber that comprises the at least one gas of fuels, oxidants, or diluents, wherein the reaction chamber is configured to oxidize the mixture and maintain an adiabatic temperature within the reaction chamber above a flameout temperature of the mixture and a maximum reaction temperature within the reaction chamber below the flameout temperature of the mixture.

In certain embodiments, the reaction chamber comprises a plurality of inlets. In certain embodiments, the reaction chamber comprises a plurality of outlets. In certain embodiments, the means for raising a temperature comprises a heat exchanger that transfers heat from the reaction products to the mixture at or before the inlet. In certain embodiments, the means for raising a temperature is configured to mix diluents with fuel at or before the inlet. In certain embodiments, the oxidizer is configured to use heat from the reaction products to generate steam. In certain embodiments, the oxidizer is configured to use heat from the reaction products to drive a generator for power generation. In certain embodiments, the oxidizer is configured to drive a generator by a turbine or a piston engine that is configured to expand the reaction products from the reaction chamber. In certain embodiments, the oxidizer is configured to use heat from the reaction products to heat material that is not passed through the oxidizer. In certain embodiments, the oxidizer is configured to change a flow rate that the mixture is introduced into the reaction chamber through the inlet. In certain embodiments, the oxidizer is configured to change a flow rate that the reaction products are directed from the reaction chamber through the outlet. In certain embodiments, the oxidizer also includes a regulator that is configured to change at least one of a flow of the mixture or a pressure of the mixture at or near the inlet.

In certain embodiments, an oxidizer for oxidizing fuel described herein includes a reaction chamber having one or more inlets that are configured to direct at least one gas of fuels, oxidants, or diluents, into the reaction chamber and one or more outlets that are configured to direct reaction products from the reaction chamber; and a heater that is configured to maintain a temperature of one or more of the at least one gas, at or before the one or more inlets, to below an autoignition temperature of a resulting mixture within the reaction chamber that comprises the at least one gas of fuel, oxidants, or diluents, wherein and the reaction chamber is configured to oxidize the mixture and maintain an adiabatic temperature within the reaction chamber below a flameout temperature of the mixture and a maximum reaction temperature within the reaction chamber below the flameout temperature of the mixture.

In certain embodiments, the reaction chamber comprises a single inlet. In certain embodiments, the oxidizer is configured to change a flow rate that the mixture is introduced into the reaction chamber through the one or more inlets. In certain embodiments, the oxidizer is configured to change a flow rate that one or more of the at least one gas of fuel, oxidants, or diluents is introduced into the reaction chamber through the one or more inlets. In certain embodiments, the oxidizer also includes a heat exchanger that transfers heat from the reaction products to the mixture at or before the one or more inlets. In certain embodiments, the heater is configured to mix diluents with fuel at or before the one or more inlets. In certain embodiments, the oxidizer is configured to use heat from the reaction products to generate steam. In certain embodiments, the oxidizer is configured to use heat from the reaction products to drive a generator for power generation. In certain embodiments, the oxidizer is configured to drive a generator by a turbine or a piston engine that is configured to expand the reaction products from the reaction chamber. In certain embodiments, the oxidizer is configured to use heat from the reaction products to heat material that is not passed through the oxidizer. In certain embodiments, the oxidizer is configured to change a flow rate that the reaction products are directed from the reaction chamber through the outlets. In certain embodiments, the oxidizer also includes a regulator that is configured to change at least one of a flow of the mixture or a pressure of the mixture at or near the inlet.

In certain embodiments, an oxidizer for oxidizing fuel described herein includes a reaction chamber having an inlet that is configured to direct at least one gas of fuel, oxidants, or diluents, into the reaction chamber and an outlet that is configured to direct reaction products from the reaction chamber; and means for maintaining a temperature of the incoming gas, at or before the inlet, to below an autoignition temperature of a resulting mixture within the reaction chamber that comprises the at least one gas of fuel, oxidants, or diluents, wherein the reaction chamber is configured to oxidize the mixture and maintain an adiabatic temperature within the reaction chamber below a flameout temperature of the mixture and a maximum reaction temperature within the reaction chamber below the flameout temperature of the mixture.

In certain embodiments, the reaction chamber comprises a plurality of inlets. In certain embodiments, the reaction chamber comprises a plurality of outlets. In certain embodiments, the means for maintaining a temperature comprises a heat exchanger that transfers heat from the reaction products to the mixture at or before the inlet. In certain embodiments, the means for maintaining a temperature is configured to mix diluents with fuel at or before the inlet. In certain embodiments, the oxidizer is configured to use heat from the reaction products to generate steam. In certain embodiments, the oxidizer is configured to use heat from the reaction products to drive a generator for power generation. In certain embodiments, the oxidizer is configured to drive a generator by a turbine or a piston engine that is configured to expand the reaction products from the reaction chamber. In certain embodiments, the oxidizer is configured to use heat from the reaction products to heat material that is not passed through the oxidizer. In certain embodiments, the oxidizer is configured to change a flow rate that the mixture is introduced into the reaction chamber through the inlet. In certain embodiments, the oxidizer is configured to change a flow rate that the reaction products are directed from the reaction chamber through the outlet. In certain embodiments, the oxidizer includes a regulator that is configured to change at least one of a flow of the mixture or a pressure of the mixture at or near the inlet.

In certain embodiments, an oxidizer for oxidizing fuel described herein includes a reaction chamber having one or more inlets that are configured to direct at least one gas of fuel, oxidants, or diluents, into the reaction chamber and one or more outlets that are configured to direct reaction products from the reaction chamber, and a heater that is configured to maintain a temperature of one or more of the at least one gas, at or before the one or more inlets, to below an autoignition temperature of a resulting mixture within the reaction chamber that comprises the at least one gas of fuel, oxidants, or diluents, wherein the reaction chamber is configured to oxidize the mixture and maintain an adiabatic temperature within the reaction chamber above a flameout temperature of the mixture and a maximum reaction temperature within the reaction chamber below the flameout temperature of the mixture.

In certain embodiments, a heat extractor that is configured to remove heat from the reaction chamber. In certain embodiments, the heat extractor is configured to remove heat from the reaction chamber by generating steam. In certain embodiments, the oxidizer also includes a heat conveyor within the reaction chamber that is configured to distribute heat within the reaction chamber. In certain embodiments, the heat conveyor comprises a porous media within the reaction chamber. In certain embodiments, the heat conveyor comprises a fluid media within the reaction chamber. In certain embodiments, the heat conveyor comprises a media that is circulated through the reaction chamber. In certain embodiments, the reaction chamber comprises a single inlet. In certain embodiments, the oxidizer also includes a heat exchanger that transfers heat from the reaction products to the mixture at or before the one or more inlets. In certain embodiments, the heater is configured to mix diluents with fuel at or before the one or more inlets. In certain embodiments, the oxidizer is configured to use heat from the reaction products to drive a generator for power generation. In certain embodiments, the oxidizer is configured to drive a generator by a turbine or a piston engine that is configured to expand the reaction products from the reaction chamber. In certain embodiments, the oxidizer is configured to use heat from the reaction products to heat material that is not passed through the oxidizer. In certain embodiments, the oxidizer is configured to change a flow rate that one or more of the at least one gas of fuel, oxidants, or diluents is introduced into the reaction chamber through the one or more inlets. In certain embodiments, the oxidizer is configured to change a flow rate that the reaction products are directed from the reaction chamber through the outlets. In certain embodiments, the oxidizer also includes a regulator that is configured to change at least one of a flow of the mixture or a pressure of the mixture at or near the inlet.

In certain embodiments, an oxidizer for oxidizing fuel described herein includes a reaction chamber having an inlet that is configured to direct at least one gas of fuel, oxidants, or diluents, into the reaction chamber and an outlet that is configured to direct reaction products from the reaction chamber, and a heater for maintaining a temperature of the incoming gas, at or before the inlet, to below an autoignition temperature of a resulting mixture within the reaction chamber that comprises the at least one gas of fuel, oxidants, or diluents, wherein the reaction chamber is configured to oxidize the mixture and maintain an adiabatic temperature within the reaction chamber above a flameout temperature of the mixture and a maximum reaction temperature within the reaction chamber below the flameout temperature of the mixture.

In certain embodiments, the oxidizer includes means for removing heat from the reaction chamber. In certain embodiments, the means for removing heat is configured to remove heat from the reaction chamber by generating steam. In certain embodiments, the oxidizer also includes means for distributing heat within the reaction chamber. In certain embodiments, the means for distributing heat comprises a porous media within the reaction chamber. In certain embodiments, the means for distributing heat comprises a fluid media within the reaction chamber. In certain embodiments, the means for distributing heat comprises a media that is circulated through the reaction chamber. In certain embodiments, the reaction chamber comprises a plurality of inlets. In certain embodiments, the reaction chamber comprises a plurality of outlets. In certain embodiments, the heater comprises a heat exchanger that transfers heat from the reaction products to the mixture at or before the inlet. In certain embodiments, the heater is configured to mix diluents with fuel at or before the inlet.

In certain embodiments, the oxidizer is configured to use heat from the reaction products to drive a generator for power generation. In certain embodiments, the oxidizer is configured to drive a generator by a turbine or a piston engine that is configured to expand the reaction products from the reaction chamber. In certain embodiments, the oxidizer is configured to use heat from the reaction products to heat material that is not passed through the oxidizer. In certain embodiments, the oxidizer is configured to change a flow rate that one or more of the at least one gas of fuel, oxidants, or diluents is introduced into the reaction chamber through the inlet. In certain embodiments, the oxidizer is configured to change a flow rate that the reaction products are directed from the reaction chamber through the outlet. In certain embodiments, the oxidizer also includes a regulator that is configured to change at least one of a flow of the mixture or a pressure of the mixture at or near the inlet.

In certain embodiments, a system for oxidizing fuel described herein includes a first reaction chamber having a first inlet and a first outlet, the first reaction chamber being configured to receive a first gas, comprising an oxidizable fuel, through the first inlet, the first reaction chamber configured to maintain gradual oxidation of the first gas and to communicate flue gas through the first outlet; and a second reaction chamber, separate from the first reaction chamber, having a second inlet and a second outlet, the second reaction chamber being configured to receive a second gas, comprising an oxidizable fuel, and the flue gas through the second inlet, the second reaction chamber configured to maintain gradual oxidation of the second gas; wherein the flue gas is communicated from the first outlet to the second inlet until an internal temperature within the second reaction chamber is above an autoignition temperature of the second gas.

In certain embodiments, the flue gas is not communicated from the first outlet to the second inlet after the internal temperature is above the autoignition temperature. In certain embodiments, at least one of the first or second reaction chambers is configured to reduce a respective internal temperature when the internal temperature within the respective reaction chamber approaches or exceeds a flameout temperature of the respective fuel. In certain embodiments, at least one of first or second reaction chambers is configured to reduce the respective internal temperature by removing heat from the respective reaction chamber. In certain embodiments, at least one of first or second reaction chambers is configured to remove heat by a heat exchanger. In certain embodiments, the heat exchanger comprises a fluid introduced into the respective reaction chamber. In certain embodiments, the heat exchanger is configured to evacuate the fluid from the respective reaction chamber. In certain embodiments, the heat exchanger comprises a means for generating steam. In certain embodiments, the heat exchanger is configured to draw heat out of the respective reaction chamber when the temperature within the respective reaction chamber exceeds 2300° F. In certain embodiments, the second reaction chamber is configured to mix the flue gas with the second gas when a temperature of the second gas at the second inlet approaches or drops below the autoignition temperature of the second fuel. In certain embodiments, the system also includes a turbine or a piston engine that receives gas from at least one of the reaction chambers. In certain embodiments, the turbine receives and expands gas from the second reaction chamber. In certain embodiments, the system also includes a compressor that receives and compresses gas prior to introduction of the gas into at least one of the reaction chambers. In certain embodiments, the compressor is configured to compress the second gas prior to introducing the second gas into the second reaction chamber.

In certain embodiments, a system for oxidizing fuel described herein includes a first reaction chamber having an outlet, the first reaction chamber being configured to maintain gradual oxidation of a first gas, comprising an oxidizable fuel, and to communicate reaction products through the first outlet; and a second reaction chamber, separate from the first reaction chamber, having an inlet that is configured to receive a second gas, comprising an oxidizable fuel, and the reaction products, the second reaction chamber being configured to maintain gradual oxidation of the second gas and to receive the reaction products from the first reaction chamber through the inlet while an internal temperature within the second reaction chamber is below an autoignition temperature of the second gas.

In certain embodiments, the reaction products are not communicated to the second reaction chamber from the first reaction chamber after the internal temperature is above the autoignition temperature. In certain embodiments, at least one of the first or second reaction chambers is configured to reduce a respective internal temperature when the internal temperature within the respective reaction chamber approaches or exceeds a flameout temperature of the respective fuel. In certain embodiments, at least one of first or second reaction chambers is configured to reduce the respective internal temperature by removing heat from the respective reaction chamber. In certain embodiments, the second reaction chamber is configured to mix the reaction products with the second gas when a temperature of the second gas at the inlet approaches or drops below the autoignition temperature of the second fuel. In certain embodiments, the system also includes a turbine or a piston engine that receives gas from at least one of the reaction chambers. In certain embodiments, the turbine receives and expands gas from the second reaction chamber. In certain embodiments, the system also includes a compressor that receives and compresses gas prior to introduction of the gas into at least one of the reaction chambers. In certain embodiments, the compressor is configured to compress the second gas prior to introducing the second gas into the second reaction chamber.

In certain embodiments, a system for oxidizing fuel described herein includes an oxidizer having a reaction chamber with an inlet and an outlet, the reaction chamber configured to receive a gas comprising an oxidizable fuel through the inlet and to maintain an oxidation process; a detection module that detects when a reaction chamber temperature of the gas approaches or drops below an autoignition threshold of the gas within the reaction chamber, such that the reaction chamber will not oxidize the fuel; and a correction module that outputs instructions, based on the detection module, to change at least one of a residence time of the gas within the reaction chamber and an autoignition delay time within the reaction chamber sufficient for the gas to autoignite and oxidize while within the reaction chamber.

In certain embodiments, the correction module is configured to change the residence time of the gas within the reaction chamber by altering flow of the gas through the reaction chamber. In certain embodiments, the correction module is configured to increase the residence time of the gas within the reaction chamber by decreasing flow of the gas through the reaction chamber. In certain embodiments, the correction module is configured to increase the residence time of the gas within the reaction chamber by recirculating flow of the gas from the outlet to the inlet of the reaction chamber. In certain embodiments, the correction module is configured to change the autoignition delay time within the reaction chamber by changing a gas temperature within the reaction chamber. In certain embodiments, the correction module is configured to decrease the autoignition delay time within the reaction chamber by increasing a gas temperature within the reaction chamber with a heater. In certain embodiments, the correction module is configured to decrease the autoignition delay time within the reaction chamber by circulating product gas from the outlet to the inlet. In certain embodiments, the reaction chamber is configured to maintain oxidation of the oxidizable fuel beneath the flameout temperature without a catalyst. In certain embodiments, the system also includes a turbine or a piston engine that receives gas from the reaction chamber and expands the gas. In certain embodiments, the system also includes a compressor that receives and compresses gas, comprising a fuel mixture, prior to introduction of the fuel mixture into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a system for oxidizing fuel described herein includes an oxidizer having a reaction chamber with an inlet and an outlet, the reaction chamber configured to receive a gas comprising an oxidizable fuel through the inlet and to maintain an oxidation process, a detection module that detects when a reaction chamber temperature of the gas approaches or drops below an autoignition threshold of the gas within the reaction chamber, such that the reaction chamber will not oxidize the fuel, and a correction module that is configured to determine, with a processor and based on the detection module, a change to at least one of a residence time of the gas within the reaction chamber and an autoignition delay time within the reaction chamber sufficient for the gas to autoignite and oxidize while within the reaction chamber, wherein the oxidizer is configured to, based on the change to at least one of the residence time and the autoignition delay time, oxidize the gas while the gas is within the reaction chamber.

In certain embodiments, the correction module is configured to change the residence time of the gas within the reaction chamber by altering flow of the gas through the reaction chamber. In certain embodiments, the correction module is configured to increase the residence time of the gas within the reaction chamber by decreasing flow of the gas through the reaction chamber. In certain embodiments, the correction module is configured to increase the residence time of the gas within the reaction chamber by recirculating flow of the gas from the outlet to the inlet of the reaction chamber. In certain embodiments, the correction module is configured to change the autoignition delay time within the reaction chamber by changing a gas temperature within the reaction chamber. In certain embodiments, the correction module is configured to decrease the autoignition delay time within the reaction chamber by increasing a gas temperature within the reaction chamber with a heater. In certain embodiments, the correction module is configured to decrease the autoignition delay time within the reaction chamber by circulating product gas from the outlet to the inlet. In certain embodiments, the reaction chamber is configured to maintain oxidation of the oxidizable fuel beneath the flameout temperature without a catalyst.

In certain embodiments, a system for oxidizing fuel described herein include an oxidizer having a reaction chamber with an inlet and an outlet, the reaction chamber configured to receive a gas comprising an oxidizable fuel through the inlet and to maintain an oxidation process, and a module that outputs instructions, based on detection of a reaction chamber temperature, to increase at least one of a residence time of the gas within the reaction chamber and a reaction temperature within the reaction chamber, such that the fuel oxidizes while in the reaction chamber.

In certain embodiments, the module is configured to change the residence time of the gas within the reaction chamber by altering flow of the gas through the reaction chamber. In certain embodiments, the module is configured to increase the residence time of the gas within the reaction chamber by decreasing flow of the gas through the reaction chamber. In certain embodiments, the module is configured to increase the residence time of the gas within the reaction chamber by recirculating flow of the gas from the outlet to the inlet of the reaction chamber. In certain embodiments, the module is configured to decrease the autoignition delay time within the reaction chamber by increasing a gas temperature within the reaction chamber with a heater. In certain embodiments, the correction module is configured to decrease the autoignition delay time within the reaction chamber by circulating product gas from the outlet to the inlet.

In certain embodiments, a method for oxidizing fuel described herein includes the steps of in an oxidation system that receives a gas comprising an oxidizable fuel into a reaction chamber having an inlet and an outlet and being configured to maintain an oxidation process, detecting when a reaction chamber temperature of the gas approaches or drops below a level such that the reaction chamber alone will not support oxidation of the fuel, and changing, based on the detection module, at least one of a residence time of the gas within the reaction chamber and an autoignition delay time within the reaction chamber sufficient for the gas to autoignite and oxidize while within the reaction chamber.

In certain embodiments, the residence time of the gas is changed within the reaction chamber by altering flow of the gas through the reaction chamber. In certain embodiments, the residence time of the gas is changed within the reaction chamber by decreasing flow of the gas through the reaction chamber. In certain embodiments, the residence time of the gas is changed within the reaction chamber by recirculating flow of the gas from the outlet to the inlet of the reaction chamber. In certain embodiments, the autoignition delay time within the reaction chamber is changed by changing a gas temperature within the reaction chamber. In certain embodiments, the autoignition delay time is decreased within the reaction chamber by increasing a gas temperature within the reaction chamber with a heater. In certain embodiments, the autoignition delay time is decreased by circulating product gas from the outlet to the inlet. In certain embodiments, the reaction chamber maintains oxidation of the oxidizable fuel beneath the flameout temperature without a catalyst. In certain embodiments, the method also includes the step of expanding product gas from the reaction chamber in a turbine or a piston engine. In certain embodiments, the method also includes the step of compressing the gas prior to introducing the gas into the reaction chamber. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the steps of in an oxidation system that receives a gas comprising an oxidizable fuel into a reaction chamber having an inlet and an outlet and being configured to maintain an oxidation process, detecting when a reaction chamber temperature of the gas approaches or drops below a level such that the reaction chamber alone will not support gradual oxidation of the fuel, and changing, based on the detection module, an autoignition delay time within the reaction chamber sufficient for the gas to autoignite and oxidize while within the reaction chamber.

In certain embodiments, changing the autoignition delay time comprises introducing additional heat into the reaction chamber, thereby increasing an internal reaction chamber temperature to a level that will maintain oxidation of the fuel. In certain embodiments, the method also includes the step of changing the residence time of the gas within the reaction chamber by altering flow of the gas through the reaction chamber. In certain embodiments, the method also includes the step of changing the residence time of the gas within the reaction chamber by decreasing flow of the gas through the reaction chamber. In certain embodiments, the method also includes the step of changing the residence time of the gas within the reaction chamber by recirculating flow of the gas from the outlet to the inlet of the reaction chamber. In certain embodiments, the reaction chamber maintains oxidation of the oxidizable fuel beneath the flameout temperature without a catalyst. In certain embodiments, the method also includes the step of expanding product gas from the reaction chamber in a turbine or a piston engine. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method for oxidizing fuel described herein includes the step of maintaining oxidation of an oxidizable fuel by introducing a heat source into the reaction chamber, thereby increasing an internal reaction chamber temperature to a level that will maintain oxidation of the fuel when a reaction chamber temperature of the gas approaches or drops below a temperature level such that the reaction chamber alone will not support oxidation of the fuel.

In certain embodiments, increasing the internal temperature decreases autoignition delay time. In certain embodiments, the method also includes the step of changing the residence time of the gas within the reaction chamber by altering flow of the gas through the reaction chamber. In certain embodiments, the method also includes the step of changing the residence time of the gas within the reaction chamber by decreasing flow of the gas through the reaction chamber. In certain embodiments, the method also includes the step of changing the residence time of the gas within the reaction chamber by recirculating flow of the gas from the outlet to the inlet of the reaction chamber. In certain embodiments, the reaction chamber maintains oxidation of the oxidizable fuel beneath the flameout temperature without a catalyst. In certain embodiments, the method also includes the step of expanding product gas from the reaction chamber in a turbine or a piston engine. In certain embodiments, the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method of oxidizing a fuel described herein includes the steps of mixing a gas having a low-energy-content (LEC) fuel with one or more of the group of a gas comprising a high-energy-content (HEC) fuel, a gas comprising an oxidant, and a gas comprising a diluent to form a gas mixture, wherein all of the gases are at temperatures below the autoignition temperature of any of the gases being mixed; increasing the temperature of the gas mixture to at the least an autoignition temperature of the gas mixture and allowing the gas mixture to autoignite; and maintaining the temperature of the gas mixture below a flameout temperature while the autoignited gas mixture oxidizes.

In certain embodiments, the gas mixture is raised to at least the autoignition temperature by a heat exchanger. In certain embodiments, the heat exchanger is positioned within a reaction chamber that maintains oxidation of the gas mixture without a catalyst. In certain embodiments, the gas mixture is raised to at least the autoignition temperature within a reaction chamber that maintains oxidation of the gas mixture without a catalyst. In certain embodiments, the reaction chamber maintains oxidation of the mixture beneath a flameout temperature of the gas mixture. In certain embodiments, the method also includes the step of expanding gas with a turbine or a piston engine that receives the gas from the reaction chamber. In certain embodiments, the gas mixture comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, a method of oxidation described herein includes the steps of heating a gas comprising an oxidant to at the least an auto-ignition temperature of a first gas mixture comprising a gas with an oxidant mixed with determined ranges of a low-energy-content (LEC) fuel and a high-energy-content (HEC) fuel; injecting, after the heating, a second gas mixture of the LEC fuel gas and the HEC fuel, wherein the ratio of the LEC and HEC gas and the rate of injection are selected to produce substantially the same first gas mixture ratios when injected into the heated gas containing an oxidant; mixing the injected second gas with the heated gas containing an oxidant at a rate to produce a substantially homogeneous first gas mixture in a time less than the ignition delay time for the second gas mixture and allowing the first gas mixture to auto-ignite; and maintaining the temperature of the first gas mixture below a flameout temperature while the auto-ignited first gas mixture oxidizes.

In certain embodiments, the first gas mixture is raised to at least the autoignition temperature by a heat exchanger. In certain embodiments, the heat exchanger is positioned within a reaction chamber that maintains oxidation of the first gas mixture without a catalyst. In certain embodiments, the first gas mixture is raised to at least the autoignition temperature within a reaction chamber that maintains oxidation of the gas mixture without a catalyst. In certain embodiments, the reaction chamber maintains oxidation of the second gas mixture beneath a flameout temperature of the gas mixture. In certain embodiments, the method also includes the step of expanding gas with a turbine or a piston engine that receives the gas from the reaction chamber. In certain embodiments, the first gas mixture comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide. In certain embodiments, In certain embodiments, a method of oxidization described herein includes the steps of receiving into a reaction chamber, via a chamber inlet, the inlet configured to accept a gas having a mixture of a low-energy-content (LEC) fuel and at least one of the group of a high-energy-content (HEC) fuel, an oxidant-comprising (OC) gas, and a diluent-containing (DC) gas, the gas mixture being at a temperature below an auto-ignition temperature of the gas mixture; maintaining an internal temperature of the reaction chamber below a flameout temperature by heat exchange media disposed within the reaction chamber, maintaining a reaction chamber inlet temperature of the fuel to be greater than an autoignition temperature of the fuel by transferring heat through the heat exchange media, and directing gas entering the inlet through a first path through media that is hotter than an auto-ignition temperature of the gas mixture until the gas mixture reaches a temperature above the auto-ignition temperature of the gas mixture; and directing the gas through a second path through the media to a chamber outlet, the second path being generally opposite to the first flow path.

In certain embodiments, the reaction chamber maintains oxidation of the gas mixture without a catalyst. In certain embodiments, the reaction chamber maintains oxidation of the mixture beneath a flameout temperature of the gas mixture by circulating the heat exchange media outside the reaction chamber. In certain embodiments, the method also includes the step of expanding gas with a turbine or a piston engine that receives the gas from the reaction chamber outlet. In certain embodiments, the gas mixture comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, an oxidizer described herein includes a reaction chamber having an inlet and an outlet, the inlet configured to accept a gas having a mixture of a low-energy-content (LEC) fuel and at least one of the group of a high-energy-content (HEC) fuel, an oxidant-comprising (OC) gas, and a diluent-containing (DC) gas, the gas mixture being at a temperature below an auto-ignition temperature of the gas mixture; a heat exchange media disposed within the reaction chamber, the media configured to maintain an internal temperature of the reaction chamber below a flameout temperature and to maintain a reaction chamber inlet temperature of the fuel to be greater than an autoignition temperature of the fuel; and at least one flow path through the chamber from the inlet to the outlet, the flow path configured to direct the gas entering the inlet through a first path through media that is hotter than an auto-ignition temperature of the gas mixture until the gas mixture reaches a temperature above the auto-ignition temperature of the gas mixture, whereupon the flow path is further configured to direct the oxidizing gas mixture through a second path through the media to the outlet, the second path being generally opposite to the first flow path.

In certain embodiments, the reaction chamber is configured to maintain oxidation of the gas mixture along at least one of the first and second flow paths without a catalyst. In certain embodiments, the reaction chamber is configured to maintain oxidation of the mixture beneath the flameout temperature of the gas mixture by circulating heat exchange media outside the reaction chamber. In certain embodiments, the system also includes at least one of a turbine or a piston engine that is configured to receive gas from the reaction chamber outlet and expand the gas. In certain embodiments, the gas mixture comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, an oxidizer described herein includes a reaction chamber having an inlet and an outlet, the inlet configured to accept a gas having a mixture of a low-energy-content (LEC) fuel and at least one of the group of a high-energy-content (HEC) fuel, an oxidant-comprising (OC) gas, and a diluent-containing (DC) gas, the gas mixture being at a temperature below an auto-ignition temperature of the gas mixture; and a heat controller that is configured to increase a temperature of the gas mixture to at the least an autoignition temperature of the gas mixture, thereby permitting the gas mixture to autoignite and to maintain the temperature of the gas mixture below a flameout temperature while the autoignited gas mixture oxidizes.

In certain embodiments, the heat controller comprises a heat exchanger that is configured to raise the temperature of the mixture to at least the autoignition temperature. In certain embodiments, the heat exchanger is positioned within the reaction chamber. In certain embodiments, the heat exchanger is configured to heat the mixture to above the autoignition temperature after the mixture is within the reaction chamber. In certain embodiments, the reaction chamber is configured to maintain oxidation of the mixture beneath a flameout temperature of the gas mixture without a catalyst. In certain embodiments, the system also includes at least one of a turbine or a piston engine that receives gas from the reaction chamber and expands the gas. In certain embodiments, the gas mixture comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, an oxidizer described herein includes a reaction chamber having an inlet and an outlet, the inlet configured to accept a gas having a mixture of a low-energy-content (LEC) fuel and at least one of the group of a high-energy-content (HEC) fuel, an oxidant-comprising (OC) gas, and a diluent-containing (DC) gas, the gas mixture being at a temperature below an auto-ignition temperature of the gas mixture; a heat controller that is configured to heat the gas to at the least an auto-ignition temperature of a first gas mixture, comprising a gas with an oxidant mixed with determined ranges of a low-energy-content (LEC) fuel and a high-energy-content (HEC) fuel; an injector that is configured to inject, after the first gas is heated to at the least an auto-ignition temperature of a first gas mixture, a second gas mixture of the LEC fuel gas and the HEC fuel, wherein the injector injects a ratio of the LEC and HEC gas and at a rate of injection that is selected to produce substantially the same ratio of LEC and HEC gas as the first gas mixture when the gas is injected into the reaction chamber, wherein the reaction chamber is configured to mix the injected second gas with the heated gas containing an oxidant at a rate to produce a substantially homogeneous first gas mixture in a time less than the ignition delay time for the second gas mixture and allowing the first gas mixture to auto-ignite and to maintain the temperature of the first gas mixture below a flameout temperature while the auto-ignited first gas mixture oxidizes.

In certain embodiments, the heat controller comprises a heat exchanger that is configured to raise the temperature of the mixture to at least the autoignition temperature. In certain embodiments, the heat exchanger is positioned within the reaction chamber. In certain embodiments, the reaction chamber is configured to maintain oxidation of the first gas mixture within the reaction chamber without a catalyst. In certain embodiments, the reaction chamber is configured to maintain oxidation of the second gas mixture beneath a flameout temperature of the gas mixture without a catalyst. In certain embodiments, the system also includes at least one of a turbine or a piston engine that is configured to receive gas from the reaction chamber and to expand the gas. In certain embodiments, the first gas mixture comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

The details of one or more embodiments of these concepts are set forth in the accompanying drawings and the description below. Other features, objects, and advantages of these concepts will be apparent from the description and drawings, and from the claims. As described herein various embodiments referenced above or described below may be used together and in conjunction with other embodiments described or suggested herein. The separate discussion of different embodiments should not be construed, unless otherwise clearly described, as meaning that the embodiments are distinct or cannot be combined, as embodiments described in one portion, figure, section, or paragraph can be combined with other embodiments described elsewhere.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

FIG. 1-1B is a schematic representation of a conventional catalytic oxidizer system.

FIG. 1-1C is a schematic representation of a conventional oxidizer system that includes a recuperator.

FIG. 1-1D is a schematic representation of a conventional regenerative oxidizer system.

FIG. 1-2A is a diagram of the ignition energy of an air-methane mixture.

FIG. 1-2B is a diagram of the reaction temperatures of various combustion and oxidation processes.

FIG. 1-3 is a diagram of the gradual oxidation of a pre-mixed air-fuel mixture according to certain aspects of the present disclosure.

FIG. 1-4A is a diagram of the gradual oxidation of a fuel mixture when injected into pre-heated air according to certain aspects of the present disclosure.

FIG. 1-4B is a diagram of the gradual oxidation process used to heat an external fluid according to certain aspects of the present disclosure.

FIG. 1-4C is a diagram of a multi-stage gradual oxidation process according to certain aspects of the present disclosure.

FIG. 1-5 is a flow chart of an exemplary gradual oxidation process of a pre-mixed air-fuel mixture according to certain aspects of the present disclosure.

FIG. 1-6 is a flow chart of an exemplary gradual oxidation process of a fuel mixture that is injected into pre-heated air according to certain aspects of the present disclosure.

FIG. 1-7 is a schematic diagram of an exemplary pre-mix oxidation system according to certain aspects of the present disclosure.

FIG. 1-8 is a schematic diagram of an exemplary injection gradual oxidation system according to certain aspects of the present disclosure.

FIG. 1-9 is a schematic representation of an exemplary turbine-driven power-generation system according to certain aspects of the present disclosure.

FIG. 1-10 is a schematic representation of another turbine-driven power-generation system according to certain aspects of the present disclosure.

FIG. 1-11 is a cutaway view of an exemplary GO reaction chamber with direct fuel or air-fuel mixture according to certain aspects of the present disclosure.

FIG. 1-12 schematically depicts the flow through a gradual oxidation system having a sparger according to certain aspects of the present disclosure.

FIG. 1-13 is a schematic representation of a multi-stage GO reaction chamber according to certain aspects of the present disclosure.

FIG. 1-14 is a schematic representation of a fluidized bed GO reaction chamber according to certain aspects of the present disclosure.

FIG. 1-15A is a schematic representation of a recirculating bed GO reaction chamber according to certain aspects of the present disclosure.

FIG. 1-15B is a schematic representation of another recirculating bed GO reaction chamber according to certain aspects of the present disclosure.

FIG. 1-16 is a schematic representation of a GO reaction chamber with flue gas recirculation according to certain aspects of the present disclosure.

FIGS. 1-17A and 17B depict a GO reaction chamber with structured reaction elements according to certain aspects of the present disclosure.

FIG. 2-1 is a schematic representation of an oxidizer coupled to a heat exchanger to provide process heating to an industrial process according to certain aspects of the present disclosure.

FIG. 2-2 is a schematic representation of an oxidizer coupled to a heating chamber to heat a process material according to certain aspects of the present disclosure.

FIG. 2-3 is a schematic representation of an oxidizer comprising an internal heat exchanger through which a process gas passes according to certain aspects of the present disclosure.

FIG. 2-4 is a schematic representation of another embodiment of an oxidizer comprising a plurality of internal heat exchangers through which a process gas passes according to certain aspects of the present disclosure.

FIG. 2-5 is a schematic representation of an oxidizer comprising a plurality of gradual oxidation zones with adjoining reaction zones wherein batches of a process material are heated according to certain aspects of the present disclosure.

FIG. 2-6 is a schematic representation of an oxidizer comprising a plurality of gradual oxidation zones with adjoining reaction zones wherein continuous flows of a process material are heated according to certain aspects of the present disclosure.

FIGS. 2-7A and 2-7B are a perspective view and a cross-section view of an example design detail of an oxidizer element according to certain aspects of the present disclosure.

FIG. 2-8 is a plot of the temperatures with the oxidizer of FIGS. 2-7A and 2-7B according to certain aspects of the present disclosure.

FIG. 2-9 is a perspective view of an oxidizer assembly using the oxidizer element of FIGS. 2-7A and 2-7B according to certain aspects of the present disclosure.

FIG. 3-1 is a schematic of an exemplary Schnepel cycle power generation system according to certain aspects of the present disclosure.

FIG. 3-2 is a conceptual depiction of the power generation system of FIG. 3-1 according to certain aspects of the present disclosure.

FIGS. 3-3 to 3-10 are schematic representation of additional embodiments of Schnepel cycle power generation systems according to certain aspects of the present disclosure.

FIG. 4-1 is a three-stage gradual oxidizer fluid heater system according to certain aspects of the present disclosure.

FIG. 4-2 is another embodiment of a three-stage gradual oxidizer fluid heater system according to certain aspects of the present disclosure.

FIG. 4-3 is another embodiment of a single-stage recuperative fluid heating system according to certain aspects of the present disclosure.

FIG. 4-4 is another embodiment of a two-stage water-tube type of steam generation system according to certain aspects of the present disclosure.

FIG. 4-5 is another embodiment of a two-stage fire-tube type of fluid heating system according to certain aspects of the present disclosure.

FIG. 4-6 schematically depicts the flow through a gradual oxidation system, which generates steam, having a sparger according to certain aspects of the present disclosure.

FIG. 5-1 is a schematic diagram of an exemplary gradual oxidation system incorporating steam generation and additional fuel injection according to certain aspects of the present disclosure.

FIG. 5-2 is a schematic diagram of an exemplary gradual oxidation system incorporating steam generation and cogeneration according to certain aspects of the present disclosure.

FIG. 5-3 is a schematic diagram of an exemplary gradual oxidation system incorporating dual compressors with intercooling according to certain aspects of the present disclosure.

FIG. 5-4 is a schematic diagram of an exemplary gradual oxidation system incorporating a starter gradual oxidizer according to certain aspects of the present disclosure.

FIG. 5-5 is a schematic diagram of an exemplary gradual oxidation system incorporating multiple points of water injection according to certain aspects of the present disclosure.

FIG. 5-6 is a diagram of the typical gas content of the exhaust of various systems.

DETAILED DESCRIPTION

Figures 1, 1A:
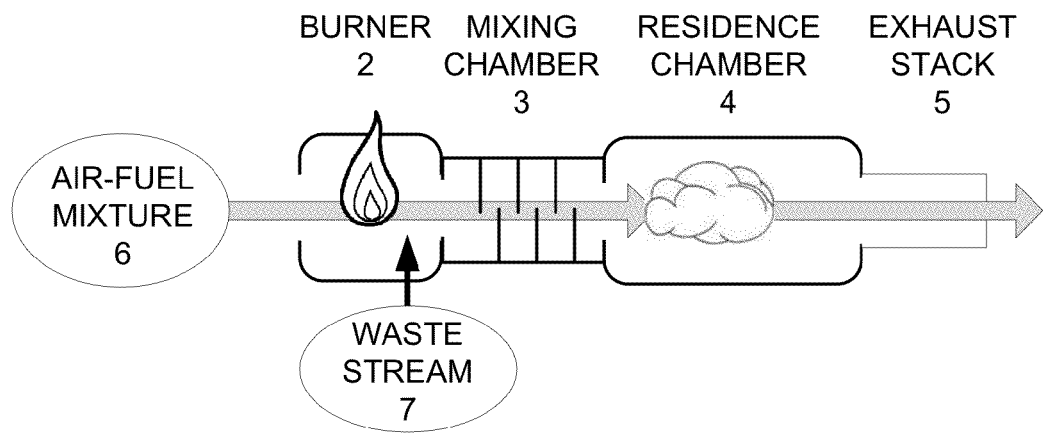
FIG. 1-1A is a schematic representation of a conventional fired or supplemental-fired oxidizer system for disposing of a waste stream containing VOCs.
Figures 1, 1B:
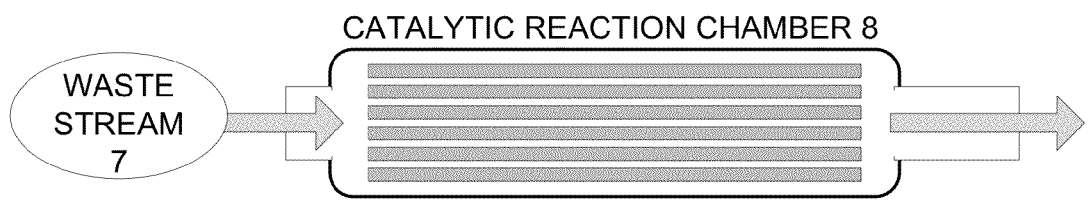
Figures 1, 1C:
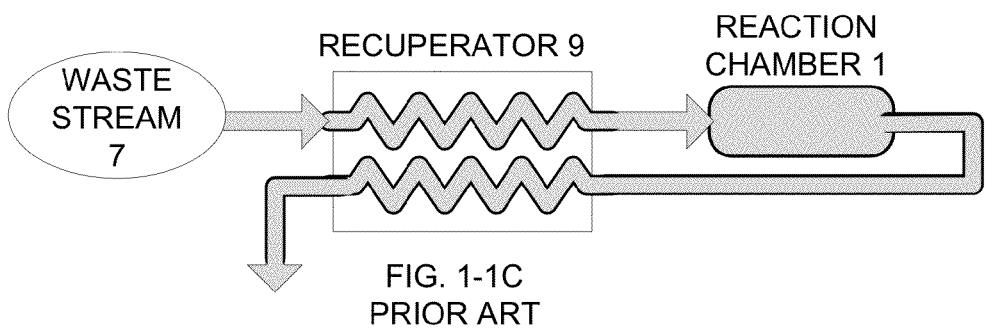
Figures 1, 1D:
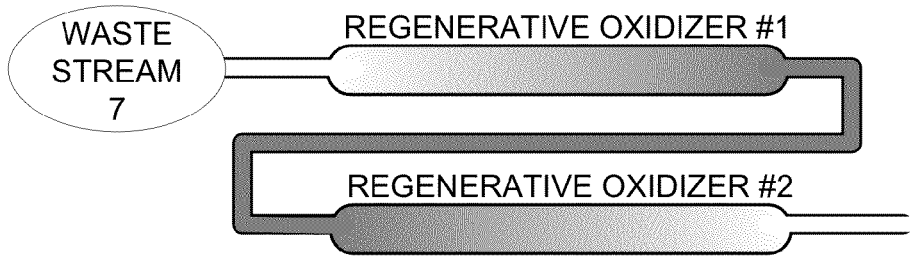

The following description discloses embodiments of a system for oxidation of a gas that comprises an oxidizable fuel. In certain embodiments, the system includes an oxidizer that can operate to gradually oxidize fuel while maintaining a temperature within the oxidizer below a flameout temperature, so that formation of undesirable pollutants, e.g., nitrogen oxide (NOx) and carbon monoxide (CO), is significantly limited. The fuel desirably enters the oxidizer at or near an autoignition temperature of the fuel. The system is particularly adapted for utilization of a fuel with low energy content, such as a methane content below 5%, in a sustainable gradual oxidation process to drive a turbine that further drives a power generator as well as driving a compressor in the system.

In the following detailed description, numerous specific details are set forth to provide an understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

Certain embodiments of methods and systems disclosed herein are presented in terms of a turbine system that drives a power generator using a low-energy-content fluid, such as a methane-containing gas, as a primary fuel and a higher-energy-content fluid, such as natural gas or commercial propane, as an auxiliary fuel. Nothing in this disclosure should be interpreted, unless specifically stated as such, to limit the application of any method or system disclosed herein to a particular primary or auxiliary fuel or a turbine system of this particular configuration. Other configurations of turbine-compressor systems are known to those of skill in the art can be used, and the components and principles disclosed herein can be applied to these other systems.

Certain embodiments of methods and systems disclosed herein are presented in terms of an oxidizer coupled to a reciprocating-piston system that drives a power generator. Nothing in this disclosure should be interpreted, unless specifically stated as such, to limit the application of any method or system disclosed herein with respect to a turbine system, such as the use of an auxiliary fuel during a portion of the operation, from application to a reciprocating-piston system or a combination of reciprocating-piston and turbine systems.

Certain embodiments of methods and systems disclosed herein are presented in terms of integrated process equipment that utilizes a GO process separately or integrally with material processing functions. Nothing in this disclosure should be interpreted, unless specifically stated as such, to limit the application of any method or system disclosed herein with respect to a turbine system or reciprocating-piston system, such as the use of an auxiliary fuel during a portion of the operation, from application to integrated process equipment or a combination of one or more of the reciprocating-piston systems, turbine systems, and integrated process equipment.

Within this document, the term "NOx" refers to a group of oxides of nitrogen that includes nitric oxide and nitrogen dioxide (NO and NO2). There are at least three commonly acknowledged processes that form NOx. "Thermal NOx" is formed when oxygen and nitrogen present in the combustion air dissociate in the high temperature area of the combustion zone and subsequently react to form oxides of nitrogen. "Prompt NOx" is formed in the proximity of the flame front as fuel fragments attack molecular nitrogen to form products such as HCN and N, which are then oxidized to form NOx. "Fuel NOx" is formed by fuel compounds containing nitrogen, e.g., amines and cyano species, when fuels containing nitrogen are burned. Diatomic nitrogen (N2) is not considered a fuel-bound nitrogen that will generate fuel NOx.

Within this document, the term "flammable" refers to a characteristic of a material wherein the material will combine with oxygen in an exothermic self-sustaining or self-propagating reaction when the material and oxygen are present within a defined range of relative amounts. It may require an initiating event, such as a spark or flame, to initiate the exothermic reaction.

Within this document, the terms "lower flammability limit" (LFL), sometimes called the "lower explosive limit," and "upper flammability limit" (UFL), sometimes called the "rich flammability limit" or "upper explosion limit," refer to the volumetric fuel concentration where a flame can exist. Concentrations below the LFL or above the UFL will not cause a flame reaction to sustain or propagate.

Within this document, the term "low-energy-content fuel" (LEC fuel) refers to a gas that comprises a flammable gas as a secondary component and an inert gas as a primary component. A non-limiting example of an LEC fuel is the methane-containing gas that is emitted from a landfill or other waste disposal site. For example, LEC methane gas typically contains less than about 30% methane, but may contain as low as 1-5% methane.

Within this document, the term "high-energy-content fuel" (HEC fuel) refers to a gas that comprises a flammable gas as a primary component. HEC fuel may contain secondary components that are naturally mixed with the primary component, inert, or cannot be economically removed. A non-limiting example of a HEC fuel is "commercial propane," the composition of which varies locally, but generally contains >85% propane (C3H8) and allows up to 10% propylene, up to 10% ethane (C2H8), up to 2.5% butane (C4H10) and heavier hydrocarbons, and may include ~0.01% of an odorant, usually ethyl mercaptan. A second non-limiting example of a HEC fuel is "natural gas," wherein a typical unrefined composition may contain as little as 70% methane and a combined 20% or more of ethane, propane, and butane as well as smaller amounts of carbon dioxide (CO2), oxygen (O2), nitrogen (N2), and hydrogen sulfide (H2S). A third non-limiting example is a landfill gas comprising more than about 50% methane with the balance $CO_2$, $N^2$, and a little $O_2$.

Within this document, the term "oxidant" refers to a gas that comprises sufficient oxygen to support combustion or oxidation of a flammable fuel. A nonlimiting example of an oxidant is ambient air.

Within this document, the term "diluent" refers to a generally inert gas. Nonlimiting examples of a diluent are commercial CO2, N2, and H2O. Diluents can be present in the oxidation products or the fuel reactants.

Within this document, the term "generally inert" is used to refer to a material or mixture that does not contain enough flammable material or oxygen to support combustion or oxidation when mixed with either oxygen or fuel when supplied with an ignition source.

Within this document, the term "combustible concentration" refers to the amount of flammable material present in a mixture, wherein the concentration is usually expressed in terms of a ratio of the flammable material in a mixture to the total gas.

Within this document, the term "gradual oxidation" refers to a process where a material combines with oxygen in an exothermic reaction while the material remains below a determined temperature during the entire process. A non-limiting example of such a determined temperature is 2300° F., wherein oxidation processes that stay below this temperature will not form generally significant amounts of NOx with respect to air pollution regulations and standards.

Within this document, the term "air-fuel mixture" refers to a mixture of a combustible fuel and an oxidant, and preferably to a gaseous mixture comprising air. An air-fuel mixture is considered to be generally homogeneous unless stated otherwise. In certain circumstances, an LEC or HEC fuel is mixed with ambient air to form an air-fuel mixture. In certain circumstances, an LEC fuel may contain sufficient oxygen and fuel to be considered an air-fuel mixture without the further addition of air or fuel.

Within this document, the term "autoignition" refers to the spontaneous initiation of an oxidation or combustion process in a mixture comprising flammable material and an oxidant. The autoignition temperature is the minimum temperature at which an oxidation or combustion process will occur in the absence of an ignition source and may depend on the pressure and/or the oxygen and fuel concentrations of the mixture.

Within this document, the term "autoignition delay time" refers to the amount of time a for a mixture, at a temperature above the autoignition temperature, to oxidize and release the majority of its exothermic energy. By way of illustration, methane has an autoignition temperature of about 1000° F. If a mixture of methane and air is raised to 1000° F., then it will eventually react to produce H2O and CO2. However, if this same mixture is brought up to a higher temperature, for example 1200° F., then the ignition delay time might be 2 seconds. If the mixture is brought up to 1400° F., then the delay might be 100 milliseconds. Autoignition delay time is generally exponentially faster with higher temperatures, and is a function of fuel and oxygen concentrations. Autoignition delay times can be calculated with chemical kinetic software programs using complex kinetic mechanisms that can include hundreds of reactions and tens of molecular and radial species.

Within this document, the term "premixed" refers to mixing of air and flammable material, such as an LEC or HEC fuel, to form a generally homogeneous air-fuel mixture prior to introducing the mixture into a chamber in which oxidation or combustion will take place.

Within this document, the terms "short residence time" is defined relative to combustion apparatus such as conventional combustion engines, gas turbine combustors, reciprocating engines, burners for boilers, etc. In these conventional combustors, the combustion process is completed within a time period that is typically well below 1 second, usually below 100 milliseconds, and can be below 10 milliseconds. A process having a residence time closer to 1 second, or exceeding 1 second, is termed as having a "long residence time."

Within this document, the term "volatile organic compound" (VOC) refers to organic compounds that will enter a gas phase when at a temperature in the range of 40-120° F. and may combine with oxygen in an exothermic reaction. Examples of VOCs include, but are not limited to, acetone, acrolein, acrylonitrile, allyl alcohol, allyl chloride, benzene, butene-1, chlorobenzene, 1-2 dichloroethane, ethane, ethanol, ethyl acrylate, ethylene, ethyl formate, ethyl mercaptan, methane, methyl chloride, methyl ethyl ketone, propane, propylene, toluene, triethylamine, vinyl acetate, and vinyl chloride.

Within this document, the term "maximum reaction temperature" refers to the maximum temperature of the chemical oxidation reaction, which includes heat transfer or work losses or additions. For example, if heat is removed simultaneously while the reaction occurs, the maximum reaction temperature will be less that the adiabatic reaction temperature. Similarly, the maximum reaction temperature can be higher than the adiabatic reaction temperature if heat is added.

Within this document, "flame strain rate" or "flame stretch" refers to coupling of the turbulent straining of the flame front, either by stretching or curvature, that removes heat from the flame front. High rates of flame stretch can be created with strong shear layers, and if the strain rate is high enough, can extinguish a flame.

Within this document, the term "adiabatic reaction temperature" refers to the temperature that results from a complete chemical oxidation reaction that occurs without any work, heat transfer, or changes in kinetic or potential energy. This is sometimes referred to as a constant-volume adiabatic reaction temperature.

Within this document, the term "flameout temperature" refers to the temperature of a substantially uniformly mixed air-fuel mixture below which a flame will not propagate through the mixture. In some instances, by way of example and as shown herein, the flameout temperature may be equivalent to the LFL at any particular temperature of the air-fuel mixture.

Gradual Oxidation

Figures 1, 2, 2A:
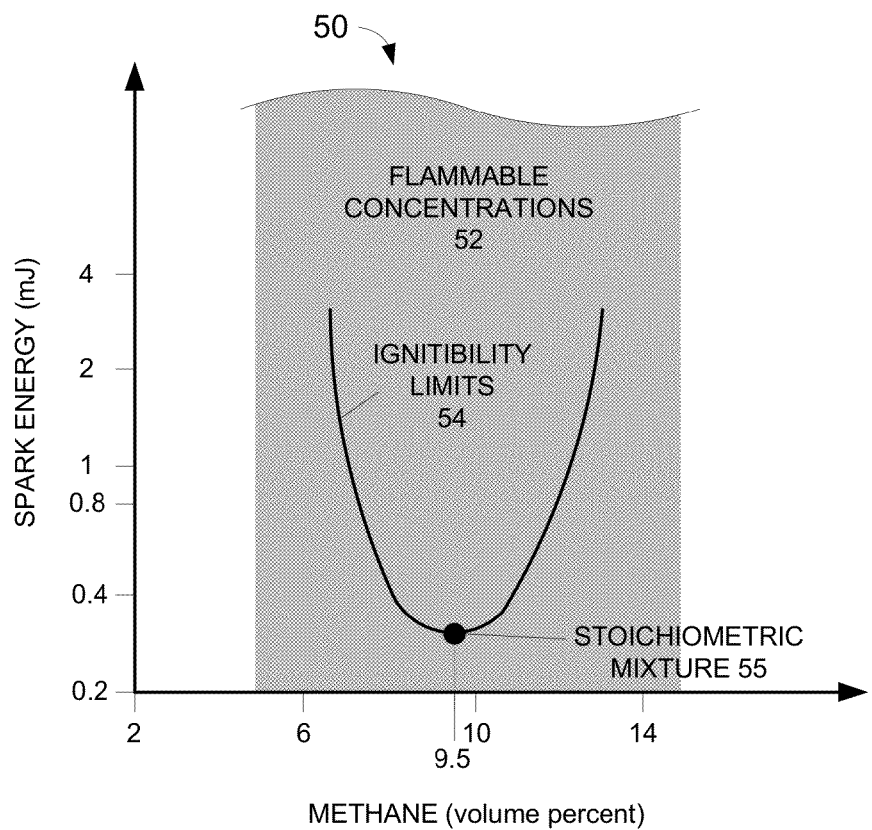

FIG. 1-2A is a diagram of the ignition energy for an air-methane mixture. A mixture of methane and air is flammable in the range of approximately 5-15%, by volume, of methane. A stoichiometric mixture of methane and air, i.e., a mixture having precisely enough oxygen to combine with the methane, is approximately 9.5%, by volume. FIG. 1-2A shows that a stoichiometric air-methane mixture 55 requires the least ignition energy and that increased energy is needed at lower and higher methane concentrations to ignite the mixture.

Figures 1, 2, 2B:
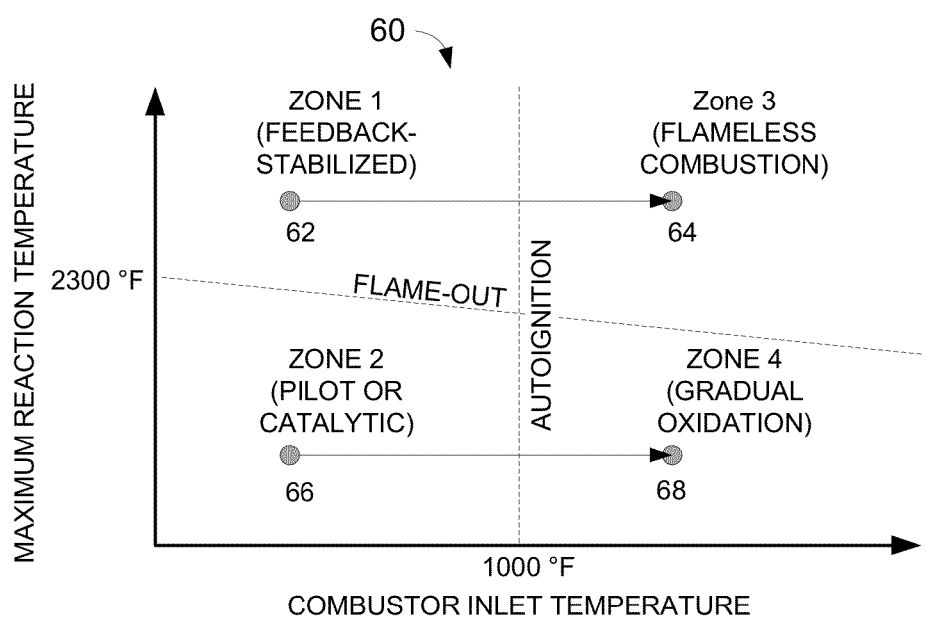

FIG. 1-2B is a diagram of the reaction temperatures of various combustion and oxidation processes, as depicted by system 60. In Zone 1, the combustion must be propagated by an energy source. With a flowing source of mixture, as typical in combustion devices, the energy source to stabilize combustion must be relatively constant with respect to time. This energy source is typically created by creating a hot local pocket of hot combustion products in a recirculation zone. These zones are created behind bluff bodies or other geometric features (V-gutters, corner recirculation zones). A second method is to swirl a portion of the mixture sufficiently such that "vortex breakdown" occurs, and a recirculation zone is formed inside or behind the swirling mixture. These types of flame stabilization techniques are well-known in the combustion art. The hot recirculation zone serves as a continuous ignition source to keep the premixed fuel and air mixture in Zone 1 constantly burning.

In Zone 2 of FIG. 1-2B, a flame, even when initiated by a spark or other ignition source, will not propagate through an air-fuel mixture. The uniform air-fuel mixture is too lean to burn. One method to react a premixed air-fuel mixture in this zone is to lower the activation energy of the reaction with a catalyst. Another method is to provide a locally richer mixture within the combustion chamber. This locality would have a combustible concentration, and therefore reaction temperatures consistent with Zone 1. This richer mixture burns and keeps a flame within the combustion chamber, however, propagating the reaction into the lean regions within the combustion chamber will not occur by flame propagation and will have to be performed using gas mixing techniques.

Zone 1 and Zone 2 are separated by a line indicating the flameout temperature over a range of temperatures. One cannot maintain a flame with a premixed fuel concentration that results in an adiabatic reaction temperature below this line. To expand on this, if one starts with a premixed flame in Zone 1 and slowly reduces the fuel concentration, the flame temperature, which in this case is the maximum reaction temperature shown as the Y-axis of FIG. 1-2, will decrease. When the temperature approaches the flameout temperature line, the flame will be extinguished.

A homogeneous air-fuel mixture in Zone 3 of FIG. 1-2B will autoignite and react relatively quickly. The challenge of this "flameless combustion" quadrant is to uniformly mix the fuel and air and bring the mixture to the desired temperature before the air-fuel mixture ignites. For example, if one mixes the fuel and air at a temperature below the autoignition limit, as designated by point "62" in Zone 1, then any unplanned spark will ignite the mixture while still in Zone 1. In addition, once the air-fuel mixture is fully mixed at point "62", the air-fuel mixture is heated to point "64" by, for example, a heat exchanger or other heating method.

Practitioners of flameless combustion avoid the challenge of mixing at low temperatures without combustion by mixing the fuel with hot air in Zone 3. To prevent ignition from occurring prior to reaching a uniform mixture, the autoignition is delayed by the use of one of two techniques. One technique is to inject the fuel into a mixture of air and recirculated flue gas. The flue gas has, relative to air, excess $CO_2$ and $H_2O$ and a reduced amount of $O_2$. The reduced $O_2$ concentration will delay autoignition, thereby permitting the mixture of the fuel with the air-flue gas mixture to reach a generally homogeneous composition.

A second technique is to induce "flame strain rate" or "flame stretch" to delay autoignition. Strained flames are flames that occur in highly turbulent flows with strong shear layers. They create a turbulent-chemistry interaction which delays reactions and, in extreme cases, can extinguish flames. To implement flame stretch, the fuel is injected into a turbulent air flow, e.g. the air is emitted from a nozzle at a high velocity and the fuel is injected into the stream of emitted air. The air-fuel mixture reaches a generally homogeneous composition before the flow of the air-fuel mixture becomes non-turbulent, and flame stretch causes the delay of autoignition during this mixing period. It is possible to combine the two techniques and inject the fuel into a jet of an oxidant that comprises a mixture of air and recirculated flue gas, thereby delaying the autoignition of the oxidant-fuel mixture by both a reduction in the $O_2$ concentration and flame stretch, thereby achieving a distributed reaction throughout the chamber.

One aspect of the flame structure in Zone 1 is that the oxidation reaction takes place in a relatively narrow reaction zone, called the flame front. In this locality, heat from the post-combustion zone and chemical radicals from the flame are diffusing, both molecularly and turbulently, into the unreacted gases. In Zone 2, reaction occurs locally near the catalyst, and is termed heterogeneous combustion. Only Zones 3 and 4 are capable of a volumetrically-distributed reaction due to the autoignition initiating the reaction, as opposed to thermal feedback from an existing flame.

Zone 4 is the region wherein the fuel concentration is too low to sustain a flame, i.e. below the flameout temperature line, and hot enough to autoignite. Gradual oxidation is suitable for the oxidation of fuels in this zone. In contrast to Zones 1-2, reactions in Zone 4 may occur relatively uniformly within the entire reactor/combustor volume with no well-defined 'reaction flame front.'

Figures 1, 2, 3:
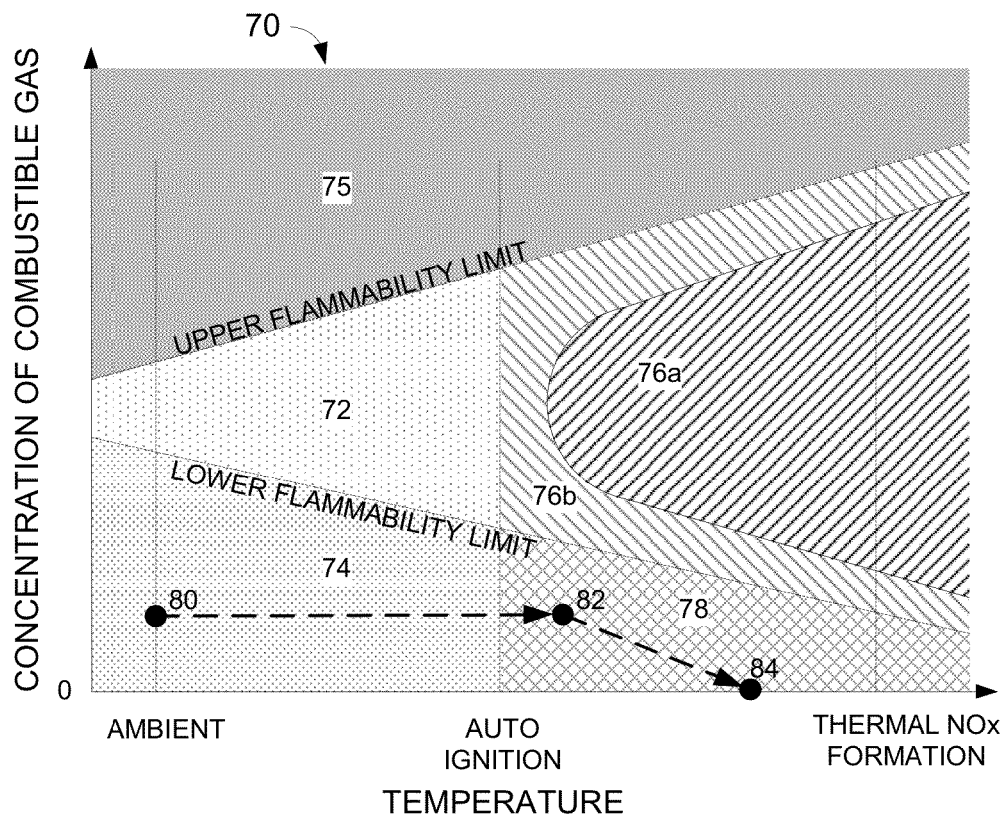

FIG. 1-3 is a schematic diagram of an exemplary gradual oxidation process according to certain aspects of the present disclosure. FIG. 1-3 shows the various regions, numbered 72, 74, 75, 76a, 76b, and 78, of flame reaction behavior for a homogenous air-fuel mixture at a constant pressure. The ordinate is the temperature of the air-fuel mixture and the abscissa is the concentration of fuel in the air-fuel mixture. The LFL becomes lower, i.e., a leaner combustible concentration, as the temperature of the air-fuel mixture increases. The UFL becomes higher, i.e. a richer combustible concentration, as the temperature increases. It can be seen that a wider range of combustible concentrations becomes flammable as the temperature increases.

Zone 72 is a region where a mixture will not autoignite, but a flame will propagate through the air-fuel mixture after the introduction of a sufficient energy source. The usual form of energy introduction is a spark from a spark plug or igniter, although other devices such as glow plugs or ionized plasmas could be used.

Zone 74 lies below the LFL and below the autoignition temperature. In this region, a flame, even if initiated by a spark, will not propagate through the mixture.

Zone 76 is broken into two zones 76a and 76b to account for the time to complete the reaction. If a spark occurs within Zones 76a or 76b, a flame will be initiated and will propagate through the air-fuel mixture. Air-fuel mixtures in Zones 76a or 76b may also autoignite because the energy contained by the air-fuel mixture at these temperatures exceeds the activation energy of the air-fuel mixture, as previously discussed with respect to FIG. 1-2B. The minimum temperature at which a mixture will autoignite, given enough time, is known as the autoignition temperature (AIT). Zone 76 is bounded by the AIT and the UFL and LFL, and any mixture having a combustible concentration and a temperature within Zone 76b or 76a will autoignite. Combustion of air-fuel mixtures in Zone 76a will autoignite and react in a timeframe shorter than a short residence time. Air-fuel mixtures at combustible concentrations and temperatures in Zone 76b will also autoignite and react, but will react in a timeframe consistent with a long residence time.

In Zone 78, a spark or other energy source will not initiate a flame nor will a flame propagate through the air-fuel mixture. It is possible to oxidize the fuel through autoignition by allowing enough time for the oxidation reactions to complete. The time for these reactions in Zone 78 is consistent with a long residence time.

Zone 75 is irrelevant to most combustion devices. A flame cannot propagate through an air-fuel in Zone 75 as the combustible composition is too rich. If an oxidation process were to be initiated in the portion of Zone 75 that is above the autoignition temperature, there is not enough air to complete the oxidation of the fuel and the oxidation process will self-extinguish, resulting in unburned fuel being exhausted from the combustion device.

In certain aspects, a process starting at point 80 heats an air-fuel mixture to a temperature above an autoignition temperature of the air-fuel mixture, indicated by point 82. A reaction chamber, such as reaction chamber 500 of FIG. 1-11, is configured to oxidize the air-fuel mixture and maintain an adiabatic temperature and a maximum reaction temperature in the reaction chamber below the flameout temperature of the air-fuel mixture, as indicated by the dashed line connecting points 82 and 84 remaining below the LFL.

FIG. 1-4A is a diagram of the gradual oxidation of a fuel mixture when injected into pre-heated air according to certain aspects of the present disclosure. In this process, ambient air at point "92" in Zone 74 is heated by various means (heat exchange, compression) to point "94" in Zone 78. Fuel, which may be LEC fuel, diluted HEC fuel, or a mixture of HEC and LEC fuels, is then added to the hot air, thereby moving the air-fuel mixture from point "94" to point "96" that would be within the Zone 76a of FIG. 1-3 wherein the air-fuel mixture would autoignite and, since point "96" is within Zone 76a of FIG. 1-3, the combustion reaction would occur rapidly, consistent with a short residence time. As the combustion process progresses, the temperature of the air-fuel would rise while the concentration of combustible gas drops and the process would follow the arrow from point "96" to point "98." As point "98" is above the thermal NOx formation temperature, this process would produce a greater quantity of NOx than a process that remains below the thermal NOx formation temperature.

However, if a diluent, such as recirculated flue gas, is added to the air, the oxygen content of the resulting air-diluent mixture is reduced. The use of hot recirculated flue gas can also aid in heating the air from point "92" to point "94." The addition of the diluent to the air, as well as the use of flame stretch mixing technique in mixing fuel into the air-diluent mixture, moves the upper and lower flammability limits to new lines annotated as "UFL (air+diluent+stretch)" and "LFL (air+diluent+stretch)" as shown in FIG. 1-4A.

With the addition of a diluent and use of a flame stretch mixing technique, point "96" is no longer in Zone 76a but is in Zone 76b, where the reaction process would be delayed, longer than in Zone 76a. The diluents within the mixture reduce the temperature rise so that the process follows the arrow from point "96" to point "99" and remains under the thermal NOx formation temperature. Thus, use of a diluent can reduce the amount of NOx produced by the combustion/oxidation process.

In certain aspects, a process starting at point 92 heats air to a temperature, indicated by point 82, above an autoignition temperature of a target air-fuel mixture. Fuel is then injected into the hot air, bringing the sair-fuel mixture to point 97. A reaction chamber, such as reaction chamber 500 of FIG. 1-11, is configured to oxidize the air-fuel mixture and maintain an adiabatic temperature within the reaction chamber above a flameout temperature of the mixture and a maximum reaction temperature within the reaction chamber below the flameout temperature of the mixture, as indicated by the dashed line connecting points 97 and 98 quickly transitioning to below the LFL.

FIG. 1-4B is a diagram 120 of the gradual oxidation process used to heat an external fluid according to certain aspects of the present disclosure. Ambient air at point 92 is heated to point 94, wherein fuel is injected into the pre-heated air taking the air-fuel mixture to point 96. As the air-fuel mixture is above the auto ignition temperature, gradual oxidation will begin while, at the same time, the air-fuel mixture is transferring heat to an external fluid, for example through a steam coil 5220 of FIG. 5-3, such that the temperature of the air-fuel mixture drops as the fuel concentration also declines to point 122. The air-fuel mixture then moves away from the external fluid and continues to gradually oxidize without losing heat to an external fluid such that the temperature of the air-fuel mixture rises as the fuel concentration continues to decline, thereby moving to point 124 where the fuel has been completely consumed.

FIG. 1-4C is a diagram 130 of a multi-stage gradual oxidation process according to certain aspects of the present disclosure. An ambient-temperature air-fuel mixture at point 132 is heated to point 134 that is above the autoignition temperature such that gradual oxidation is initiated and the air-fuel mixture progresses to point 136 whereupon the fuel is completely consumed. The hot air-diluent mixture is passed through a heat exchanger and heat removed, thereby moving the air-diluent mixture to point 138. Additional fuel is injected into the air-diluent mixture, thereby moving the mixture to point 140. The gradual oxidation process is initiated, as the mixture is still above the autoignition temperature, and the process moves along the line to point 142 whereupon the fuel is again completely consumed. In can been seen that the hot air-diluent mixture can be again circulated through a heat exchanger as before and the loop of points 142-138-140 repeated several times until all of the oxygen in the mixture is consumed, all the while keeping the peak reaction temperatures below the thermal NOx formation temperature.

FIGS. 1-5 and 1-6 are flow chart of exemplary gradual oxidation processes according to certain aspects of the present disclosure. FIG. 1-5 discloses a pre-mix process 100 wherein an oxidant, a diluent, and LEC and HEC fuels are mixed and then heated to an autoignition temperature, thereby initiating a gradual oxidation of the fuels. A particular embodiment of the process of FIG. 1-5 may include only some of the disclosed steps or may have such steps in an order different from depicted in FIG. 1-5. As an example, the most complete process starts at step 102 wherein an LEC fuel, for example a landfill gas, is provided in step 102.

An oxidant, for example air, is added to the LEC fuel in step 104. In some aspects, the amount of oxidant added depends on the concentration of combustible gas in the LEC fuel so as to achieve a target concentration of combustible gas in the resulting oxidant-LEC fuel mixture. In some aspects, the amount of oxidant added depends on the concentration of oxygen in the LEC fuel so as to achieve a minimum concentration of oxygen in the resulting oxidant-LEC fuel mixture. In some aspects, the concentration of combustible gas and/or oxygen in the LEC fuel is at least periodically measured and the amount of oxidant being added in step 104 adjusted in response to this measurement.

An HEC fuel could optionally be added in step 106. In some aspects, the amount of HEC fuel added depends on the concentration of combustible gas in the oxidant-LEC fuel mixture so as to achieve a target concentration of combustible gas in the resulting oxidant-LEC-HEC fuel mixture. In some aspects, the concentration of combustible gas in the oxidant-LEC fuel mixture is at least periodically measured and the amount of HEC fuel being added in step 106 adjusted in response to this measurement.

Step 108 adds a diluent, such as recirculated flue gas, to the oxidant-fuel mixture. In certain aspects, the amount of diluent is adjusted to achieve a target concentration of combustible gas in the resulting oxidant-fuel-diluent mixture. In certain aspects, the recirculated flue gas also adds heat to the oxidant-fuel mixture, thereby reducing the amount of heat that will be added later in step 112. In some aspects, the concentration of combustible gas in the oxidant-fuel mixture is at least periodically measured and the amount of diluent being added in step 108 adjusted in response to this measurement. The oxidant, LEC and HEC fuels, and diluent are mixed in step 110 into a generally homogeneous mixture. In certain aspects, mixing takes place incrementally after one or more of steps 104, 106, and 108. The homogenous oxidant-fuel-diluent mixture is heated in step 112 until the temperature of the mixture reaches at least the autoignition temperature of the mixture. The oxidant-fuel-diluent mixture autoignites in step 114 and gradually oxidizes in step 116 until the fuel and oxygen in the mixture no longer react and process 100 is thus completed.

FIG. 1-6 discloses a fuel-injection process 150 wherein an oxidant and a diluent are mixed and then heated to an autoignition temperature, whereupon a mixture of LEC and HEC fuels is injected into the oxidant-diluent mixture and mixed. A particular embodiment of the process of FIG. 1-6 may include only some of the disclosed steps or may have such steps in an order different from depicted in FIG. 1-6. As an example, the most complete process starts at step 104a wherein an oxidant is provided. A diluent is added to the oxidant in step 108 and mixed in step 110a and heated in step 112 to at least an autoignition temperature of a target oxidant-diluent-fuel mixture. In some aspects, the amount of diluent added depends on the concentration of oxygen in the oxidant so as to achieve a target concentration of oxygen in the resulting oxidant-diluent mixture. In certain aspects, when the diluent is recirculated flue gas, the recirculated flue gas also adds heat to the oxidant, thereby reducing the amount of heat that will be added later in step 112.

In a parallel process, an LEC fuel is proved in step 102 and a HEC fuel is added in step 106 and mixed in step 110b. In some aspects, the amount of HEC fuel added depends on the concentration of combustible gas in the LEC fuel so as to achieve a target concentration of combustible gas in the resulting LEC-HEC fuel mixture. In some aspects, the concentration of combustible gas in the LEC fuel is at least periodically measured and the amount of HEC fuel being added in step 106 adjusted in response to this measurement.

The LEC-HEC fuel mixture is injected into the hot oxidant-diluent mixture in step 152 and mixed in step 110c. In certain aspects, the mixing of step 110c comprises providing the oxidant-diluent mixture into an oxidation chamber through a turbulence-inducing jet and the fuel mixture is injected into the turbulent oxidant-diluent mixture flow. The oxidant-diluent mixture and fuel mixture mix rapidly in the turbulent flow in step 110C and then autoignite in step 114 and gradually oxidize in step 116 until the fuel and oxygen in the mixture no longer react and the process 150 is thus completed.

FIG. 1-7 is a schematic diagram of an exemplary pre-mix oxidation system 200 according to certain aspects of the present disclosure. LEC fuel is obtained, in this example, from a landfill 202 through a gas-collection piping system 204 and provided as an LEC fuel flow 206a. In certain aspects, for example if the methane content of the LEC fuel flow 206a is less than a determined percentage, an HEC fuel 210 is added in a mixer 208a, producing an LEC-HEC fuel mixture 206b. In certain aspects, for example if the oxygen content of the LEC-HEC fuel mixture 206b is less than a determined percentage, an oxidant 212, for example air, is added in a mixer 208b, producing an oxidant-fuel mixture 206c. In certain aspects, for example if the oxygen content of the oxidant-fuel mixture 206c is greater than a determined percentage, a diluent 214, for example recirculated flue gas, is added in a mixer 208c, producing an oxidant-diluent-fuel mixture 206d. In certain aspects, a mixer 220 is provided to further mix the oxidant-diluent-fuel mixture 206d, thereby producing a homogenized oxidant-diluent-fuel mixture 206e. In certain aspects, a compressor or blower 222 is provided to pressurize and heat the homogenized oxidant-diluent-fuel mixture 206e, thereby producing a pressurized homogenized oxidant-diluent-fuel mixture 206f that is introduced into the oxidizer 224. After the gradual oxidation process is completed, the exhaust 226 exits the oxidizer 224. In certain aspects, a portion of the exhaust 226 is tapped off to provide the diluent 214. The remaining exhaust 226 is provided to other systems or vented to atmosphere.

FIG. 1-8 is a schematic diagram of an exemplary injection oxidation system 300 according to certain aspects of the present disclosure. Many elements of system 300 are common to the system 200 previously discussed and their description is not repeated with respect to FIG. 1-8. In system 300, the oxidant 212 is compressed and heated separately with a compressor or blower 222a and the resulting pressurized oxidant 304 is provided to the oxidizer 224. In certain aspects, a diluent (not shown in FIG. 1-8) is added to the oxidant 212 prior to the compressor 222a. Separately, the LEC-HEC fuel mixture 206b is compressed and heated with a separate compressor or blower 222b to produce a pressurized fuel mixture 302 that is injected into the compressed oxidant-diluent mixture 304 within the oxidizer 224. Methods of injecting the fuel mixture 302 into the oxidant-diluent mixture 304 within the oxidizer are discussed with respect to later figures.

FIG. 1-9 is a schematic representation of an exemplary turbine-driven power-generation system according to certain aspects of the present disclosure. Many elements of system 400 are common to previously discussed systems and their description is not repeated with respect to FIG. 1-9. In system 400, the oxidant-diluent-fuel mixture 206d is provided at the inlet of a compressor 410 that is coupled to shaft 412 that is also coupled to a turbine 414 and to power generator 416. The pressurized oxidant-diluent-fuel mixture 206f from the compressor 410 is passed through a heat exchanger 418 wherein the mixture 206f absorbs heat from the exhaust 420. The heated mixture 206g is provided to the oxidizer 224. The exhaust 226 is provided to the turbine 414 that extracts a portion of the energy from the hot compressed exhaust 226, thereby driving the compressor 410 and generator 416 through shaft 412. In certain aspects, a portion of the exhaust from the turbine is tapped off to provide the diluent 214 and the remaining exhaust 420 passes through the previously mentioned heat exchanger 418 and then through a second heat exchanger 422, wherein the exhaust gas is further cooled by a flow of water 430 before being exhausted to the environment. The heated water 430, after passing though heat exchanger 422, may be used for beneficial uses such as hot water supply, building heating, or other applications.

FIG. 1-10 is a schematic representation of another turbine-driven power-generation system according to certain aspects of the present disclosure. Many elements of system 450 are common to previously discussed systems and their description is not repeated with respect to FIG. 1-10. The system 450 includes a warmer combustor 454 and a turbine combustor 456 before and after, respectively, the oxidizer 224. An HEC fuel 452 is selectively provided to each of the warmer combustor 454 and a turbine combustor 456. The method of using these combustors 454, 456 to initiate operation of the oxidizer-driven turbine is described in the previously referenced U.S. patent application Ser. No. 13/289,996.

FIG. 1-11 is a cutaway view of an exemplary GO reaction chamber 500 according to certain aspects of the present disclosure. The GO reaction chamber 500 has a vessel 510 that, in certain aspects, is configured to withstand a pressurized internal gas. A tower 514 is positioned, in this example, along a center axis of the vessel 510, and configured to accept at an external end a flow of an oxidant-diluent-fuel mixture 530 through inlet 515. A plurality of distribution pipes 516 are coupled to the tower 514 such that the oxidant-diluent-fuel mixture 530 passes from the tower into the distribution pipes 516. Each of the distribution pipes 516 comprise a plurality of injection holes (not visible in FIG. 1-11) that allow the mixture 530 to pass from the interior of the distribution pipes 516 into the interior of the vessel 510. The interior of the vessel is at least partially filled with a porous media 512. This media 512 absorbs heat from the GO process and then releases this heat to unreacted mixture 530, thereby raising the temperature of the unreacted mixture 530 above the autoignition temperature. Porous media 512 also functions to mix products of oxidation from prior stages with unreacted oxidant-diluent-fuel mixtures injected through pipes 516.

In certain aspects, the GO reaction chamber 500 comprises one or more secondary inlets 518 through which an oxidant, a fuel, or a mixture thereof can be injected directly into the interior of the vessel 510. In certain aspects, the GO reaction chamber 500 comprises one or more heaters 522 that may be used to heat the porous media 512. In certain aspects, the GO reaction chamber 500 comprises one or more sensors 524 that are configured to measure one or more of a temperature, an oxygen content, or a fuel content of the gases at one or more points within the vessel 510.

In certain aspects, the GO reaction chamber 500 comprises a sensor 524 that comprises a temperature sensing element and outputs a signal that is representative of a temperature within the reaction chamber 500. In certain aspects, the GO reaction chamber 500 comprises a sensor 525 that comprises a temperature sensing element and outputs a signal that is representative of the temperature of the oxidant-diluent-fuel mixture 530. In certain embodiments, the temperature signals from sensors 524 and 525 are accepted by a controller 529 that outputs a signal 532 to reduce the temperature within the reaction chamber 500 when the temperature within the reaction chamber 500 approaches a flameout temperature, such that the temperature remains beneath the flameout temperature. In certain embodiments, adjustment of the temperature within the reaction chamber 500 is accomplished by adjusting one or more of the flow of the oxidant-diluent-fuel mixture 530, the composition of the oxidant-diluent-fuel mixture 530, the temperature of the oxidant-diluent-fuel mixture 530, the flow of the auxiliary air-fuel mixture 540, the composition of the auxiliary air-fuel mixture 540, the temperature of the auxiliary air-fuel mixture 540, the flow of exhaust gas through outlet 520, a flow of a coolant through an internal heat exchanger such as shown in FIG. 2-3 (not shown in FIG. 1-11), or a flow of a non-combustible fluid introduced into the reaction chamber 500 through an injection subsystem (not shown in FIG. 1-11). In certain aspects, the signal 532 is provided to a control module 531 configured to control at least one of a flow rate, a composition, and a temperature of the oxidant-diluent-fuel mixture 530.

In certain aspects, the detection module 527 is configured to detect when at least one of a reaction temperature within the reaction chamber 500, for example the temperature at sensor 524, approaches or exceeds a flameout temperature of the oxidant-diluent-fuel mixture within the reaction chamber 500 and a reaction chamber inlet temperature, i.e. the temperature of the oxidant-diluent-fuel mixture 530 at sensor 525, approaches or drops below an autoignition threshold.

In certain aspects, the controller 529 comprises a correction module 528 that outputs instructions, based on the detection module 527, to change at least one of removal of heat from the reaction chamber and the temperature of the oxidant-diluent-fuel mixture 530 at the inlet of the tower 514 within the reaction chamber 500. In certain aspects, the correction module 528 is configured to maintain an actual temperature within the reaction temperature, for example at sensor 524, to a temperature below the flameout temperature and/or maintain the inlet temperature above the autoignition threshold of the fuel. In certain aspects, the controller 529 is configured to maintain the temperature of the oxidant-diluent-fuel mixture 530 at the inlet to tower 514 above the autoignition threshold, such that the gas within the reaction chamber 500 oxidizes without a catalyst. In certain aspects, the controller 529 is configured to determine at least one of a reduction of the temperature within the reaction chamber to remain below the flameout temperature, and an increase in the temperature of the oxidant-diluent-fuel mixture 530 at the inlet to tower 514 to maintain the temperature of the oxidant-diluent-fuel mixture 530 above the autoignition threshold.

In certain aspects, the controller 529 is configured such that when the temperature of the oxidant-diluent-fuel mixture 530 at the inlet to tower 514 approaches or drops below an autoignition threshold of the oxidant-diluent-fuel mixture 530, the controller 529 outputs a signal 532 to cause additional heat to be added to the oxidant-diluent-fuel mixture 530 such that the temperature of the oxidant-diluent-fuel mixture 530 at the inlet to tower 514 is maintained above the autoignition threshold, and the reaction chamber 500 maintains oxidation of the fuel within the reaction chamber 500 without a catalyst. In certain embodiments, the correction module 528 outputs instructions, based on the detection module 527, to change either a residence time of the gas within the reaction chamber, for example by reducing the flow of the oxidant-diluent-fuel mixture 530, and/or changing the autoignition delay time, for example by adjusting the composition of the oxidant-diluent-fuel mixture 530 or increasing the temperature within the reaction chamber 500 with the heater 522, within the reaction chamber sufficient for the oxidant-diluent-fuel mixture 530 to autoignite and oxidize while within the reaction chamber 500.

In certain aspects, the detection module 527 is configured to detect when a reaction chamber inlet temperature of the gas approaches or drops below a level such that the reaction chamber alone will not support oxidation of the fuel, and the correction module 528 is configured to change, based on the detection module 527, the residence time of the gas within the reaction chamber and/or the autoignition delay time within the reaction chamber sufficient for the gas to autoignite and oxidize while within the reaction chamber 500.

In some embodiments, the temperature of the fuel or gas mixture within the reaction chamber may be above the lower flammability limit or the flameout temperature. In these instances, for example, mixing a HEC fuel gas into the reaction chamber, there may be a period of time that the mixture passes through a flammability area, which is below the upper flammability limit and above the lower flammability limit. While a residence time within this area may not be, in some instances, desirable, the residence time of the mixture within the area can be reduced by either changing the temperature of the mixture or changing the flow of the mixture. In some instances, heat may be drawn out of the reaction chamber to reduce the temperature of the mixture to be below the lower flammability limit, or flameout temperature, such that the residence time of the mixture within the flammability area is less than the autoignition delay time. In some instances, the flow rate of the mixture through the reaction chamber can be increased to reduce the residence time of the mixture within the reaction chamber; this reduced residence time of the mixture within the reaction chamber can equate to a reduced residence time of the mixture being exposed to temperatures within the reaction chamber that are within the flammability area and may be acceptable if the residence time is less than the autoignition delay time. In some instances, heat may be added to the mixture such that the reaction temporarily moves into a flammability area for a brief period of time relative to the autoignition delay time.

In some instances, at least one of the temperature or the flow of the mixture through the reaction chamber can be controlled such that the residence time of the fuel within the flammability area is less than 5% of the autoignition delay time. In some instances, the residence time of the fuel within the flammability area can be between about 5% and about 10% of the autoignition delay time. In some instances, the residence time of the fuel within the flammability area can be between about 10% and about 20% of the autoignition delay time. In some instances, the residence time of the fuel within the flammability area can be between about 15% and about 25% of the autoignition delay time. In some instances, the residence time of the fuel within the flammability area can be between about 25% and about 50% of the autoignition delay time. In some instances, the residence time of the fuel within the flammability area can be between about 30% and about 75% of the autoignition delay time.

In certain aspects, the control module 531 is configured to raise the temperature of the oxidant-diluent-fuel mixture 530 at or before the inlet 515 to or above an autoignition temperature of the oxidant-diluent-fuel mixture 530. In certain embodiments, the reaction chamber 500 is configured to oxidize the oxidant-diluent-fuel mixture 530 and maintain an adiabatic temperature above the autoignition temperature of the oxidant-diluent-fuel mixture 530 and a maximum actual temperature of the reaction chamber 500 below a flameout temperature of the oxidant-diluent-fuel mixture 530.

In certain aspects, the oxidizer 500 is configured to create the oxidant-diluent-fuel mixture 530 by mixing, in a system not shown in FIG. 1-11, a gas having a LEC fuel with one or more of the group of a gas comprising a HEC fuel, a gas comprising an oxidant, and a gas comprising a diluent while all of the gases are at temperatures below the autoignition temperature of any of the gases being mixed. The oxidizer 500 is also configured to increase the temperature of the oxidant-diluent-fuel mixture 530 to at the least an autoignition temperature of the oxidant-diluent-fuel mixture 530 and allowing the oxidant-diluent-fuel mixture 530 to autoignite, and then maintaining the temperature of the oxidant-diluent-fuel mixture 530 below a flameout temperature while the autoignited the oxidant-diluent-fuel mixture 530 oxidizes.

In certain aspects, the porous media 512 within the oxidizer 500 is configured to maintain an internal temperature of the reaction chamber below a flameout temperature and to maintain a reaction chamber inlet temperature of the fuel to be greater than an autoignition temperature of the fuel. In certain aspects, at least one flow path from the inlet to the outlet of the oxidizer 500 is configured to direct the oxidant-diluent-fuel mixture 530 through a portion of the porous media 512 that is hotter than the autoignition temperature of the oxidant-diluent-fuel mixture 530 until the oxidant-diluent-fuel mixture 530 reaches a temperature above the autoignition temperature of the oxidant-diluent-fuel mixture 530, whereupon the flow path is further configured to direct the oxidizing oxidant-diluent-fuel mixture 530 to the outlet along a path being generally opposite to the first flow path, for example using internal baffles such as the tubes 1055/1060 shown in FIG. 2-7B.

In some embodiments, the controller 529 can direct other parts of the oxidation system. For example, other controls that the controller 529 may direct are described in copending U.S. patent application Ser. No. 13/289,989, filed Nov. 4, 2011, and Ser. No. 13/289,996, filed Nov. 4, 2011, both of which are incorporated by reference herein in their entirety to the extent the teachings within the applications are not inconsistent with the teachings of this description.

FIG. 1-12 schematically depicts the flow through a gradual oxidation system 4500 having a sparger according to certain aspects of the present disclosure. The processes and elements of FIG. 1-12 are described in relation to the oxidizer 500 of FIG. 1-11. The following processes occur as air 4502 and fuel 4220 flow through the oxidizer:

1. Fuel/air mixer 4510 creates an initial lean air-fuel mixture from one or both of air 4502 and fuel 4220.
2. Heater 4512 heats the air-fuel mixture up to temperatures proximate to the autoignition temperature. The heat may also be added through compression of the mixture as well as heat exchange. In some embodiments, heat may be added by introducing a heated gas (e.g., flue gas).
3. A first stage gradual oxidizer that may include a heater 522 (FIG. 1-11) or heater 4516 (FIG. 1-12), for example a pilot burner, to initiate the gradual oxidation 4518. In certain aspects, this heater is an electric heater of various types known to those of skill in the art. The output of this is hot gas comprising un-consumed $O_2$ and oxidation products $CO_2$ and $H_2O$, Since the portion of fuel and air flowing into this first oxidizer 4518 is small, less heat is required to heat the mixture above the autoignition temperature to initiate the oxidative reaction. In certain aspects, heat is added to the first stage by preheating a porous media with a starter-combustor upstream. The preheated media then heats the fuel/air mixture in 4516 to start the oxidation. Since only a small portion of flow goes through the heated media in heater 4516, thermal condition and radiation of energy opposite the flow direction is able to maintain the media temperature high enough to continue to heat the flow. This stage anchors the reaction.
4. A divide-mix-oxidize stage 4530, for example as occurs in an arm 516 of sparger 514 of FIG. 1-11, wherein a portion of the air-fuel mixture is split off, mixed with the hot gas from the prior process, and gradually oxidized, shown as processes 4514, 4520, and 4518. Since the prior oxidized gases from oxidizer 4518 are hot, typically above 1400° F. but below 2300° F., they serve to heat the unreacted fuel and air from divider 4514 in mixer 4520, and initiate the oxidation of this next stage of oxidation 5. A repetition of stage 4530 oxidizes all of the fuel from LEC source 4220 so that no fuel remains after the final oxidizer 4518. The staged-approach to starting the oxidation process in the anchoring first stage, and the oxidizing portions of the gas thereafter, is the gradual oxidation process.

FIG. 1-13 is a schematic representation of a multi-stage GO reaction chamber 600 according to certain aspects of the present disclosure. In this example, the chamber 600 comprises four reaction chambers 602a, 602b, 602c, and 602d that are serially coupled together. In this example, a flow of an air-fuel mixture 604, for example an LEC fuel, is provided into each of the four reaction chambers 602a, 602b, 602c, and 602d. In certain aspects, the amount of the air-fuel mixture 604 provided into each reaction chamber 602a, 602b, 602c, and 602d is different. In certain aspects, one or more different air-fuel mixtures (not shown in FIG. 1-12) are provided to the downstream reaction chambers 602b, 602c, and 602d. In certain aspects, an oxidant (not shown in FIG. 1-13) is separately provided to one or more of the downstream reaction chambers 602b, 602c, and 602d. In certain aspects, an HEC fuel (not shown in FIG. 1-13) is separately provided to one or more of the reaction chambers 602a, 602b, 602c, and 602d.

FIG. 1-14 is a schematic representation of a fluidized bed GO reaction chamber 700 according to certain aspects of the present disclosure. In this example, the reaction chamber 700 comprises a vessel 710 at least partially filled with a media 720 that, when a gas is introduced at the bottom of the media 720, becomes fluidized. The air-fuel-diluent mixture 604 gradually oxidizes as the mixture 604 passes through the fluidized media 720 and is removed at the top as exhaust 226. The fluidized media circulates within vessel 710, transferring heat from the exhaust products of oxidation to the inlet reactants. Fluidized particles 720 near the exhaust end of vessel 710 (proximal to exhaust 226) are heated by hot products of oxidation. The fluidized media then is conveyed, either purposely or incidentally, to the inlet end of the oxidation vessel 710. The heated fluidized media then impart their heat to the incoming, cooler, unreacted air-fuel-diluent mixture 604 to heat the flow, as is taught for the GO process. Fluidized media 720 therefore serves to transfer the heat from the products of oxidation to the air-fuel-diluent reactants. There are many ways to implement fluidized beds to move heat around closed chemically reacting systems, especially when combined with the staged-injection of the GO process, and implementing fluidized beds is one example of how heating is accomplished (see, e.g., FIG. 1-12, 4512, 4516).

FIG. 1-15A is a schematic representation of a recirculating bed GO reaction chamber 800 according to certain aspects of the present disclosure. In this example, the reaction chamber 800 comprises a vessel 810 that is at least partially filled with a media 820. A portion 810a of the media 820 is at least periodically removed at the bottom of the vessel 810 and transported through a transfer system 820 to the top of vessel 810, whereupon the portion 810a is returned to the interior of vessel 810. At the same time, a flow of an air-fuel mixture 604 is introduced at the bottom of the vessel 810 and passes upward through the media 820. The mixture 604 gradually oxidizes as it passes through the media 820 and is removed at the top as exhaust 226. As the media 820 that is within the vessel 810 is moving downward as portions 810a are removed at the bottom, the hottest media 820, i.e. the media 820 that is on top of the media 820 that is within the vessel 810, moves toward the inlet thereby counteracting the tendency of the incoming air-fuel mixture 604 to locally cool the media 820. The cold media portions 810a removed from the bottom are delivered to the top where the portions 810a are heated by the hot oxidized gas.

FIG. 1-15B is a schematic representation of another recirculating bed GO reaction chamber 801 according to certain aspects of the present disclosure. In this embodiment, the recirculating portions 810b are drawn from a hot portion of the bed 820, for example a midpoint in the depth of the bed 820, and circulated through pipe 822 wherein heat 824 is extracted from the recirculating portions 810b. The cooled portions 810b are provided back to the chamber 801, for example at the top so as to fall onto the top of the bed 820. This extraction of heat from the recirculating portions 810b draws heat from the reaction chamber 801. In certain aspects, the flow rate of portions 810b is controlled to maintain an internal temperature of the reaction chamber 801 below a flameout temperature.

FIG. 1-16 is a schematic representation of a GO reaction chamber 850 with flue gas recirculation according to certain aspects of the present disclosure. The vessel 810 and media 820 are similar to those of the GO oxidizer 800 of FIG. 1-15. In the example of FIG. 1-16, however, a portion 852 of the exhaust gas 226, also referred to herein as flue gas, is recirculated and provided at the bottom of the vessel 810 so as to heat the incoming air-fuel mixture 604 and anchor the GO process within the vessel 810, as well as provide an additional diluent to the incoming air-fuel mix 604.

In certain aspects, the GO reaction chamber 850 comprises an oxygen sensor, such as sensor 524 of FIG. 1-11, that is configured to determine an oxygen content level within the reaction chamber 850 and provide a signal representative of the oxygen content level. In certain aspects, a controller (not shown in FIG. 1-16) accepts the oxygen content level signal and outputs instructions to introduce flue gas 852, received from the outlet of the reaction chamber and containing product gases from oxidation of the fuel within the reaction chamber, into the reaction chamber 850 based on the oxygen content level.

In certain embodiments, an oxidizer can includes a reaction chamber inlet configured to accept a gas having a mixture of a low-energy-content (LEC) fuel and at least one of the group of a high-energy-content (HEC) fuel, an oxidant-comprising (OC) gas, and a diluent-containing (DC) gas. The gas mixture can be regulated to be at a temperature below an auto-ignition temperature of the gas mixture. The oxidizer can also include a heat exchange media disposed within the reaction chamber. The media may be configured to maintain an internal temperature of the reaction chamber below a flameout temperature and to maintain a reaction chamber inlet temperature of the fuel to be greater than an autoignition temperature of the fuel. The reaction chamber can provide at least one flow path through the chamber from the inlet to the outlet. The flow path may be configured to direct the gas entering the inlet through a first path through media that is hotter than an auto-ignition temperature of the gas mixture until the gas mixture reaches a temperature above the auto-ignition temperature of the gas mixture, whereupon the flow path is further configured to direct the oxidizing gas mixture through a second path through the media to the outlet, the second path being generally opposite to the first flow path. Examples of this are illustrated in FIGS. 2-7A through 2-9.

In certain embodiments, a method of oxidization described herein includes the steps of receiving into a reaction chamber, via a chamber inlet, the inlet configured to accept a gas having a mixture of a low-energy-content (LEC) fuel and at least one of the group of a high-energy-content (HEC) fuel, an oxidant-comprising (OC) gas, and a diluent-containing (DC) gas, the gas mixture being at a temperature below an auto-ignition temperature of the gas mixture; maintaining an internal temperature of the reaction chamber below a flameout temperature by heat exchange media disposed within the reaction chamber, maintaining a reaction chamber inlet temperature of the fuel to be greater than an autoignition temperature of the fuel by transferring heat through the heat exchange media, and directing gas entering the inlet through a first path through media that is hotter than an auto-ignition temperature of the gas mixture until the gas mixture reaches a temperature above the auto-ignition temperature of the gas mixture; and directing the gas through a second path through the media to a chamber outlet, the second path being generally opposite to the first flow path.

In certain embodiments, the reaction chamber is configured to maintain oxidation of the gas mixture along at least one of the first and second flow paths without a catalyst. In certain embodiments, the reaction chamber is configured to maintain oxidation of the mixture beneath the flameout temperature of the gas mixture by circulating heat exchange media outside the reaction chamber. In certain embodiments, the system also includes at least one of a turbine or a piston engine that is configured to receive gas from the reaction chamber outlet and expand the gas. In certain embodiments, the gas mixture comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In certain embodiments, the oxidizer described can include a reaction chamber inlet that is configured to accept a gas having a mixture of a low-energy-content (LEC) fuel and at least one of the group of a high-energy-content (HEC) fuel, an oxidant-comprising (OC) gas, and a diluent-containing (DC) gas. The gas mixture can be regulated to be at a temperature below an auto-ignition temperature of the gas mixture. The oxidizer can also have a heat controller that is configured to increase a temperature of the gas mixture to at the least an autoignition temperature of the gas mixture, thereby permitting the gas mixture to autoignite and to maintain the temperature of the gas mixture below a flameout temperature while the autoignited gas mixture oxidizes.

In some methods of oxidizing a fuel described herein includes the steps of mixing a gas having a low-energy-content (LEC) fuel with one or more of the group of a gas comprising a high-energy-content (HEC) fuel, a gas comprising an oxidant, and a gas comprising a diluent to form a gas mixture, wherein all of the gases are at temperatures below the autoignition temperature of any of the gases being mixed; increasing the temperature of the gas mixture to at the least an autoignition temperature of the gas mixture and allowing the gas mixture to autoignite; and maintaining the temperature of the gas mixture below a flameout temperature while the autoignited gas mixture oxidizes.

In certain embodiments, the oxidizer can include an inlet configured to accept a gas having a mixture of a low-energy-content (LEC) fuel and at least one of the group of a high-energy-content (HEC) fuel, an oxidant-comprising (OC) gas, and a diluent-containing (DC) gas. The gas mixture can be regulated to be at a temperature below an auto-ignition temperature of the gas mixture. A controller (e.g., a heat controller) can be configured to heat the gas to at the least an auto-ignition temperature of a first gas mixture, comprising a gas with an oxidant mixed with determined ranges of a low-energy-content (LEC) fuel and a high-energy-content (HEC) fuel. An inlet (e.g., an injector) can also be configured to inject, after the first gas is heated to at the least an auto-ignition temperature of a first gas mixture, a second gas mixture of the LEC fuel gas and the HEC fuel. The inlet or injector can injects a ratio of the LEC and HEC gas and at a rate of injection that is selected to produce substantially the same ratio of LEC and HEC gas as the first gas mixture when the gas is injected into the reaction chamber. The reaction chamber can be configured to mix the injected second gas with the heated gas containing an oxidant at a rate to produce a substantially homogeneous first gas mixture in a time less than the ignition delay time for the second gas mixture and allowing the first gas mixture to auto-ignite and to maintain the temperature of the first gas mixture below a flameout temperature while the auto-ignited first gas mixture oxidizes.

In certain embodiments, a method of oxidation described herein includes the steps of heating a gas comprising an oxidant to at the least an auto-ignition temperature of a first gas mixture comprising a gas with an oxidant mixed with determined ranges of a low-energy-content (LEC) fuel and a high-energy-content (HEC) fuel; injecting, after the heating, a second gas mixture of the LEC fuel gas and the HEC fuel, wherein the ratio of the LEC and HEC gas and the rate of injection are selected to produce substantially the same first gas mixture ratios when injected into the heated gas containing an oxidant; mixing the injected second gas with the heated gas containing an oxidant at a rate to produce a substantially homogeneous first gas mixture in a time less than the ignition delay time for the second gas mixture and allowing the first gas mixture to auto-ignite; and maintaining the temperature of the first gas mixture below a flameout temperature while the auto-ignited first gas mixture oxidizes.

FIGS. 1-17A and 17B depict a GO reaction chamber 860 with structured reaction elements 864 according to certain aspects of the present disclosure. FIG. 1-17A is a schematic representation of a vessel 862 that contains, in this example, a stack of structured reaction elements 864.

FIG. 1-17B shows an exemplary structured reaction element 864 that is formed as a disk 866 with a plurality of holes 868 through the thickness of the disk 866. In certain embodiments, the edges of the disk 866 are raised so as to provide a gap between stacked elements 864 thereby allowing lateral flow of the air-fuel mixture between holes as the air-fuel mixture passes through a stack of the reaction elements 864. When stacked in the vessel 862, the elements 864 may be randomly rotated about a center point so that the holes 868 of adjacent elements 864 do not line up, thereby providing a more serpentine path through a stack of elements 864.

As another example of the structured media inside vessel 862 (FIG. 1-17A), extruded metal or ceramic such as cordierite will serve to conduct heat from downstream of the flow, near exit 226, to upstream of the flow. This will serve to heat the inlet air-fuel mixture 604 above the autoignition temperature and initiate the oxidation reactions.

Gradual Oxidizer as Heat Source

FIG. 2-1 is a schematic representation of an oxidizer 224 coupled to a heat exchanger 1010 to provide process heating to an industrial process according to certain aspects of the present disclosure. In FIG. 2-1, the gradual oxidation reactant gases 604 are admitted into the oxidizer 224 and undergo gradual oxidation and leave as product gases 1015 that pass through a heat exchanger 1010 wherein heat is rejected and the product gases are exhausted to the atmosphere as exhaust 1030 at a reduced temperature. Entering the other passage of the heat exchanger 1010 is a cool fluid 1020, for example air, water, or an industrial fluid, which is beneficially heated and exits as hot fluid 1025 that flows to its point of use (not shown in FIG. 2-1). Heat exchanger 1010 can be configured as co-flow, counterflow, cross-flow, or any of the other heat exchanger options described and illustrated herein or other that may be known in the art. The gradual oxidation reaction products 1015, which are comprised of pollutant-free hot gases, are directed to a heat exchanger that beneficially heats a stream of air to warm a living space for personal comfort, or a volume of water for domestic usage, or any industrial material requiring heating.

FIG. 2-2 is a schematic representation of an oxidizer 224 coupled to a heating chamber 1050 to heat a process material 1055 according to certain aspects of the present disclosure. The air-fuel mixture 604 is admitted into the oxidizer 224 where it undergoes gradual oxidation and leaves as product gas 1015, after which it proceeds into the heating chamber 1050 where a material 1055 is beneficially heated by the hot gases, after which the gases exit the heating chamber as exhaust 1030 and are exhausted to atmosphere. The material 1055 may be processed by one or more of thawing, melting, evaporating, subliming, drying, baking, curing, sintering, or calcining using the beneficial heat. In a similar embodiment (not shown in FIG. 2-2), where ventilation is sufficient to prevent harmful levels of oxygen depletion, the hot gradual oxidation reaction products are directed into an occupied space for comfort heating. In another similar embodiment (not shown in FIG. 2-2), the hot products are directed to an absorption chiller to provide the motive energy for an absorption-refrigeration cycle.

FIG. 2-3 is a schematic representation of an oxidizer 224 comprising an internal heat exchanger 1060 through which a fluid passes according to certain aspects of the present disclosure. The heat exchanger 1060 is disposed internally to the oxidizer 224 reaction chamber. The air-fuel mixture 604 is admitted into the oxidizer 224 and undergoes gradual oxidation. Cool fluid 1020 enters the heat exchanger 1060 and a portion of the thermal energy generated by the gradual oxidation process is transferred to the fluid through the heat exchanger 1060. The cooled product gasses exit as exhaust 1030. The hot fluid 1025 exits the heat exchanger 1060 and is directed to its point of use (not shown in FIG. 2-3). An example embodiment of the oxidizer 224 comprises a vessel lined internally with tubes where air is conveyed through the tubes.

In certain embodiments, heat is drawn from the reaction chamber of the oxidizer 224 using one of the cool fluid 1020 being a liquid that at least partially vaporizes in the heat exchanger 1060, the cool fluid 1020 being a gas, or the cool fluid 1020 being a liquid that increases in temperature without vaporizing. In certain embodiments, the amount of heat being drawn from the reaction chamber of oxidizer 224 is adjusted by one or more of controlling the flow rate of the cool fluid 1020, controlling the flow rate of the hot fluid 1025, or controlling the temperature of at least one of the cool fluid 1020 and the hot fluid 1025. In certain aspects, the cool fluid 1020 is at a temperature that is less than an internal temperature within the oxidizer 224, wherein the reaction chamber is configured to maintain the internal temperature above an autoignition temperature of the fuel within the air-fuel mixture 604 and below a flameout temperature of the fuel within the air-fuel mixture 604.

Figures 1, 2, 3, 4, 4A:
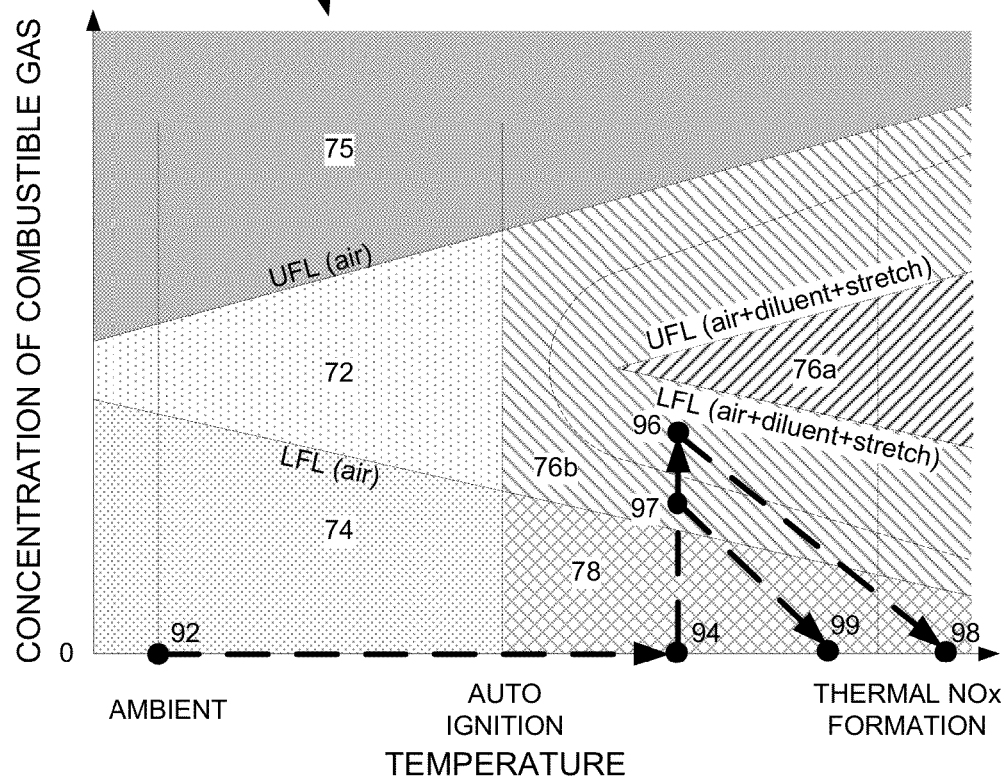
Figures 1, 2, 3, 4, 4B:
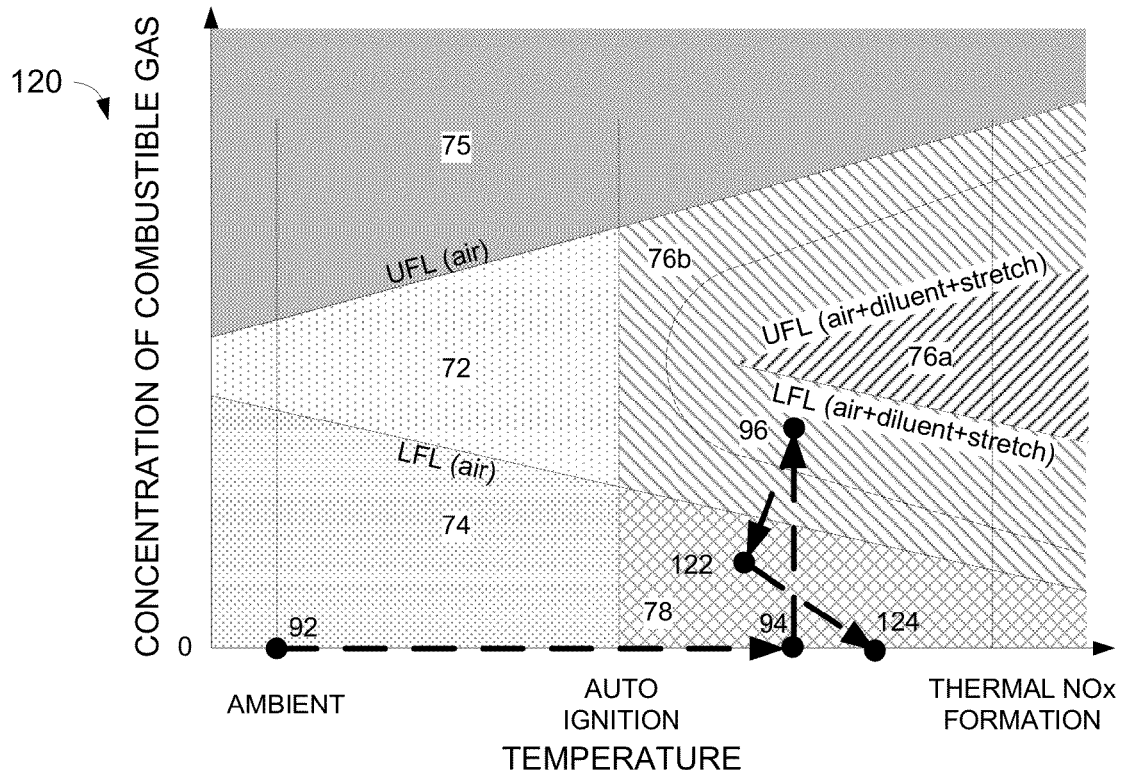
Figures 1, 2, 3, 4, 4C:
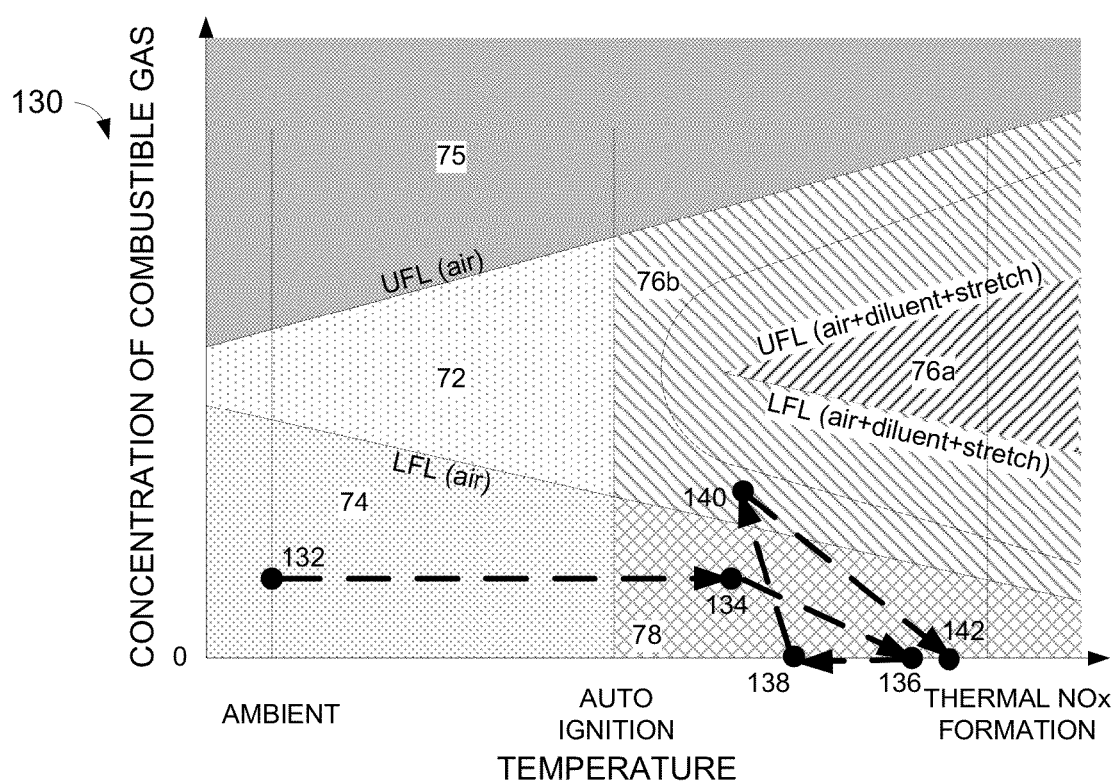

FIG. 2-4 is a schematic representation of another embodiment of an oxidizer 224, comprising a plurality of internal heat exchangers 1060 according to certain aspects of the present disclosure. Similar to FIG. 2-3, an air-fuel mixture 604 is admitted into an oxidizer 224 where gradual oxidation occurs and a portion of the thermal energy is transferred to a cool fluid 1020 through the heat exchangers 1070, which are disposed internally to the gradual oxidizer 224. In certain embodiments, the heat exchangers 1060 comprise a plurality of the heat removal surfaces (not shown in FIG. 2-4) that are positioned internally proximate to the outer circumference of the oxidizer vessel to absorb much of the beneficial heat that might otherwise be lost to the environment through imperfect wall insulation.

FIG. 2-5 is a schematic representation of an oxidizer 224 comprising a plurality of gradual oxidation zones 1075A-1075C with adjoining reaction zones 1080A-1080C wherein batches of a process material are heated according to certain aspects of the present disclosure. An air-fuel mixture 604 is admitted into an oxidizer 224 in three separate reactant streams 1090A, 1090B, and 1090C that are respectively directed to gradual oxidation zones 1075A-1075C where gradual oxidation and the release of exothermic energy from the gases occur. Granular, industrial materials (not visible in FIG. 2-5) are disposed within the reaction zones 1080A-1080C where they are fluidized by the reactant gases and are beneficially heated in a batch manner. A fraction of the heat removal surface is positioned in such a manner that it absorbs sufficient beneficial heat from the gradual oxidation process to reduce local temperatures below the point where damage to internal components may occur. The product gases from the gradual oxidation process are recombined into a single exhaust stream 1030 that exits to atmosphere or other end use. In a similar embodiment (not shown in FIG. 2-5), additional heat removal surfaces are provided so as to permit the gradual oxidation process to be operated at greater energy-release-density (and thereby, smaller overall reactor volume) without overheating and damaging internal components.

FIG. 2-6 is a schematic representation of an oxidizer 224 comprising a plurality of gradual oxidation zones 1075A-1075C with adjoining reaction zones 1120A-1120C wherein continuous flows of a process material 1105 are heated according to certain aspects of the present disclosure. As in FIG. 2-5, an air-fuel mixture 604 is admitted into an oxidizer 224 in three separate reactant streams 1090A, 1090B, and 1090C that are respectively directed to gradual oxidation zones 1075A-1075C where gradual oxidation and the release of exothermic energy from the gases occurs, followed by recombination of the product gas streams into a single exhaust 1030 that exits to atmosphere. Cold, unreacted, granular, industrial materials 1105A-1105C are admitted into reaction zones 1120A-1120C where the materials are fluidized by the gradual oxidation reactant gases and are heated in a continuous manner to a beneficially-altered condition 1110A-1110C that is removed from the oxidizer 224.

On the downstream side of the each reaction zone 1120A-1120C are weirs 1085A-1085C that retain a portion of the beneficially heated granular materials and permit the balance 1110A-1110C to exit the oxidizer 224 whereupon the altered materials are collected for later use (not shown in FIG. 2-6). Each of the multiple stages of a gradual oxidation process are independently carried out in the presence of a circulating fluidized bed of granular process material, which concurrently exchanges heat with the reacting gradual oxidation gases while the material 1105A-1105C itself undergoes a drying, curing, sintering, calcining, or other thermally-induced alteration due to the heat from the gradual oxidation gases. The circulating fluidized bed process that beneficially alters the granular material can be performed in a batch or continuous manner in each gradual oxidation stage. In a continuous process, the addition rate of cold, unreacted granular material 1105A-1105C should be sufficiently small to ensure the gradual oxidation process is not quenched and extinguished. In certain embodiments, the mass rate of cold unreacted granular material 1105A-1105C being continuously added to the reaction zones 1120A-1120C is 1-20% of the mass flow rate of gradual oxidation gases entering the reaction zones 1120A-1120C.

FIGS. 2-7A and 2-7B are a perspective view and cross-section view of an example design detail of an oxidizer element 1150 according to certain aspects of the present disclosure. Two concentric pipes 1055 and 1060 are used to form a process flow path wherein the incoming air-fuel mixture 604 enters the inner pipe 1060 at point A flows through the smaller pipe 1060, and then exits the inner pipe 1060 at point B and counter-flows between the inner pipe 1060 and the outer pipe 1055 while continuing to gradually oxidize and then exits the oxidizer element 1150 at point C as fully oxidized product gas. As the air-fuel mixture 604 flows through the inner pipe 1060, the mixture is heated through walls of pipe 1060 by the hot product gas counter-flowing past the outside of the pipe 1060.

FIG. 2-8 is a plot of the temperatures within the oxidizer of FIGS. 2-7A and 2-7B according to certain aspects of the present disclosure. Incoming air-fuel mix at point A is at temperature $T_1$. The mixture is heated during the initial part of the flow through inner pipe 1060 by heat transfer from the hot gas counter-flowing between the inner pipe 1060 and the outer pipe 1055 to the temperature $T_2$ when the gradual oxidation reaction is initiated. Exothermal release of chemical energy in the gradual oxidation process raises the temperature to $T_3$ when the majority of the reaction has already occurred. Gas then enters the middle section between the two concentric pipes 1055 and 1060 and flows back counter to the initial flow. The gas temperature may continue to increase slightly, due to continued gradual oxidation, or decrease as heat is lost to the outer pipe 1055. The gas then keeps moving and exchanges thermal energy with the incoming (colder) air-fuel mix 604 through the walls of the inner pipe 1060, thereby cooling the product gas to $T_4$.

FIG. 2-9 is a cross-sectional view of an assembly using the oxidizer element of FIGS. 2-7A and 2-7B according to certain aspects of the present disclosure. The assembly 1200 comprises multiple elements 1150 disposed in a housing 1205 that, in this example, is a cylindrical vessel. In certain embodiments, the vessel 1205 is a shape other than round. In certain embodiments, the vessel 1205 is pressurized. Two solid cross-sectional plates 1210 and 1220 are positioned across the interior of vessel 1205. The inner pipes 1160 penetrate the plate 1210 and the outer pipes 1055 are attached to plate 1220. Separate passages 1225 are provided through the plate 1220. An air-fuel mixture 604 flowing through the vessels 1205 passes into each of the inner pipes 1060, through the pipes 1060 and 1055 as previously discussed with respect to FIGS. 2-7A and 2-7B, and then past the outside of outer pipes 1055 and through the passages 1225. As the air-fuel mixture 604 is converted into a product gas, the mixture travels three times through the same length of the vessel 1205: (1) through the inner pipes 1060, (2) between the inner and outer pipes 1060 and 1055, and (3) through the volume between outside of the outer pipes 1055 and the vessel 1205. This provides additional heat exchange and promotes higher efficiency and a smaller volume of the oxidizer assembly 1200.

Schnepel Cycle for Reciprocating Engine

FIG. 3-1 is a schematic of an exemplary Schnepel cycle power generation system 3000 according to certain aspects of the present disclosure. An air-fuel mixture 3005, comprising a mixture of an LEC fuel, HEC fuel, oxidant, and diluent as described with reference to the air-fuel mixture 206e of FIG. 1-7, is provided to a compressor cylinder 3010 having a piston 3030a that is coupled through a connecting rod 3032 to a crankshaft 3034 that is generally similar to the crankshafts found in conventional internal-combustion engines having reciprocating cylinders. In certain aspects, the compressor cylinder 3010 is a part of a drive assembly 3036 as indicated by the dashed line box 3036 that, as an assembly, is generally similar to portions of conventional internal-combustion engines having reciprocating cylinders. As the piston 3030a descends within the compressor cylinder 3010, the air-fuel mixture 3005 is drawn into the internal space 3015 through a controllable intake valve (not shown in FIG. 3-1). When the piston 3030a is near the bottom of its stroke, the intake valve closes. As the piston 3030a ascends, the internal volume 3015 is reduced, thereby compressing the air-fuel mixture 3005. When the piston 3030a reaches a designated point, an outlet valve (not shown in FIG. 3-1) opens and connects the internal space 3015 to line 3040, thereby allowing the compressed air-fuel mixture 3005 to flow into line 3040. In this example, the compresses air-fuel mixture 3005 passes through a recuperator 3045 and then through line 3050 into a heat exchanger 3055, then into line 3060 and into the oxidizer 224.

As previously described, the air-fuel mixture 3005 is gradually oxidized within the oxidizer 224 and exists as a hot combustion product gas in line 3065. This hot gas is routed to the second side of the heat exchanger 3055, wherein the hot gas transfers a portion of its thermal energy to the incoming air-fuel mixture 3050. The product gas now flows through line 3070 into the internal space 3025 of an expander cylinder 3020.

In operation, an inlet valve (not shown in FIG. 3-1) opens when the piston 3030b is at or just past top-dead-center such that the hot pressurized product gas can flow into the internal space 3025. As the crankshaft 3034 rotates and the piston 3030b descends within the expander cylinder 3020, the hot pressurized product gas continues to flow into the internal space 3025, thereby maintaining a constant pressure within the internal space 3025 for the entire stroke.

In certain aspects of the operation, the inlet valve closes prior to piston 3030b reaching the bottom of its travel. As the piston travels from this intermediary point to bottom-dead-center, the gas pressure reduces and cools due to the expanding volumetric cavity.

The compressor cylinder 3010 and expander cylinder 3020 are coupled to a common crankshaft 3034 and offset from each other by about 180 degrees of rotation of the crankshaft 3034, i.e. the piston 3030b is at the top of its stroke when the piston 3030a is at the bottom of its stroke. As the air-fuel mixture 3005 in the interior space 3015 of the compressor cylinder 3010 is initially, in this example, at atmospheric pressure while the pressure in the interior space 3025 is at or near the maximum pressure that will be reached at the end of the compression stroke in the compressor cylinder 3010, there is a force imbalance for most of the 180 degrees of rotation while the piston 3030b is descending and the piston 3030a is ascending. It is this force imbalance that drives the rotation of the crankshaft 3034. This force also drives the rotation of generator 416, thereby creating power. In certain aspects, the generator 416 generates electricity. In certain aspects, the generator 416 generates pressurized fluid or produces mechanical work. As the piston 3030a of the compressor cylinder 3010 reaches the top of its stroke, there is a short period where the pressure in interior space 3015 is approximately equal to the pressure in interior space 3025. While there is no net driving force during this period, the inertia of the rotating crankshaft, which may include a flywheel (not shown in FIG. 3-1) to provide increased rotational inertia, will carry the crankshaft past the top-dead-center after which the compressor cylinder 3010 is drawing in new air-fuel mixture 3005 and the expander cylinder is exhausting the gas from the interior space 3025 through line 3080 and through the recuperator 3045 after which the gas is exhausted as exhaust 3085.

In certain aspects, the drive assembly 3036 is referred to as a split cycle reciprocating engine having an intake that receives the air-fuel mixture 3005, the compressor cylinder 3010 is referred to as a compression chamber coupled to a reciprocating engine, and the internal space 3015 is referred to as a reciprocating piston chamber. In certain aspects, the oxidizer 224 is referred to as an oxidation chamber that is configured to receive the mixture from the compression chamber via a first inlet and to maintain oxidation of the mixture at an internal temperature beneath a flameout temperature of the mixture and sufficient to oxidize the mixture without a catalyst. In certain aspects, the expander cylinder 3020 is referred to as an expansion chamber that receives heated oxidation product gas from the oxidation chamber and expands the product gas within the expansion chamber, thereby driving the reciprocating engine.

FIG. 3-2 is a conceptual depiction of the power generation system 3000 of FIG. 3-1 according to certain aspects of the present disclosure. The engine assembly 3036 is centrally mounted with the oxidizer 224 attached at one end through the recuperator 3045 and heat exchanger 3055. In this example, LEC fuel, such as from a remote landfill 202 (not shown in FIG. 3-2), is provided through line 3007 and the air-fuel mixture 3005 is created in the indicated box.

FIG. 3-3 is a schematic representation of another embodiment of a Schnepel cycle power generation system 3100 according to certain aspects of the present disclosure. Many elements of system 3100 are common to system 3000 and their description is not repeated with respect to FIG. 3-3. The system 3100 includes a turbine 3110 coupled to a compressor 3105. The compressor 3105 functions in series with the reciprocating piston compressor 3010 such that the compression ratio of the piston compressor 3010 is reduced compared to system 3000 with the compressor 3105 providing sufficient compression to bring the output from the piston compressor 3010 up to the system pressure. In certain aspects, the system pressure of system 3100 is higher than the system pressure of system 3000 thereby improving the efficiency. The output of the compressor 3105 passes through the heat exchanger 3055 and into the oxidizer 224. The output of the oxidizer 224 passes through the turbine 3110 before passing through the heat exchanger 3055 and then into the piston expander 3020, after which the pressurized gas is exhausted to the environment. The absolute pressures and temperatures of the fluid at various numbered points, shown in FIG. 3-3, in the system 3100 are provided by way of illustration in the table below the drawing of FIG. 3-3.

FIG. 3-4 is a schematic representation of another embodiment of a Schnepel cycle power generation system 3150 according to certain aspects of the present disclosure. Many elements of system 3150 are common to system 3100 and their description is not repeated with respect to FIG. 3-4. In this example, the air-fuel mixture 3005 is pressurized by the compressor 3105 and then provided to the piston compressor 3010, which is the reverse of the configuration of system 3100. The pressures and temperatures of the fluid at various numbered points, shown in FIG. 3-4, in the system 3500 are provided in the table below the drawing of FIG. 3-4.

Figures 1, 2, 3, 4, 5, 6, 7:
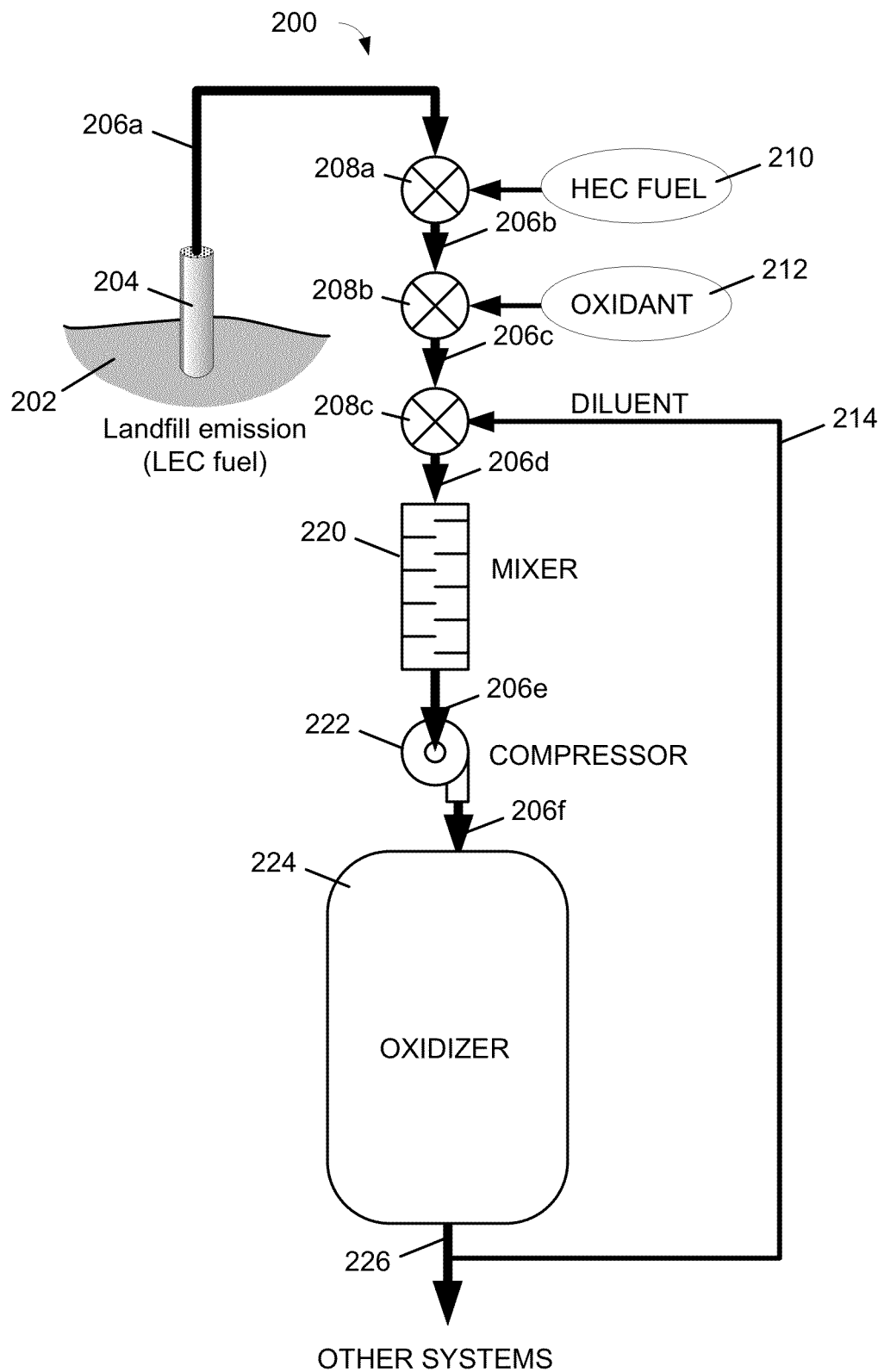
Figures 1, 2, 3, 4, 5, 6, 7, 8:
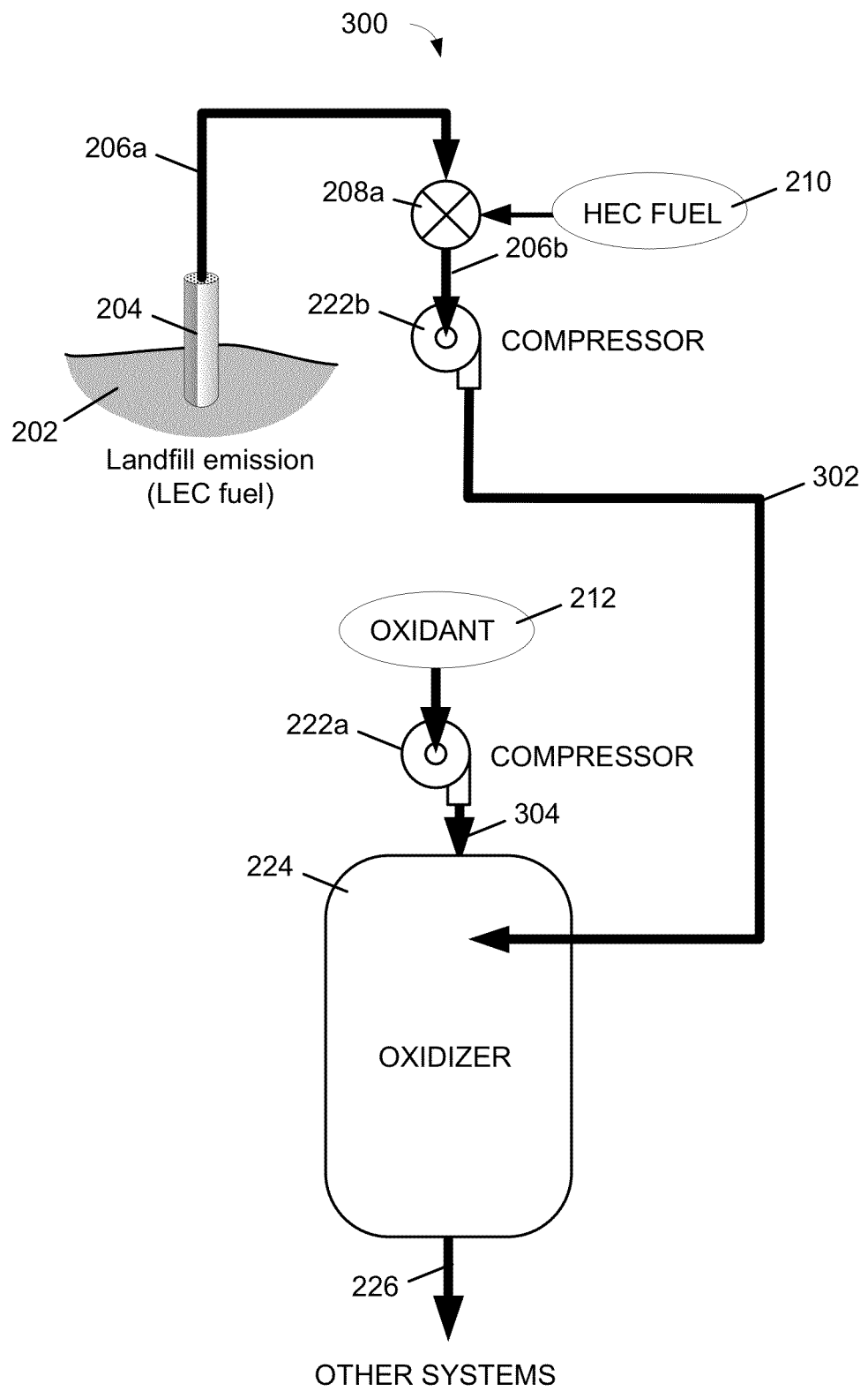
Figures 1, 2, 3, 4, 5, 6, 7, 8, 9:
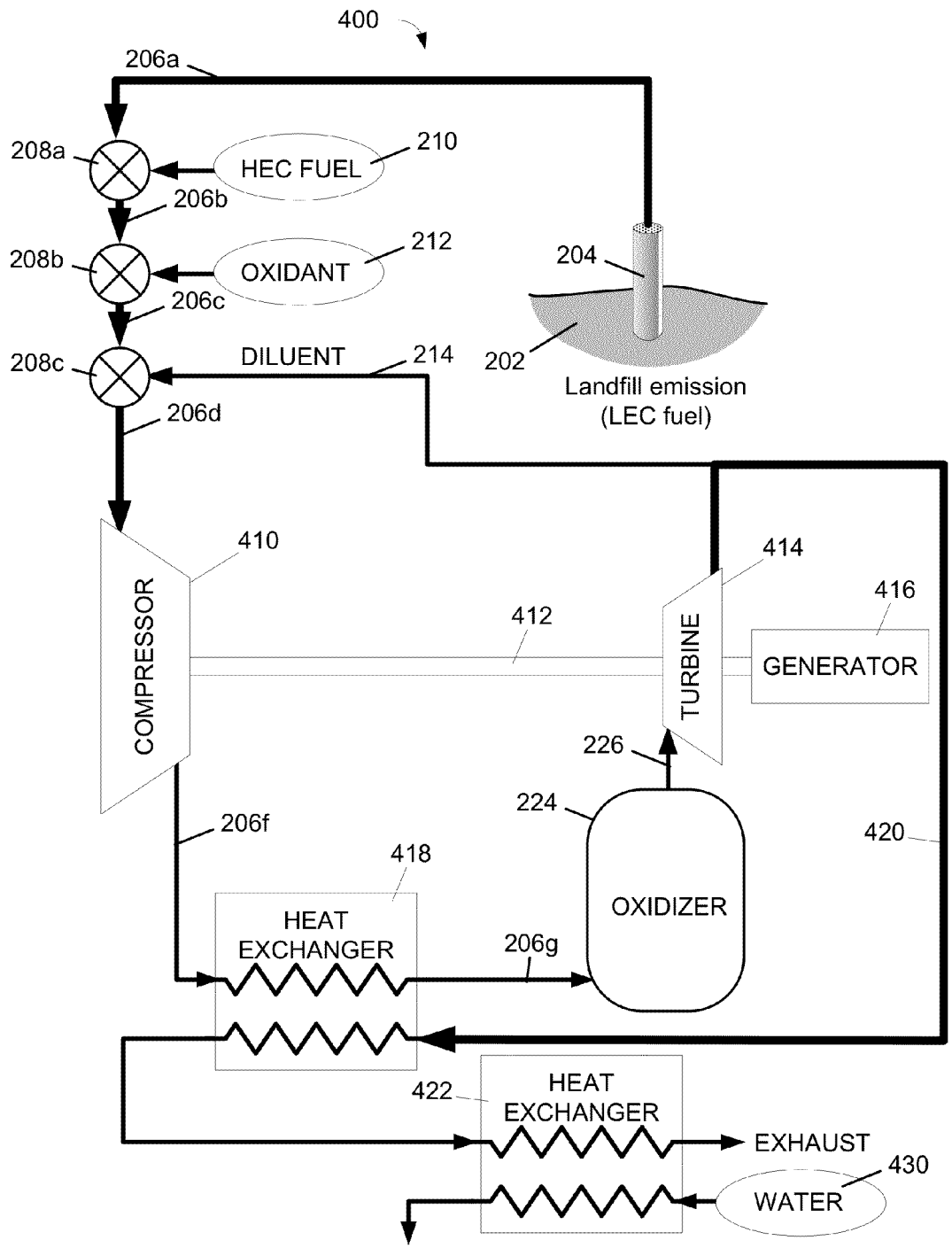
Figures 1, 2, 3, 4, 5, 6, 7, 8, 9, 10:
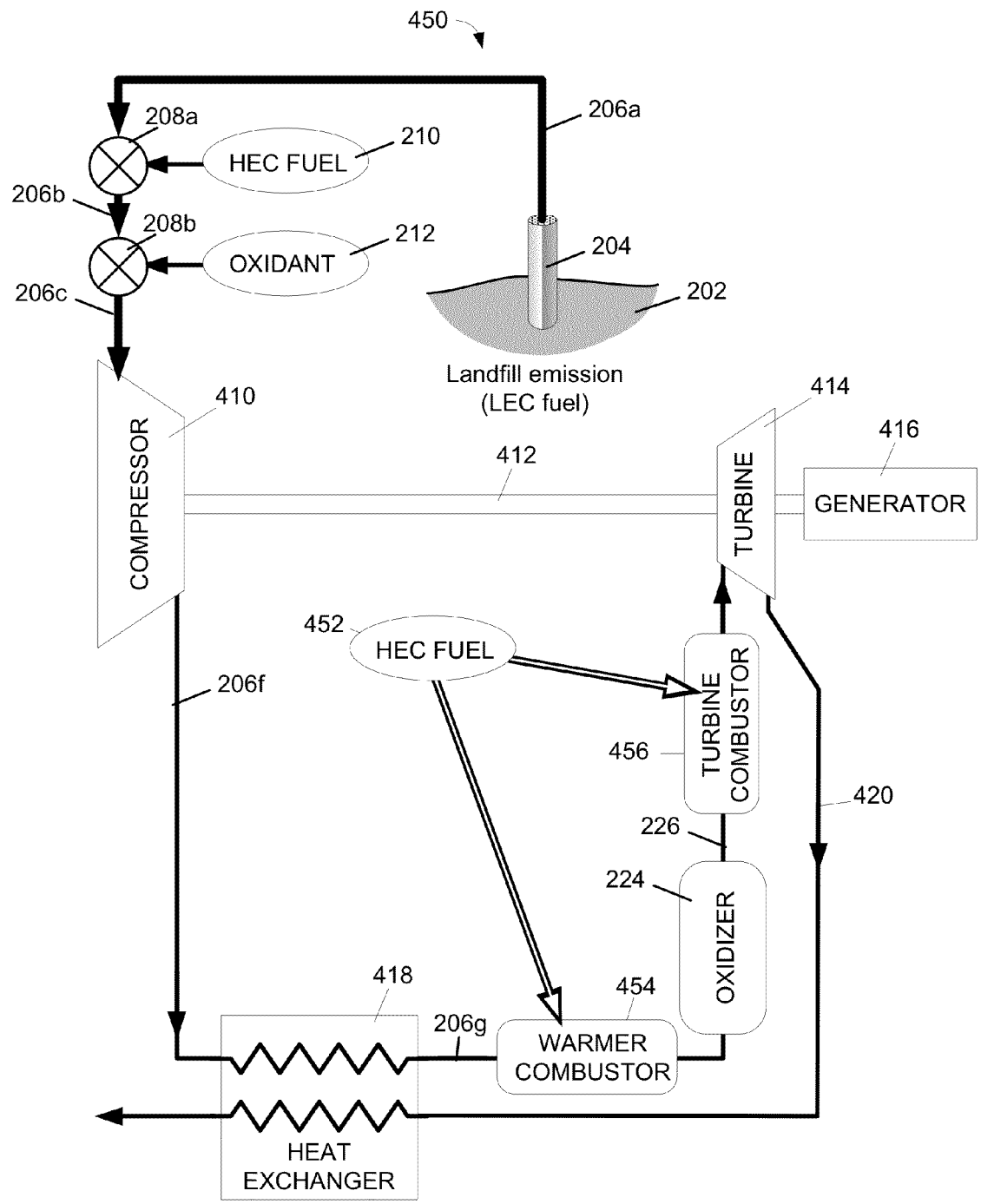
Figures 1, 2, 3, 4, 5, 6, 7, 8, 9, 10, 11:
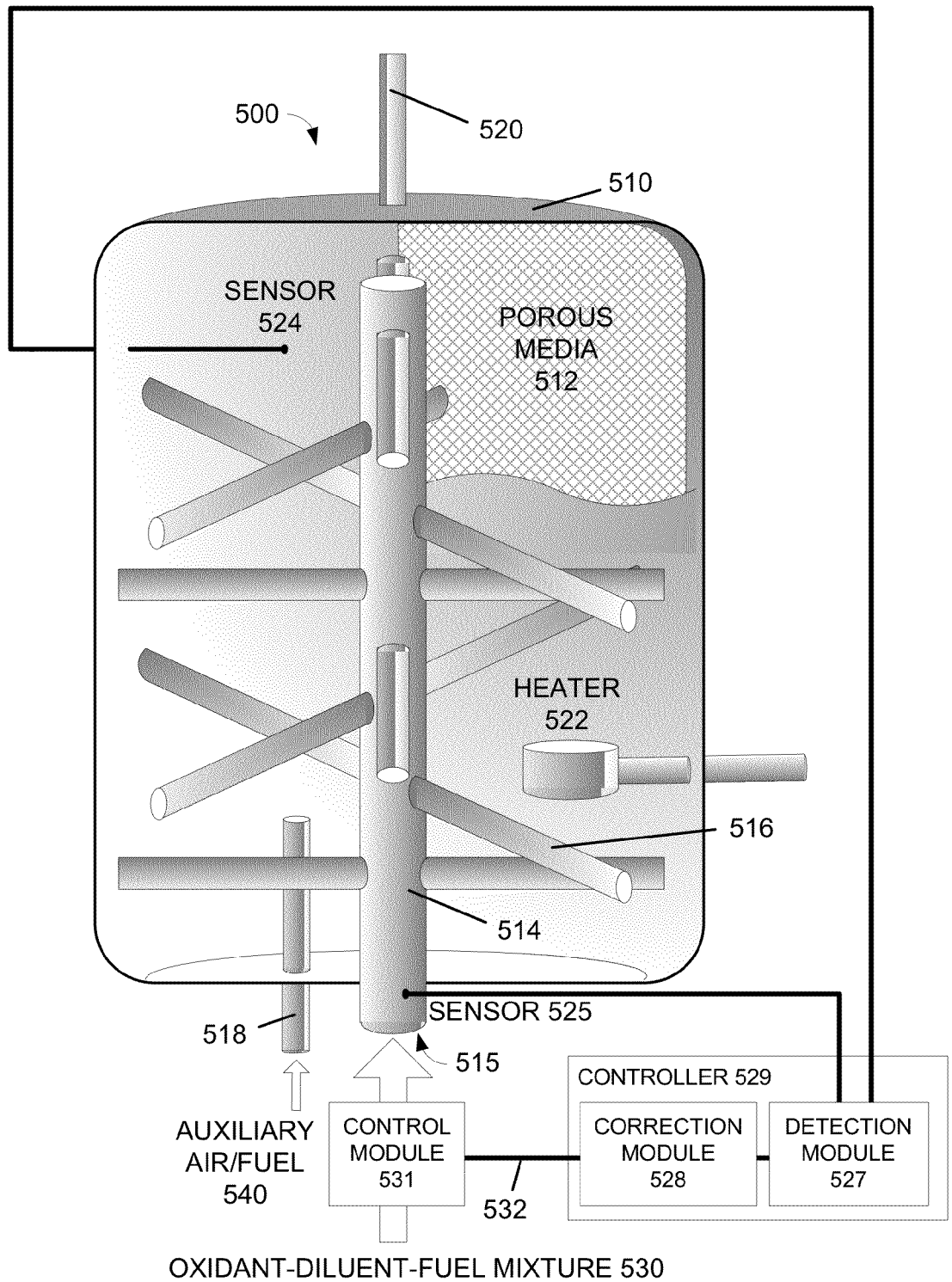
Figures 1, 2, 3, 4, 5, 6, 7, 8, 9, 10, 11, 12:
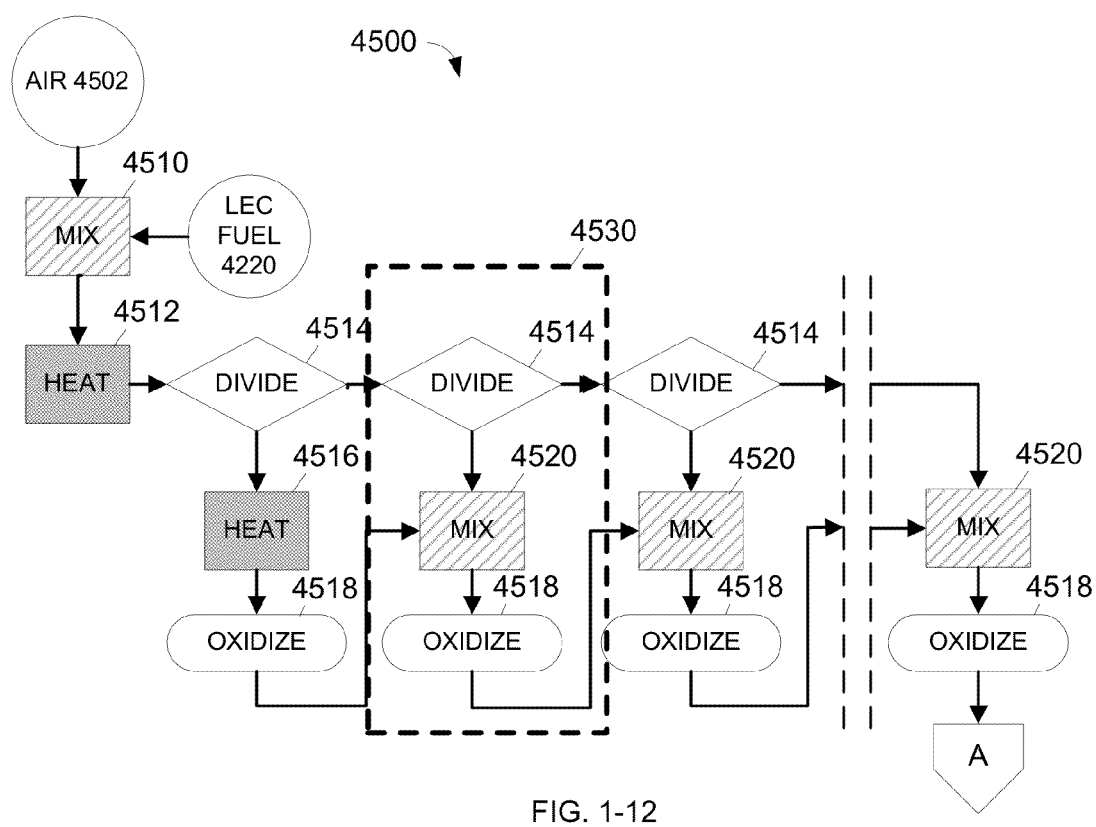
Figures 1, 2, 3, 4, 5, 6, 7, 8, 9, 10, 11, 12, 13, 14, 15, 15B:
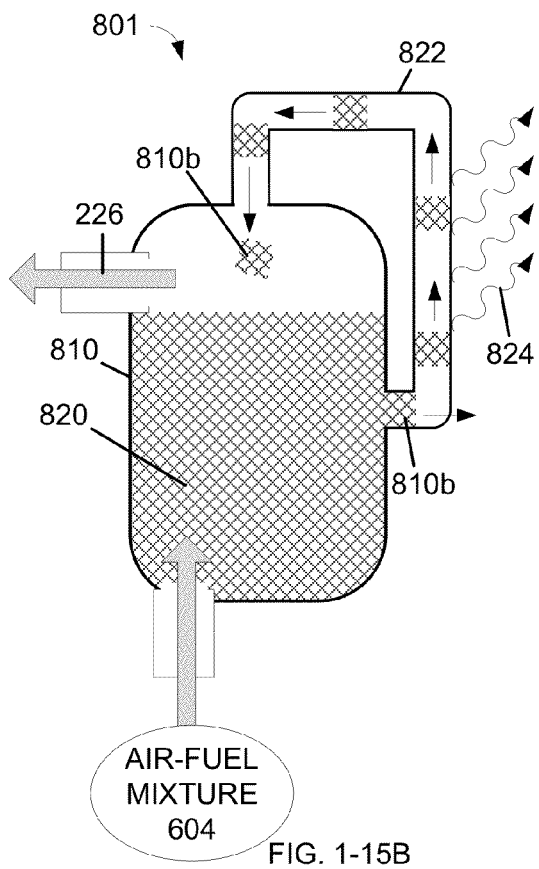
Figures 1, 2, 3, 4, 5, 6, 7, 8, 9, 10, 11, 12, 13, 14, 15, 16:
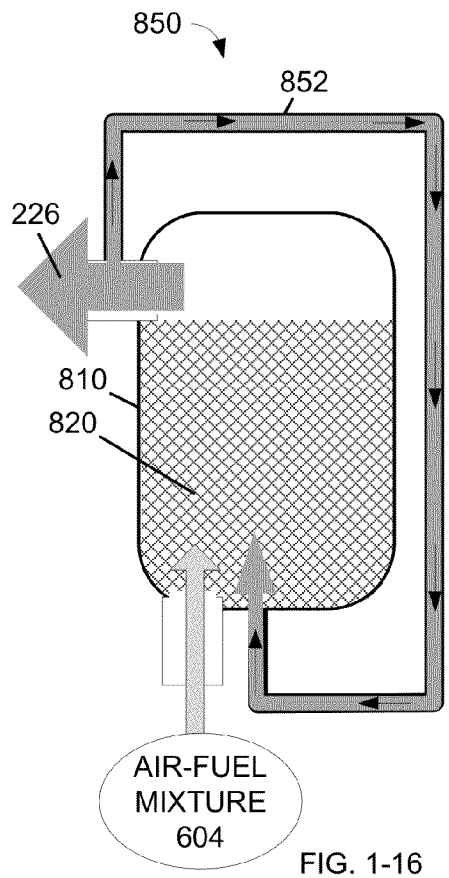
Figures 1, 2, 3, 4, 5, 6, 7, 8, 9, 10, 11, 12, 13, 14, 15, 16, 17, 17A:
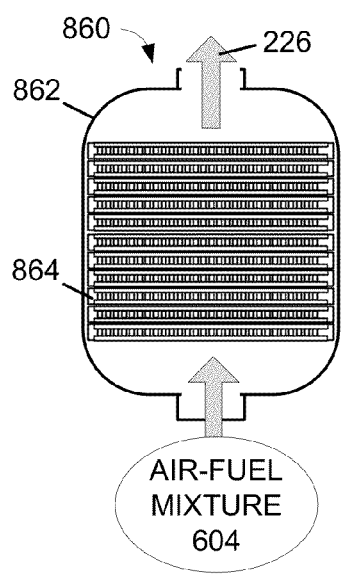
Figures 1, 2, 3, 4, 5, 6, 7, 8, 9, 10, 11, 12, 13, 14, 15, 16, 17, 17B:
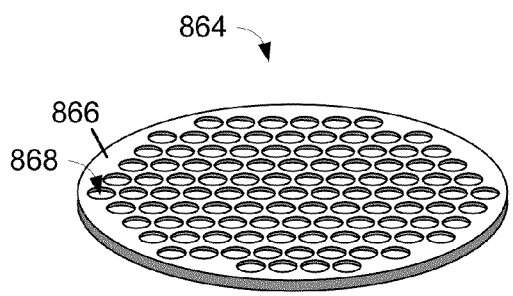
Figures 1, 2:
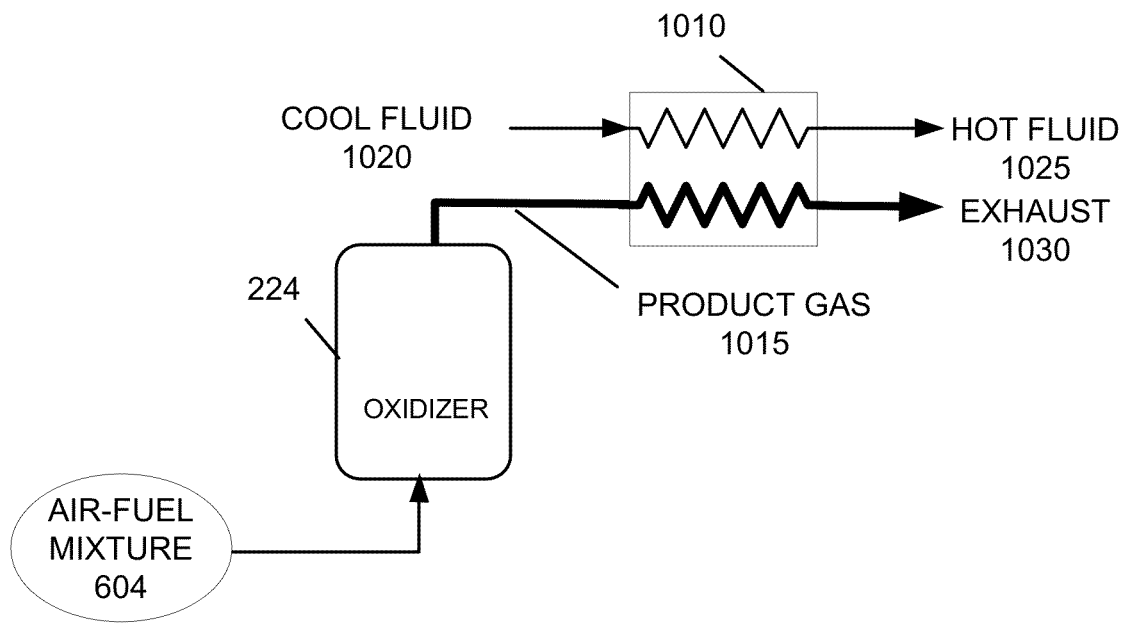
Figure 2:
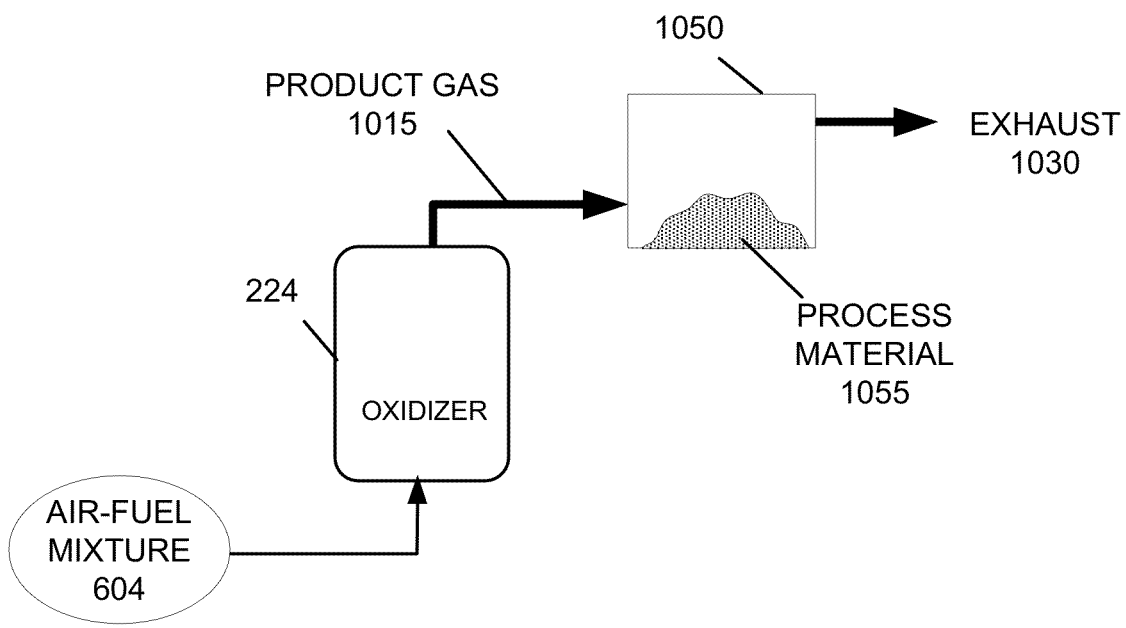
Figures 2, 3:
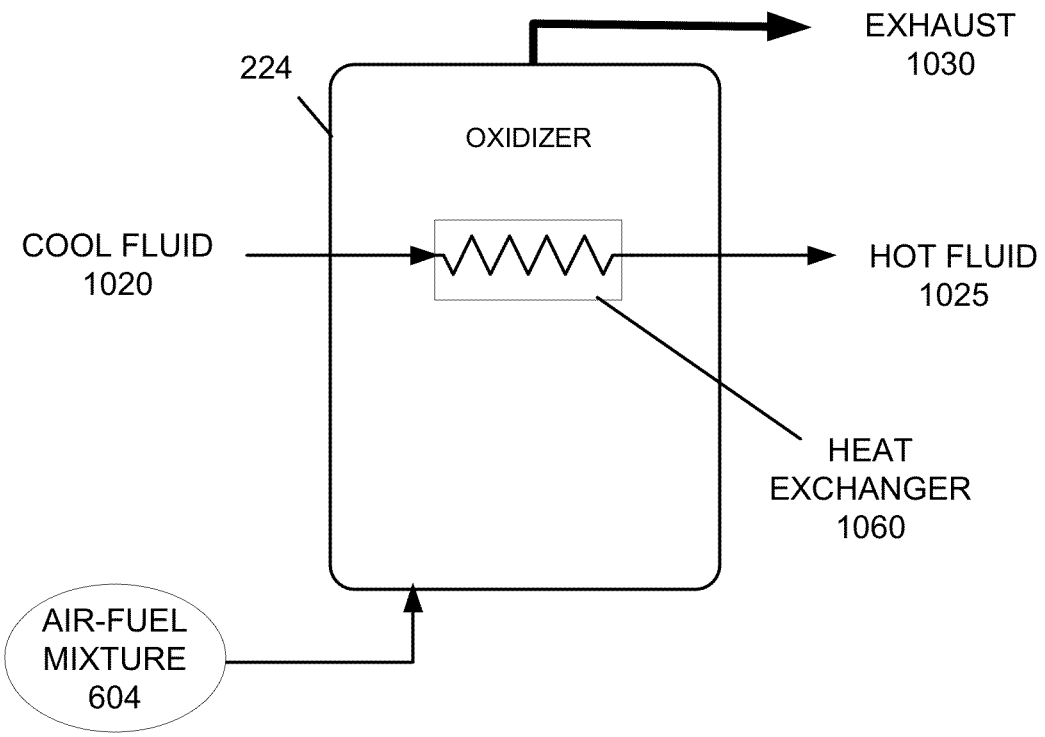
Figures 2, 3, 4:
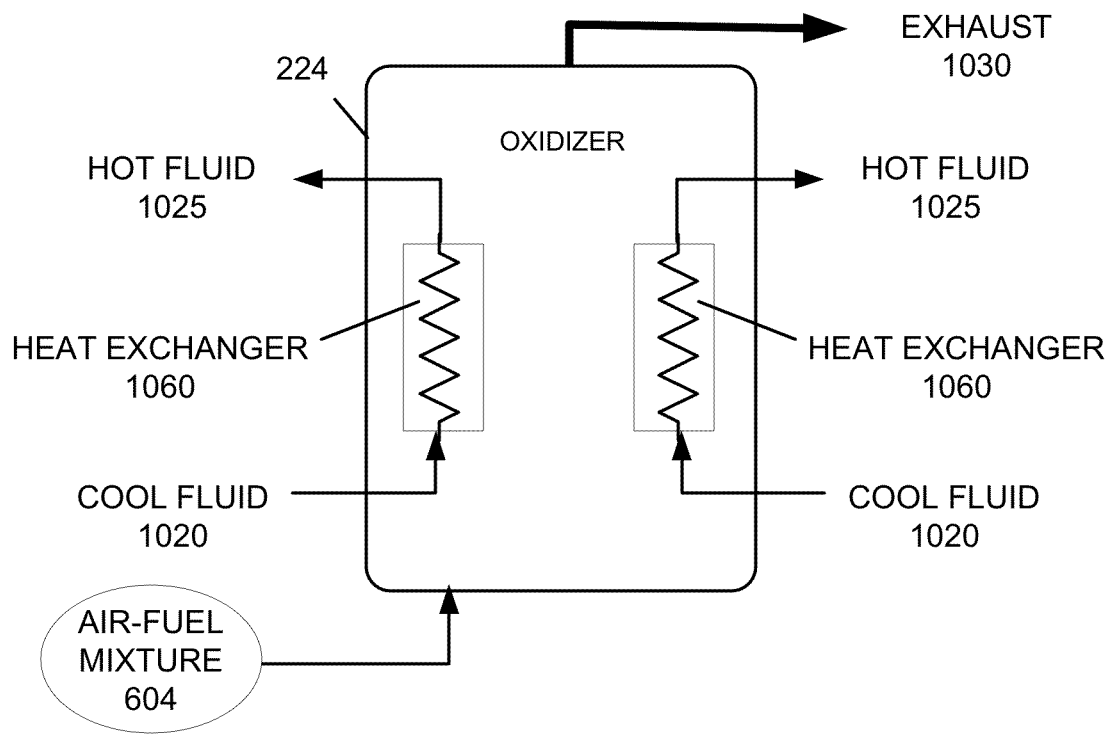
Figures 2, 3, 4, 5:
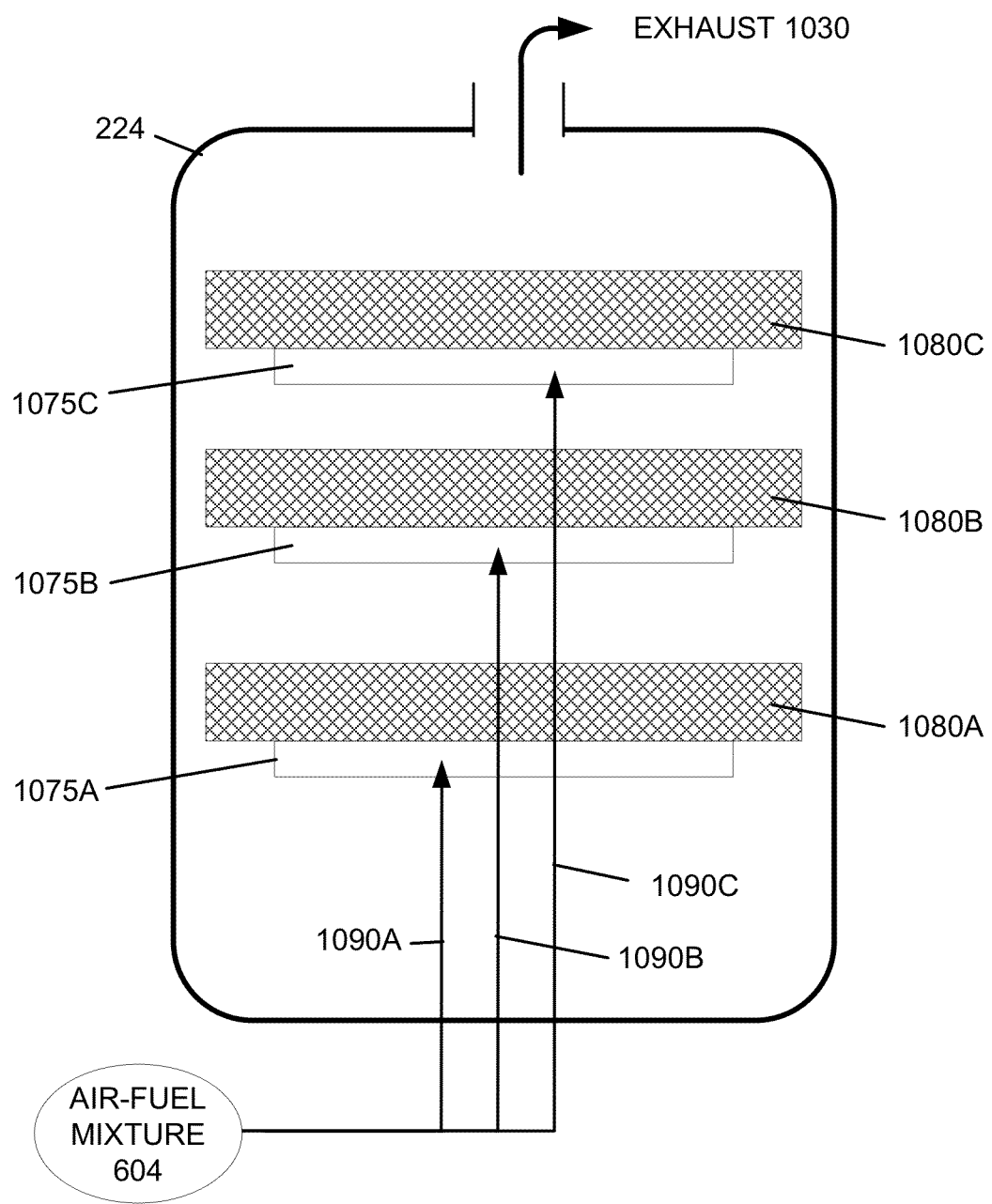
Figures 2, 3, 4, 5, 6:
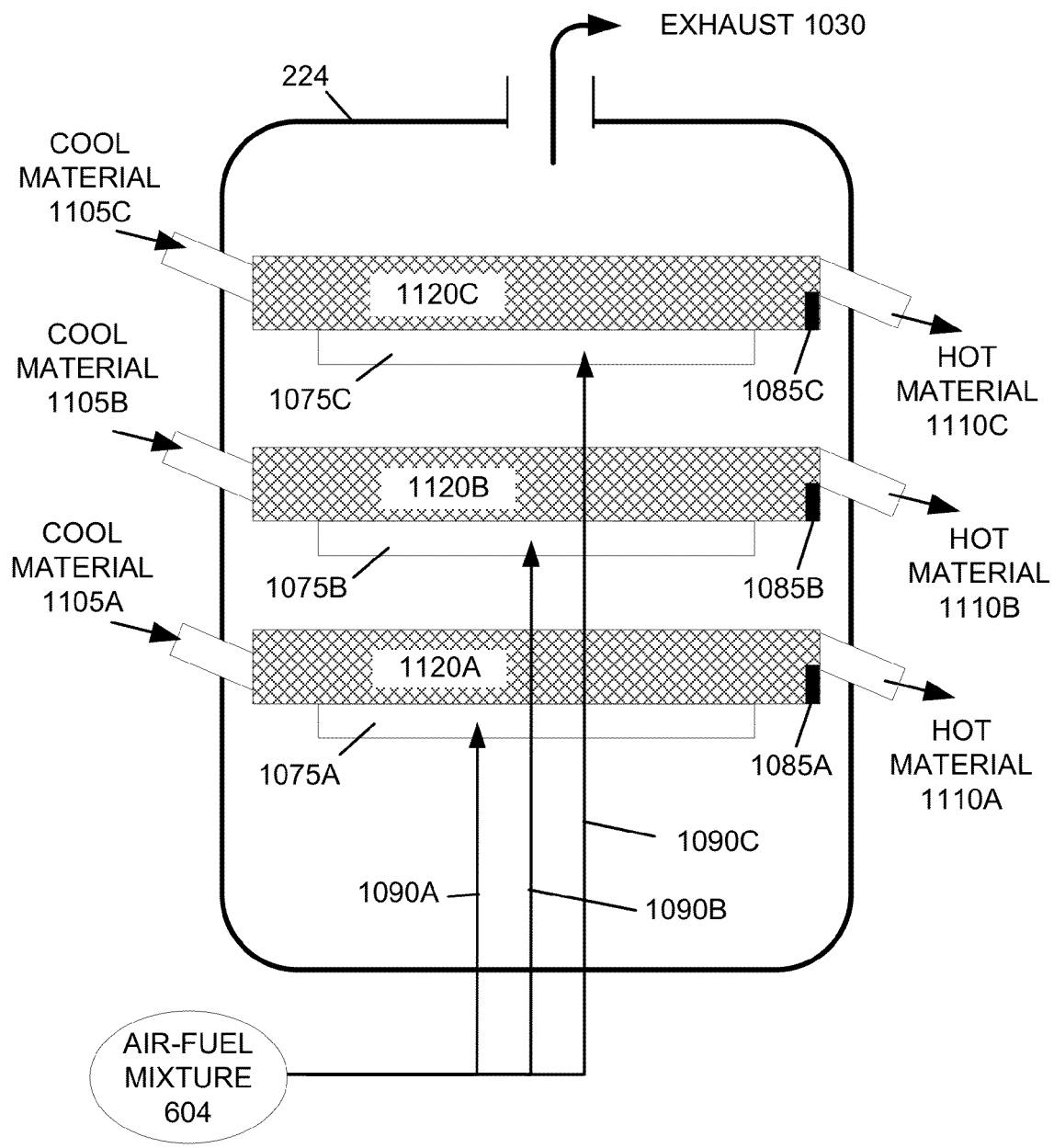
Figures 2, 3, 4, 5, 6, 7, 7A:
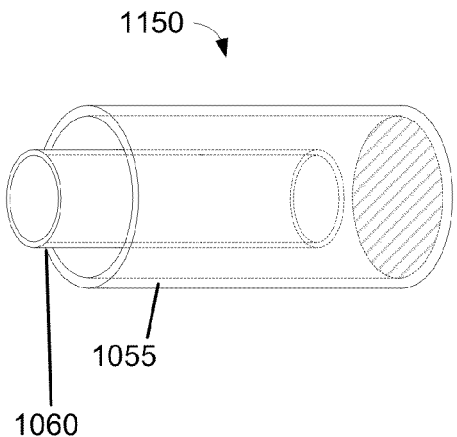
Figures 2, 3, 4, 5, 6, 7, 7B:
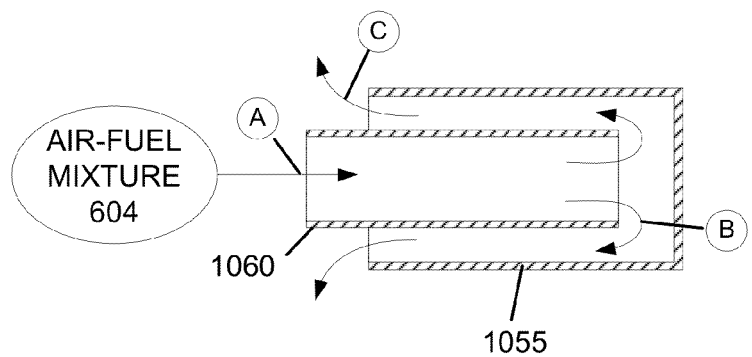
Figures 2, 3, 4, 5, 6, 7, 8:
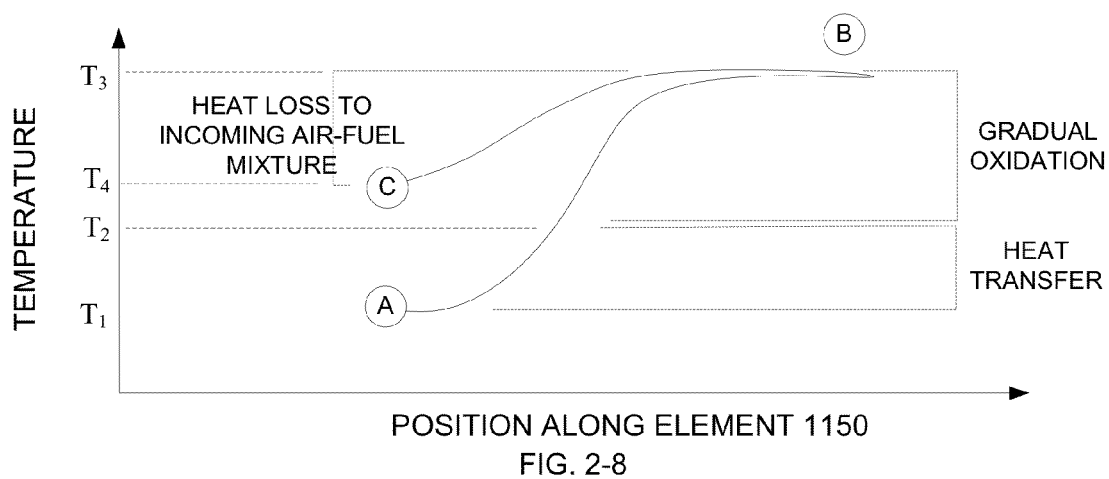
Figures 2, 3, 4, 5, 6, 7, 8, 9:
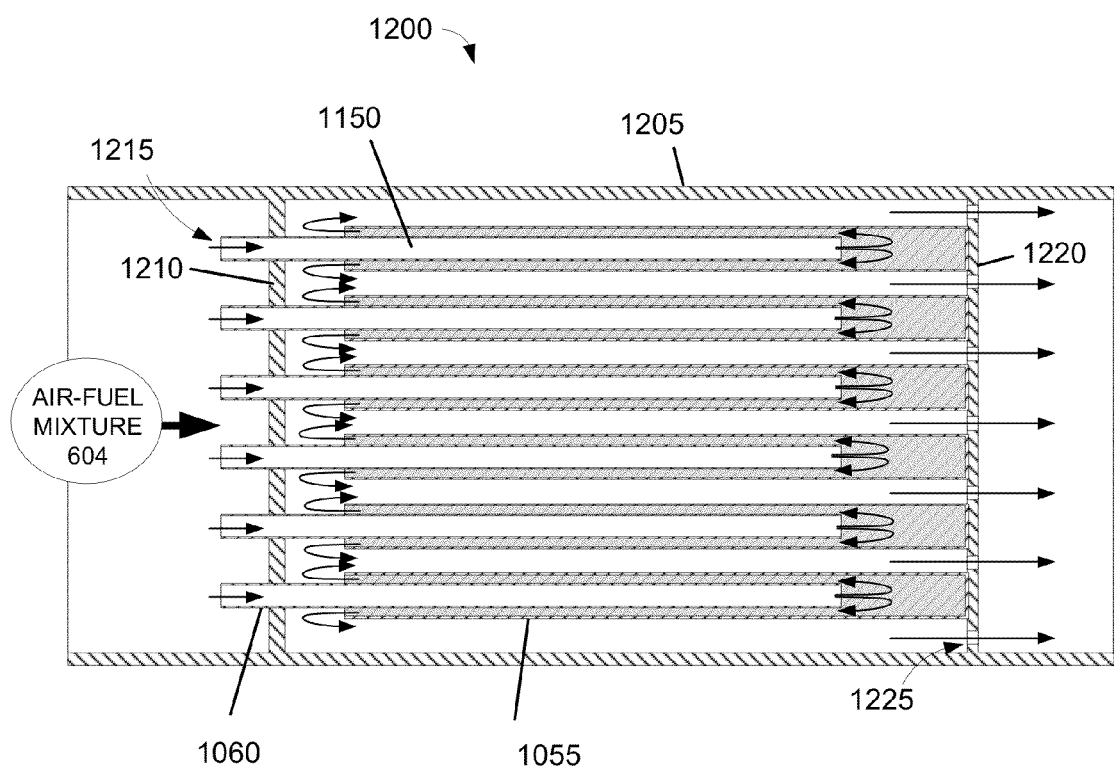
Figures 1, 3:
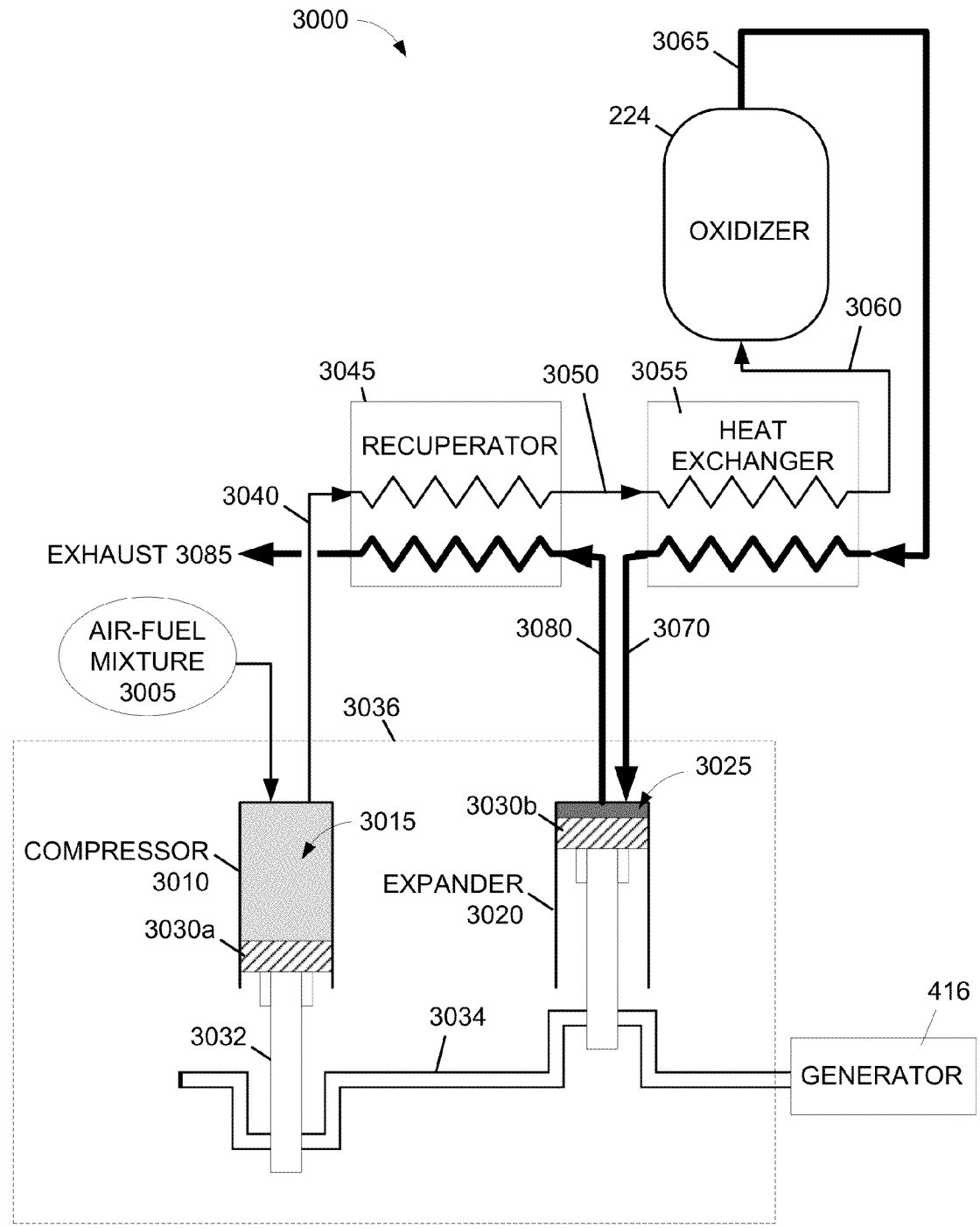
Figures 2, 3:
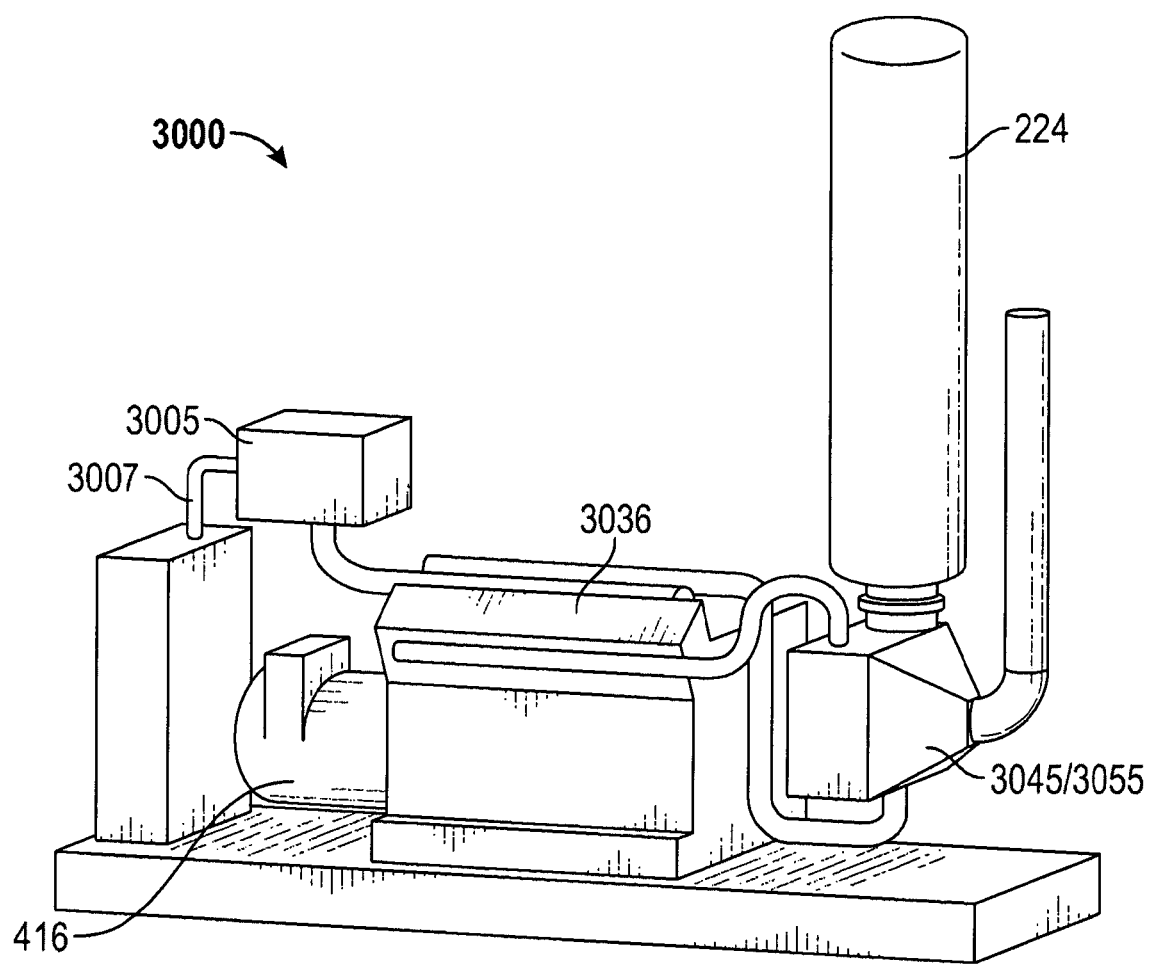
Figure 3:
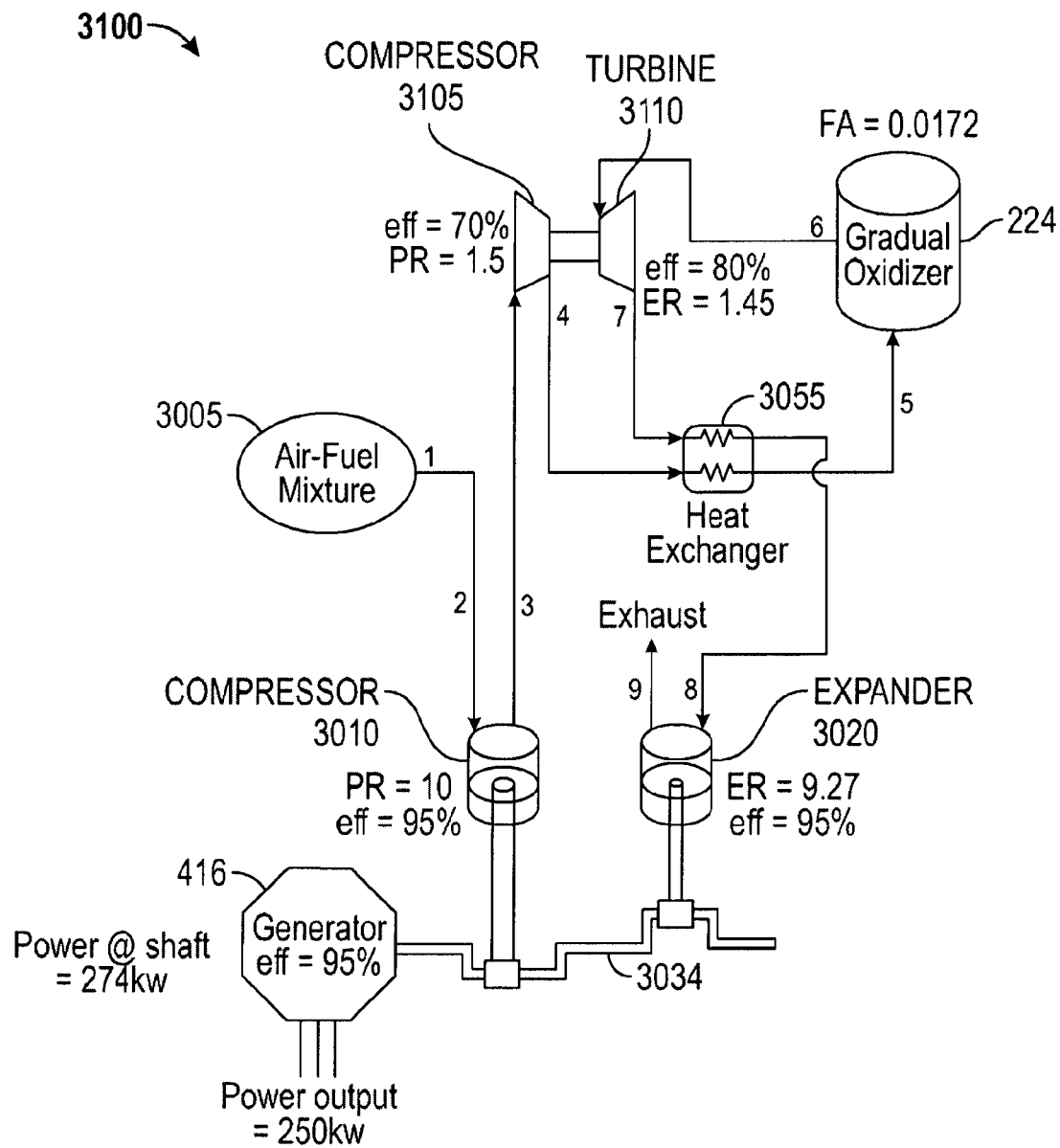
Figures 3, 4:
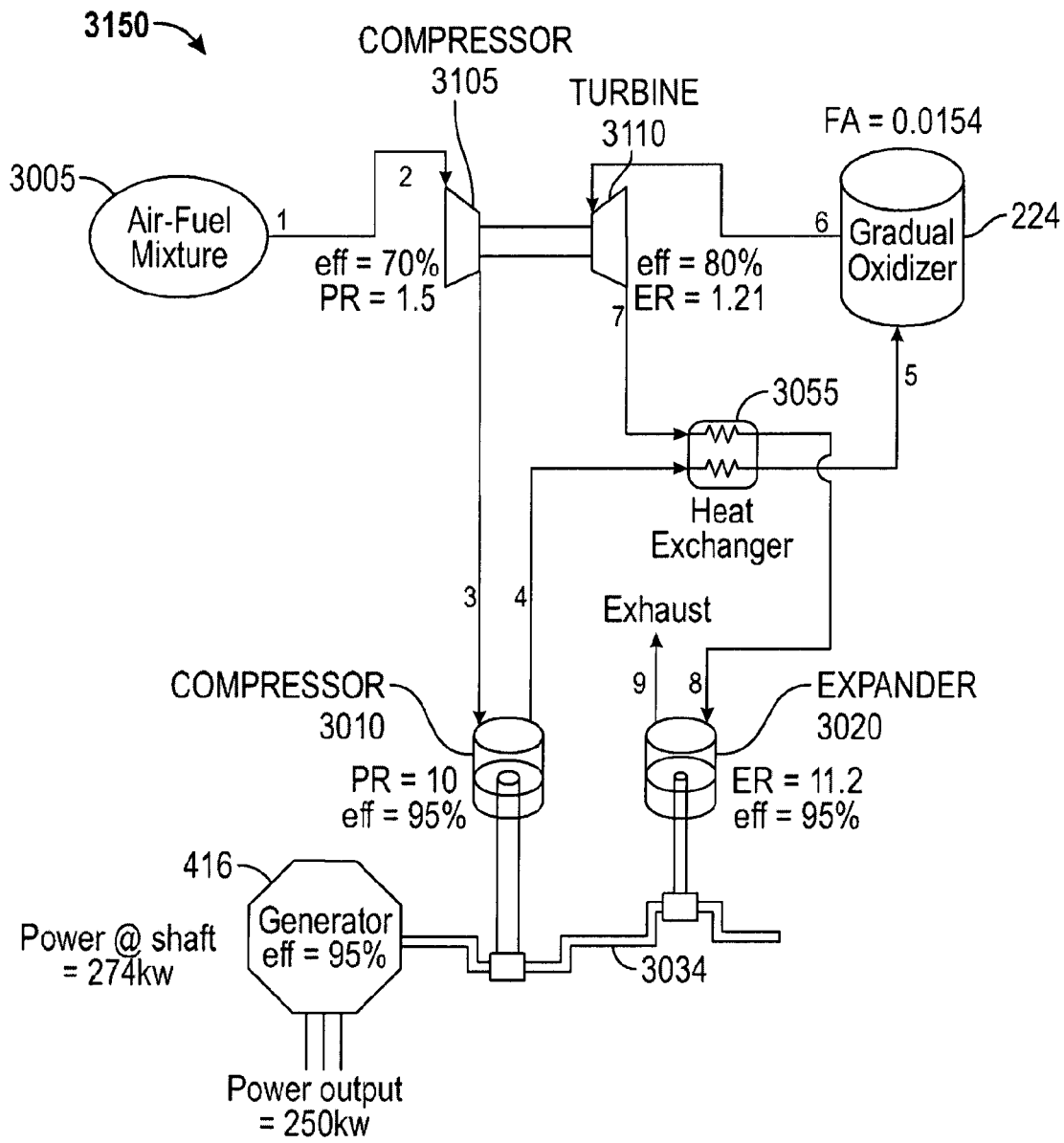
Figures 3, 4, 5:
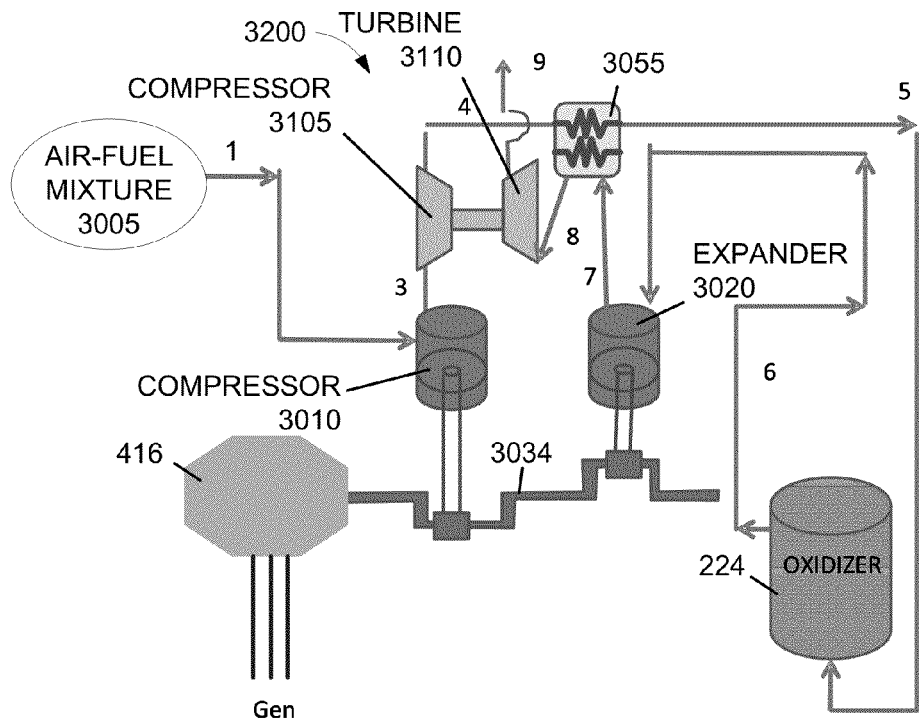
Figures 3, 4, 5, 6:
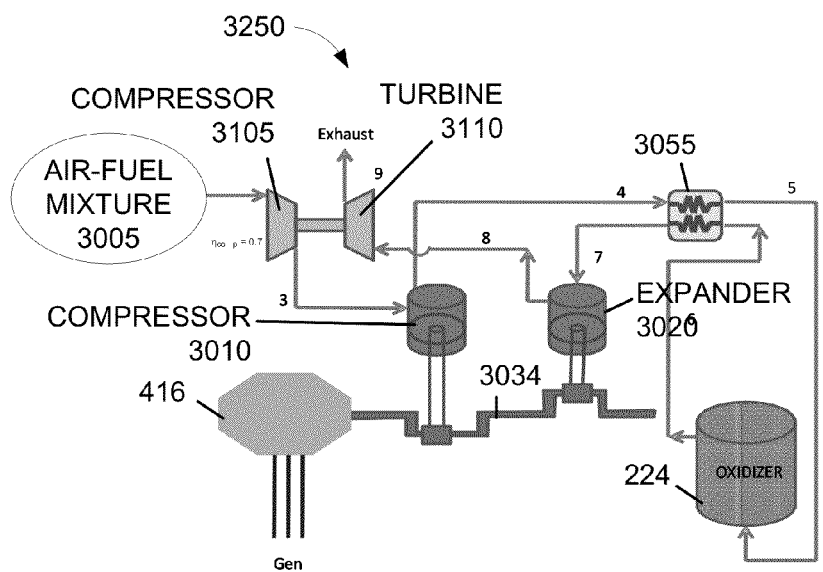
Figures 3, 4, 5, 6, 7:
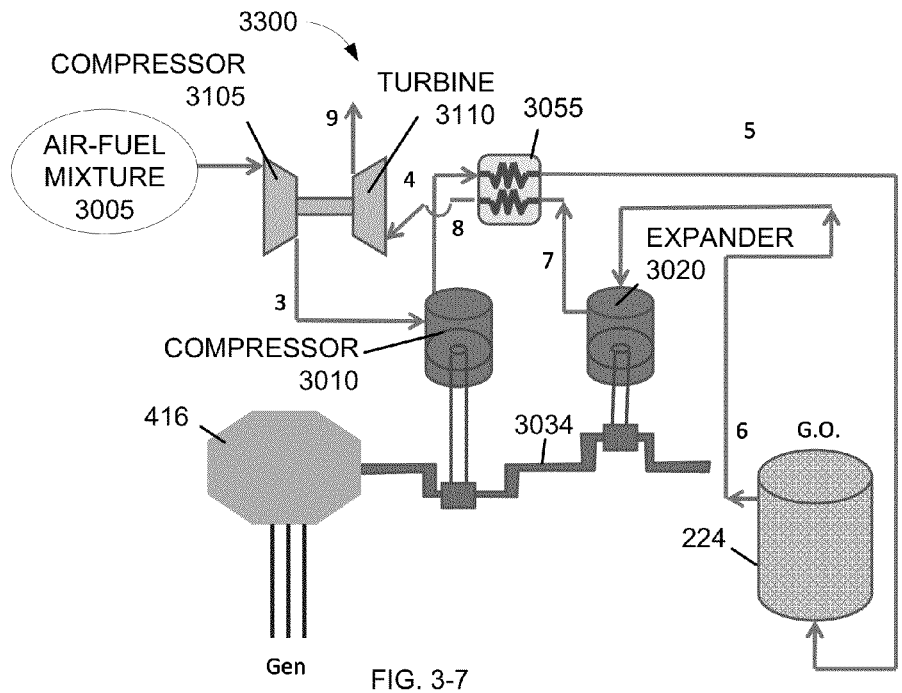
Figures 3, 4, 5, 6, 7, 8:
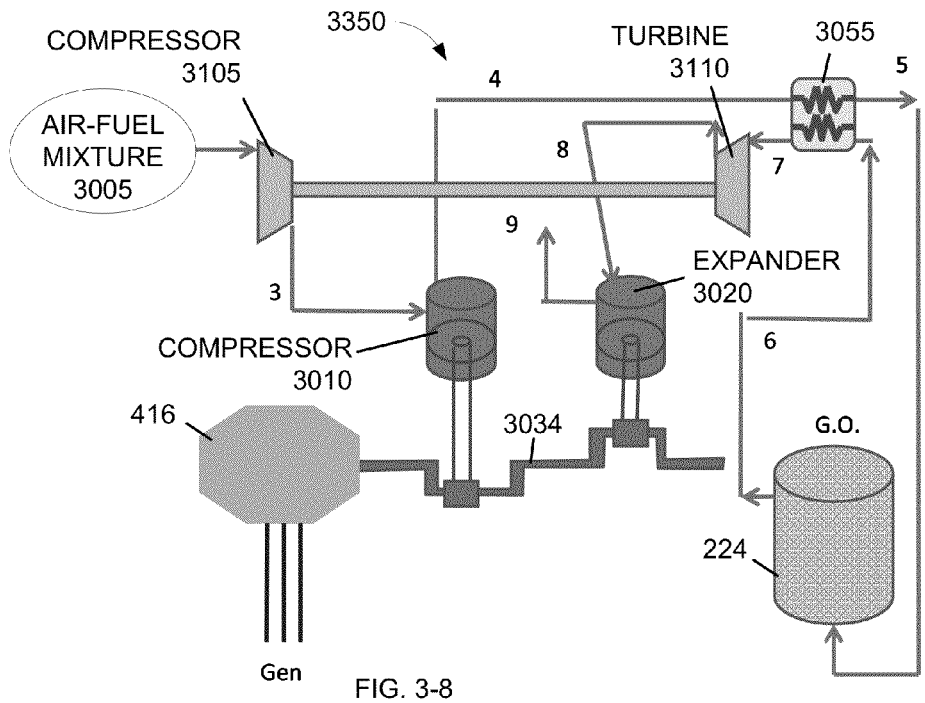
Figures 3, 4, 5, 6, 7, 8, 9:
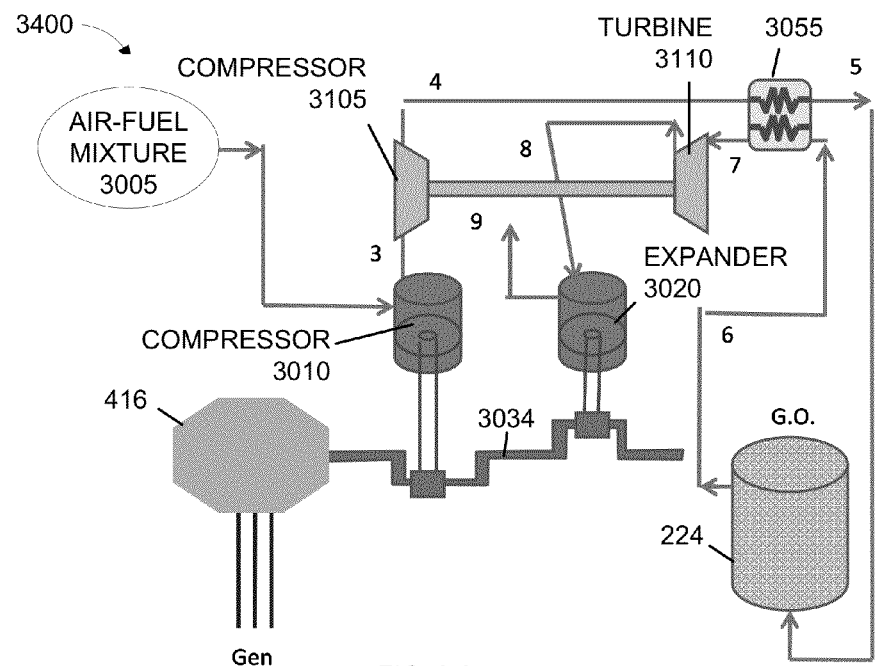
Figures 3, 4, 5, 6, 7, 8, 9, 10:
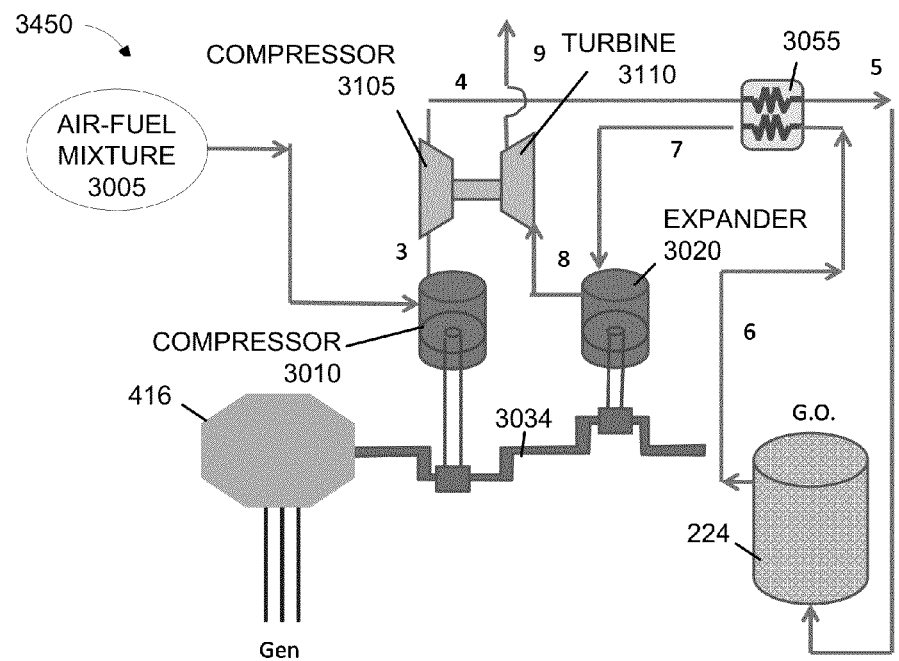
Figures 1, 4:
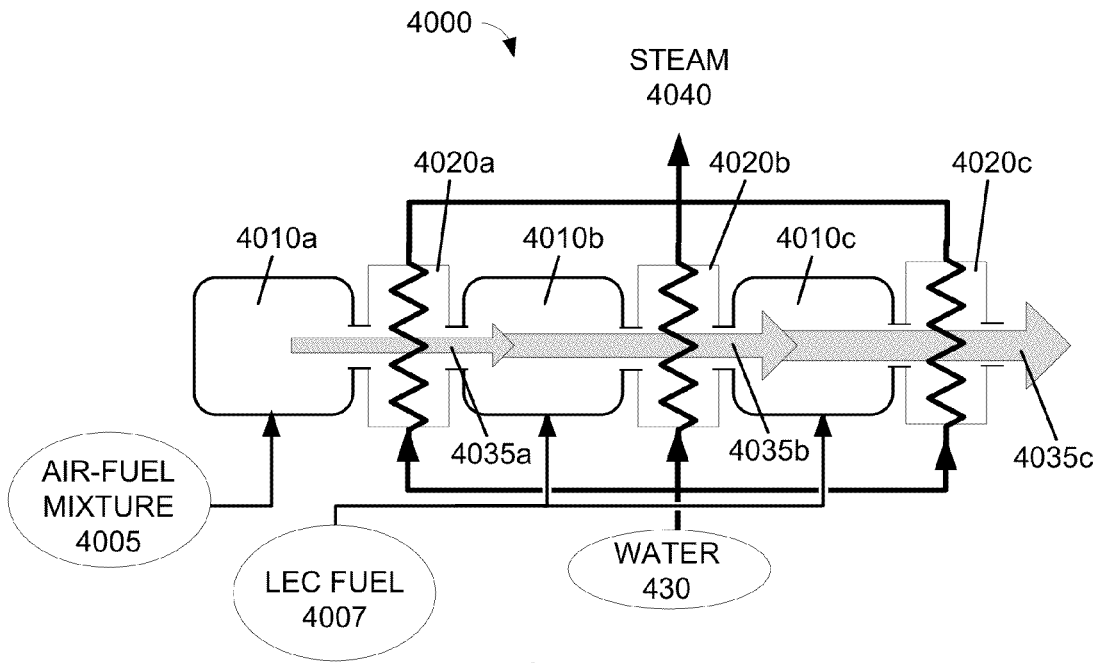
Figures 2, 4:
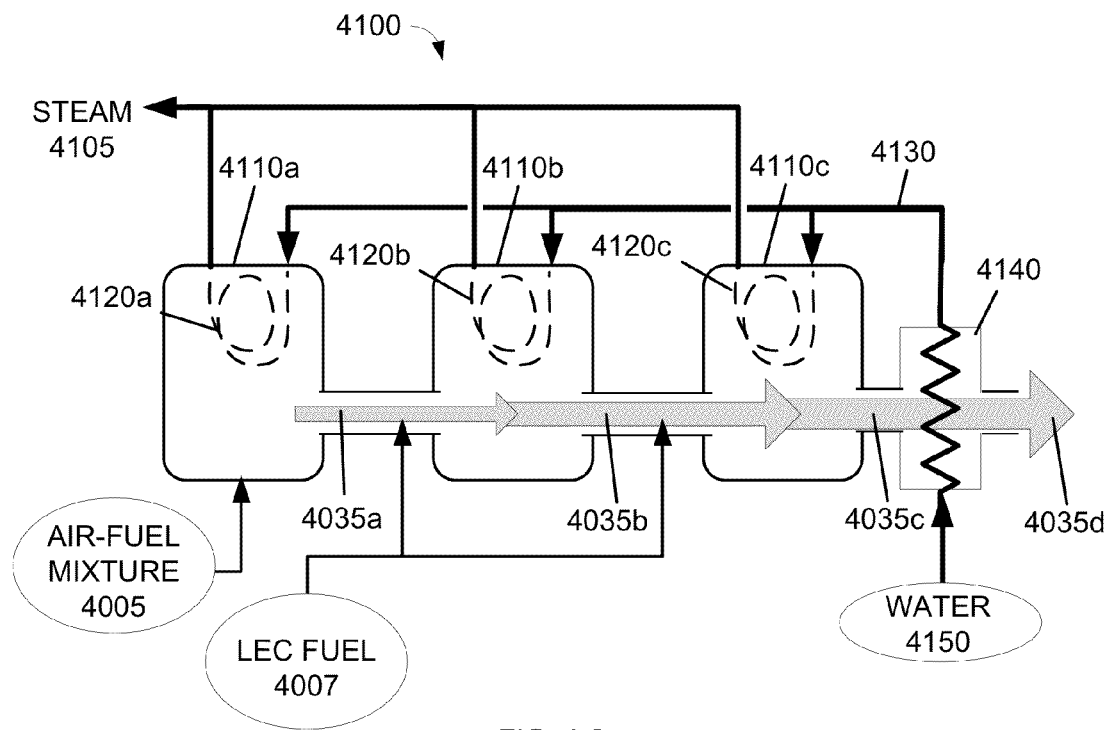
Figures 3, 4:
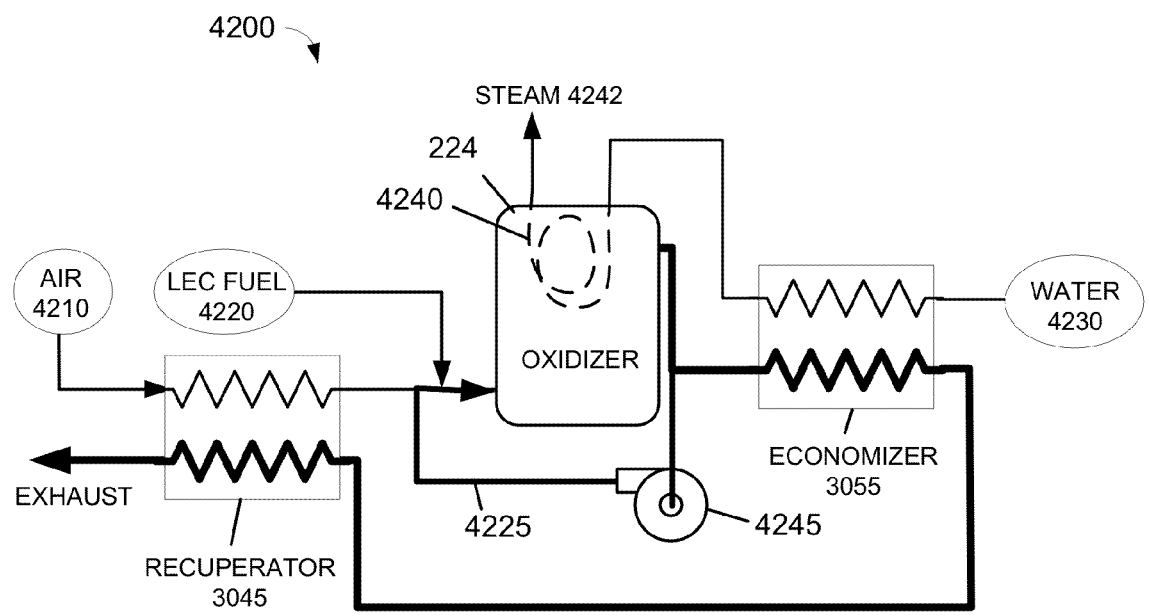
Figure 4:
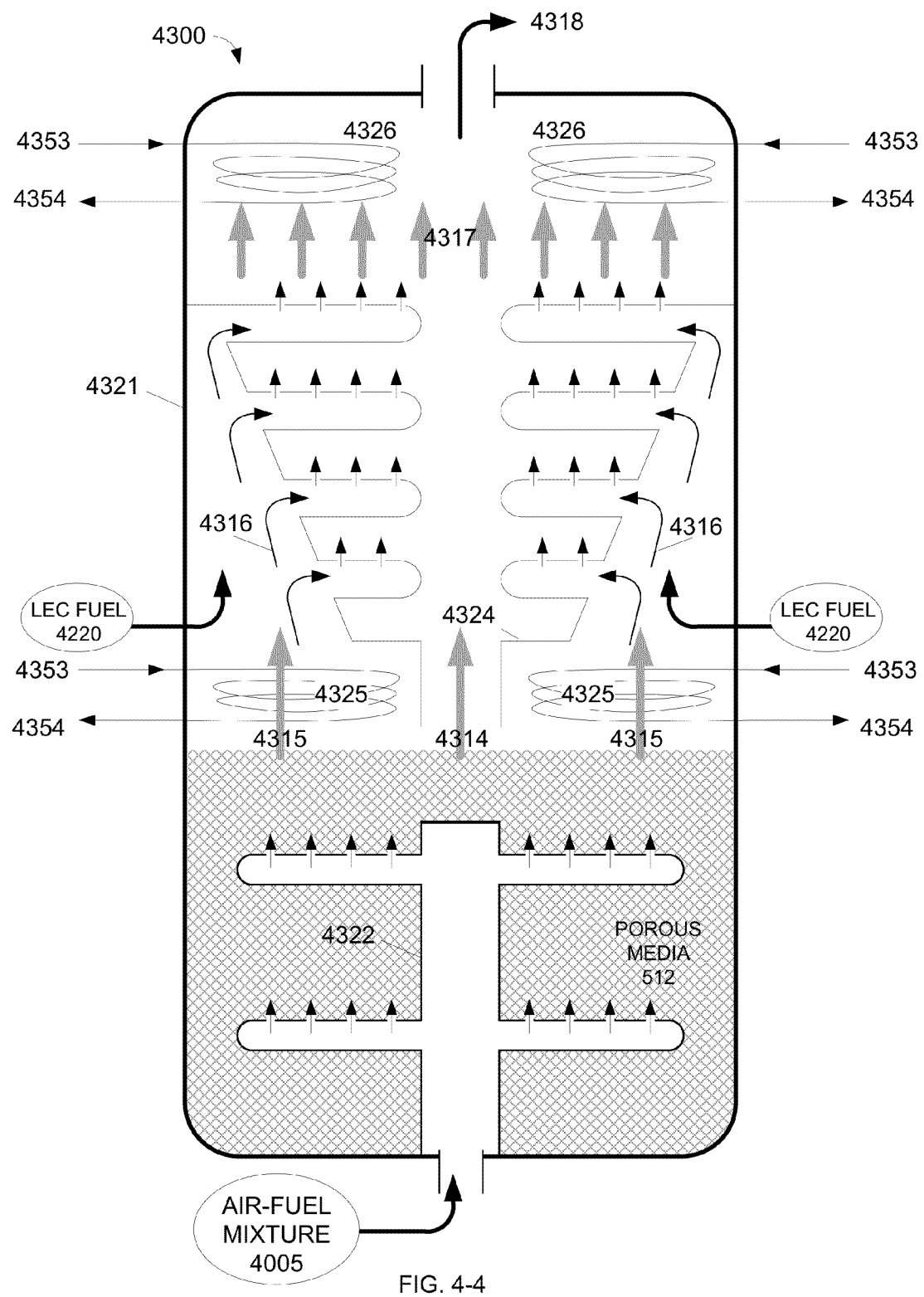
Figures 4, 5:
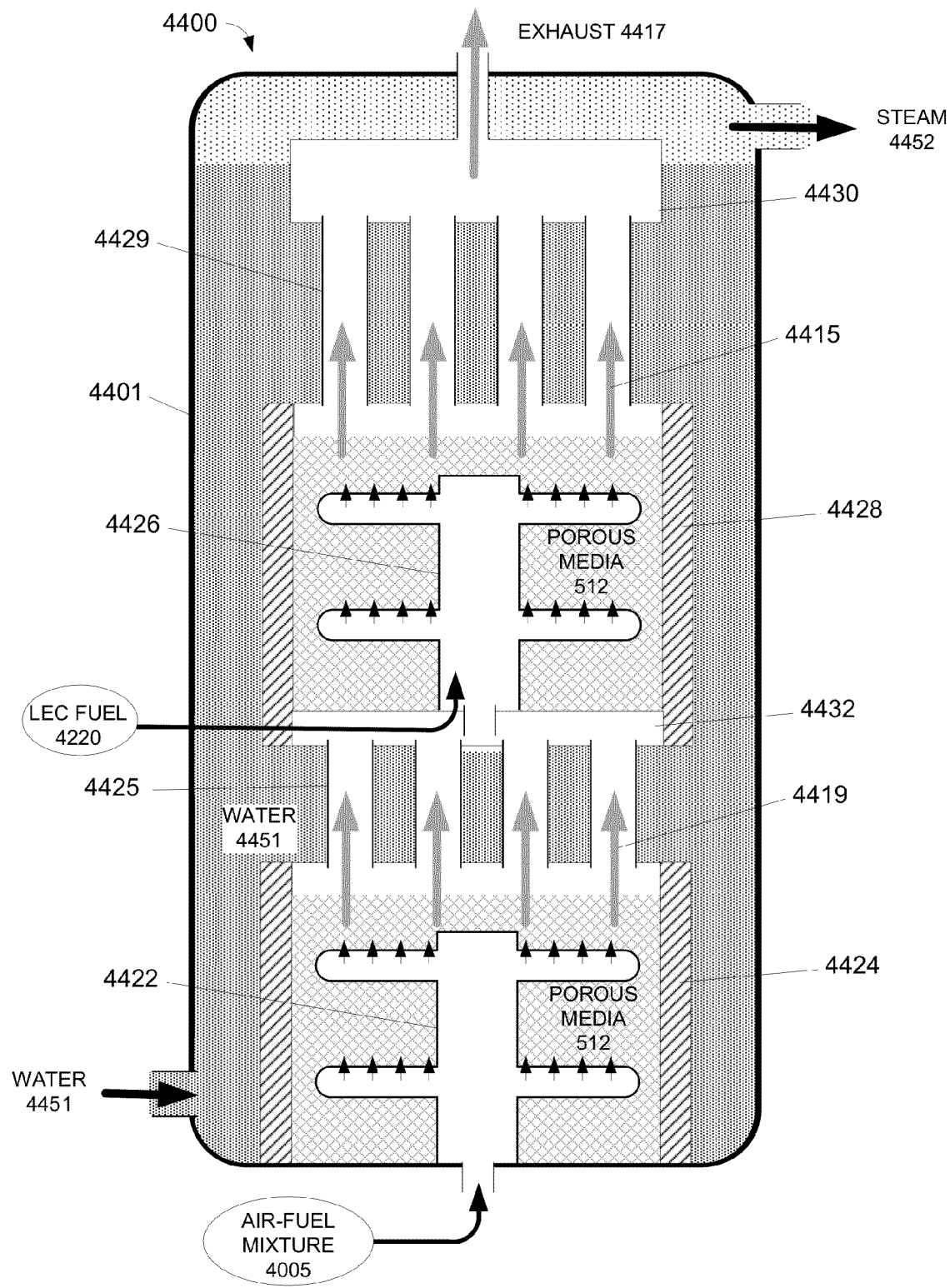
Figures 4, 5, 6:
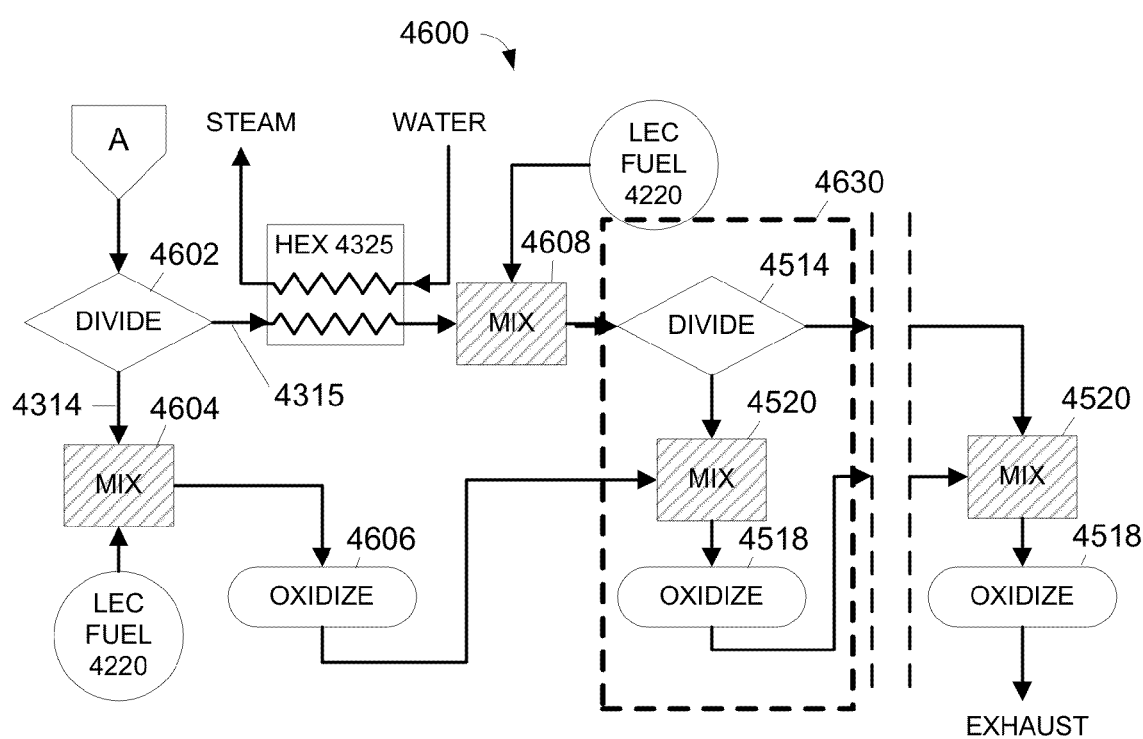
Figures 1, 5:
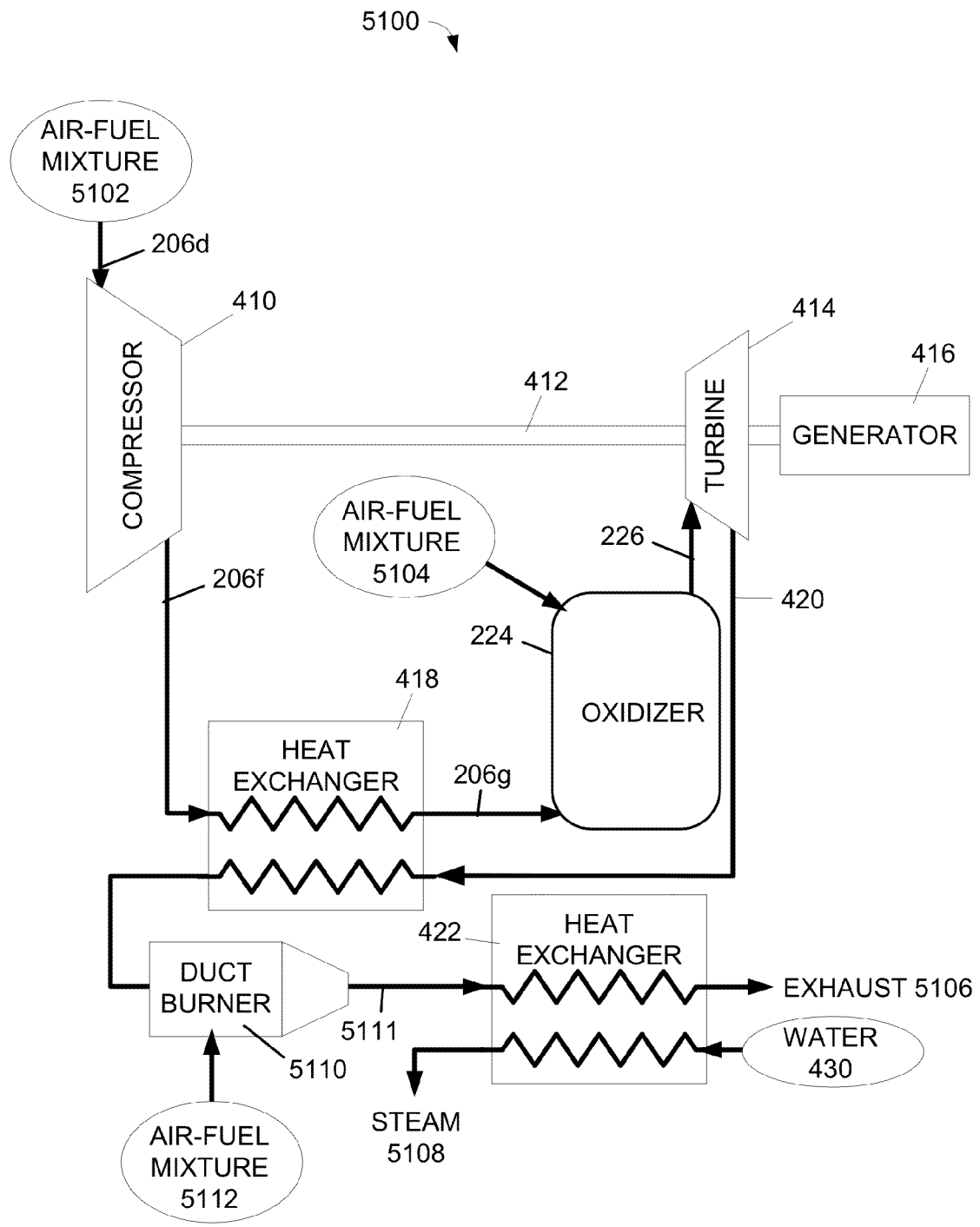
Figures 2, 5:
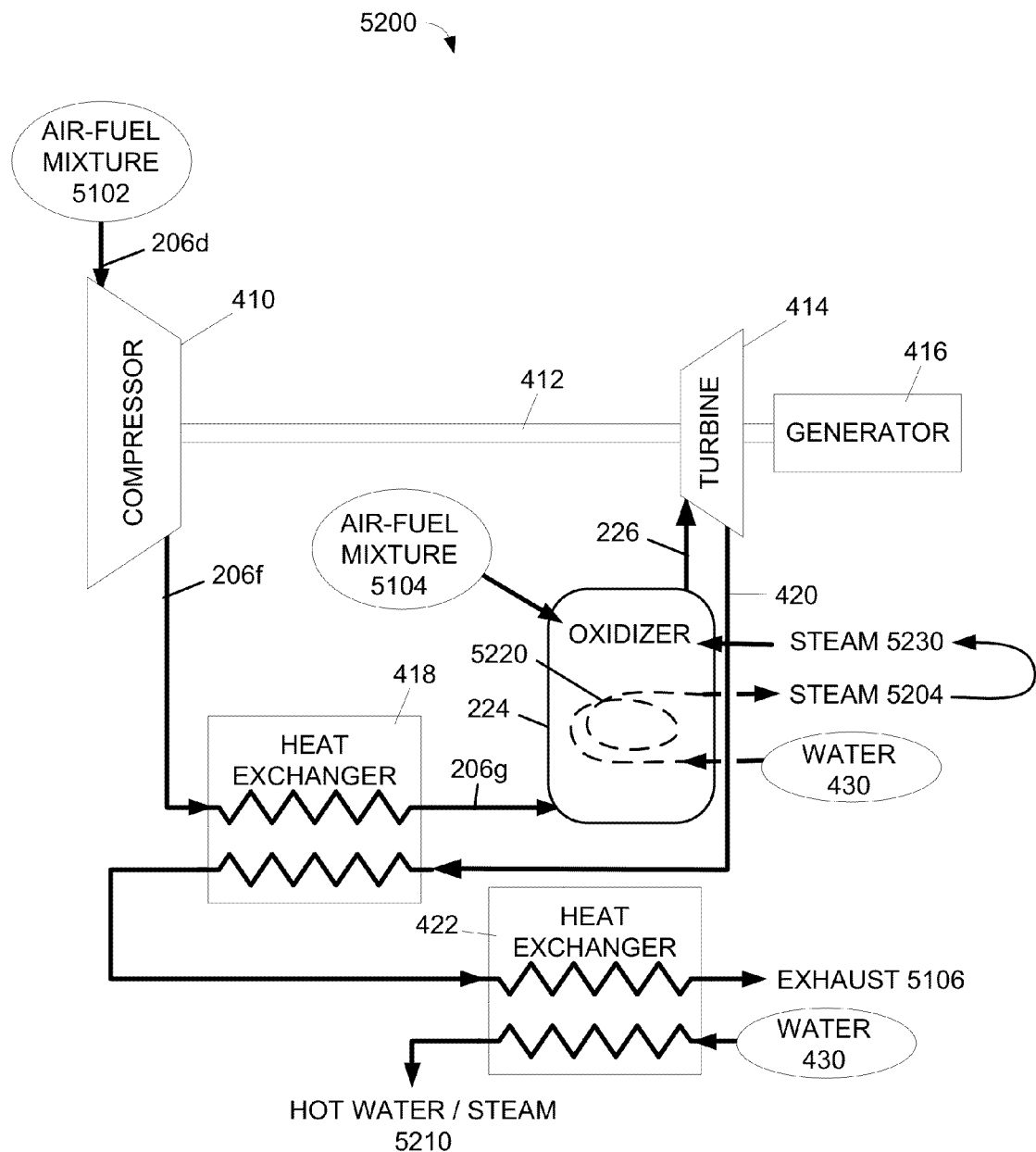
Figures 3, 5:
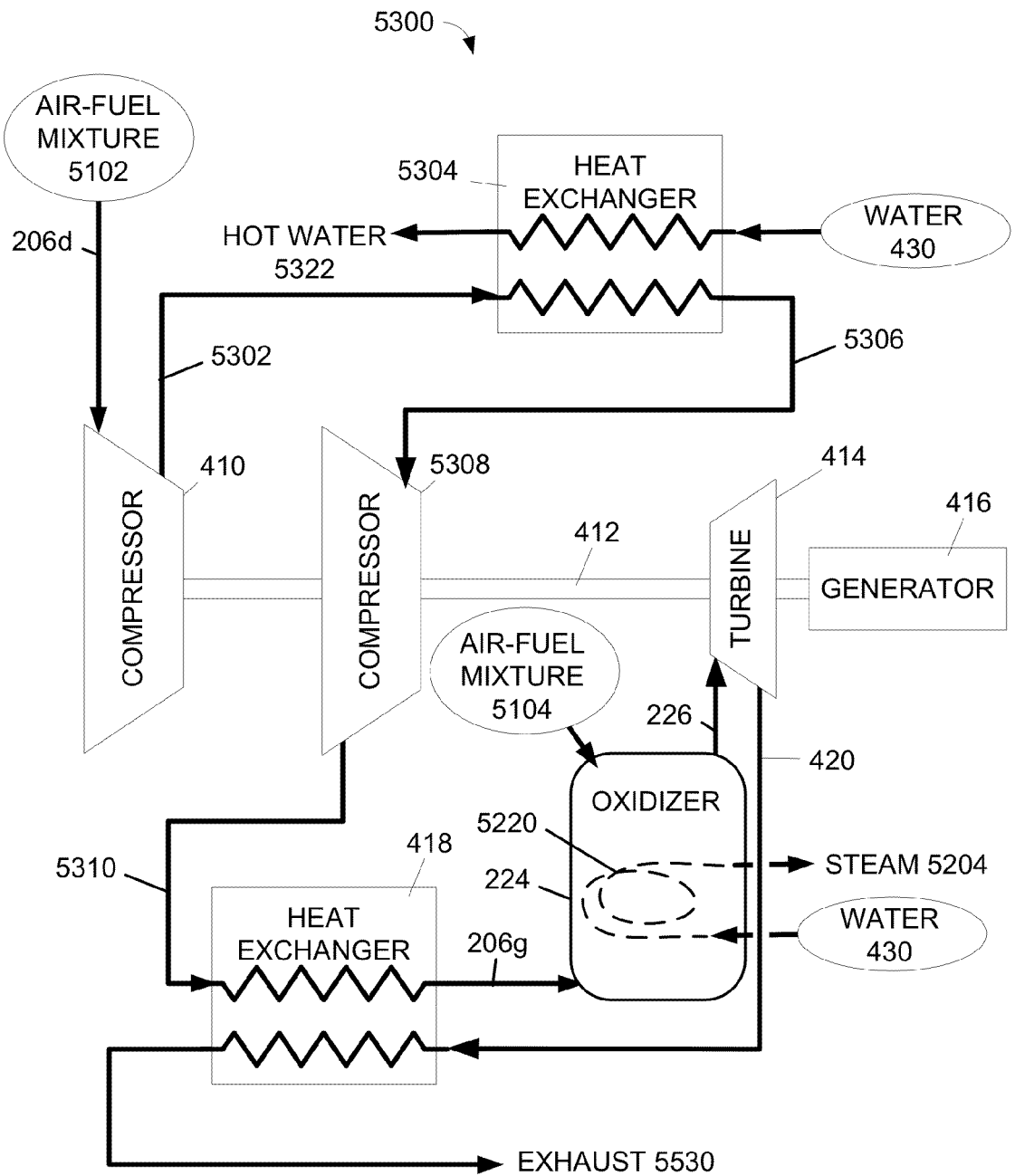
Figures 4, 5:
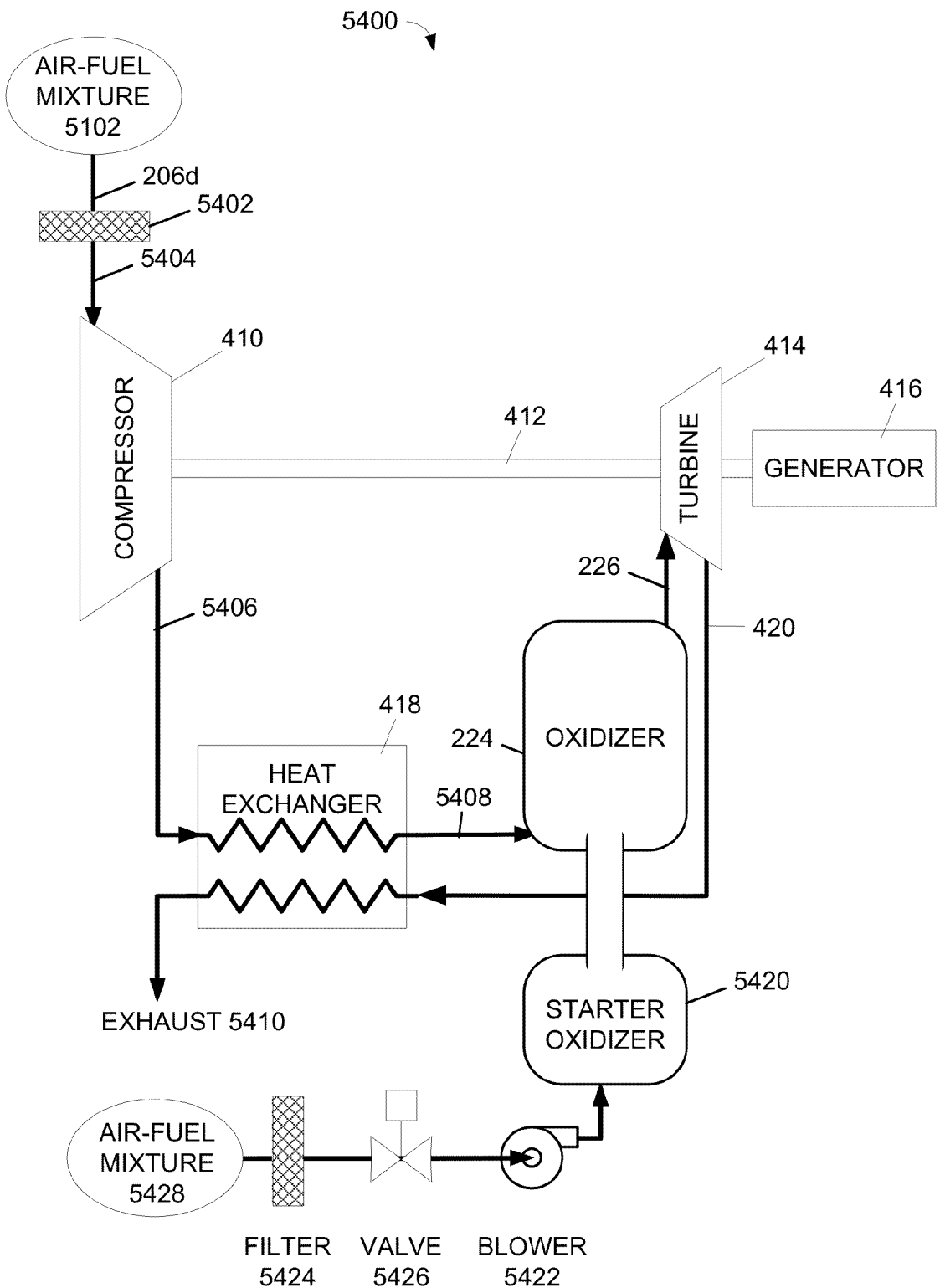
Figure 5:
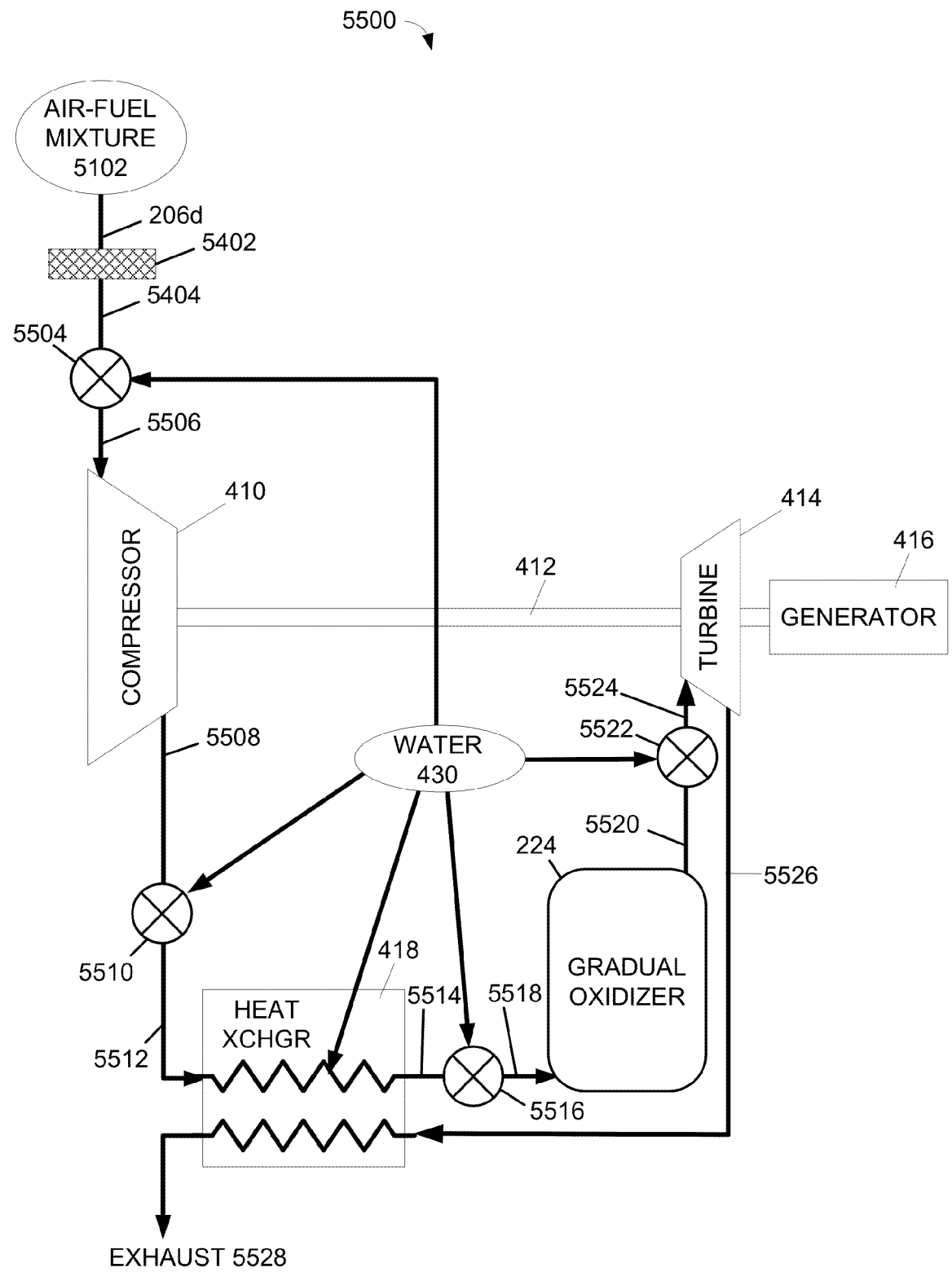
Figures 5, 6:
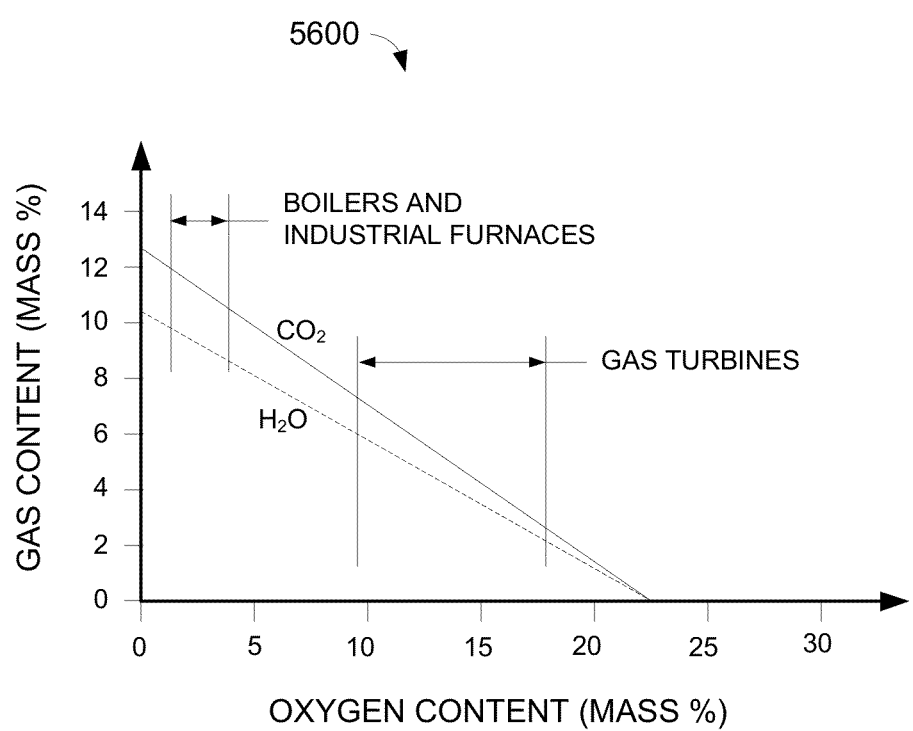

FIG. 3-5 is a schematic representation of another embodiment of a Schnepel cycle power generation system 3200 according to certain aspects of the present disclosure. Many elements of system 3200 are common to previously presented systems and their description is not repeated with respect to FIG. 3-5. In this embodiment, the output from the oxidizer 224 is routed to the piston expander 3020 and then through the heat exchanger 3055 to the turbine 3110, after which the gas is exhausted.

FIG. 3-6 is a schematic representation of another embodiment of a Schnepel cycle power generation system 3250 according to certain aspects of the present disclosure. Many elements of system 3250 are common to previously presented systems and their description is not repeated with respect to FIG. 3-6. In this embodiment, the air-fuel mixture 3005 is compressed in the turbine-driven compressor 3105 ands then further compressed in the piston compressor 3010. The exhaust from the oxidizer 224 passes through the heat exchanger 3055 then through the piston expander 3020 before passing through the turbine 3110 and being exhausted.

FIG. 3-7 is a schematic representation of another embodiment of a Schnepel cycle power generation system 3300 according to certain aspects of the present disclosure. Many elements of system 3300 are common to previously presented systems and their description is not repeated with respect to FIG. 3-7. This embodiment is similar to system 3250 except that the output from the oxidizer 224 is provided to the piston expander 3020 and then passes to the heat exchanger 3055.

FIG. 3-8 is a schematic representation of another embodiment of a Schnepel cycle power generation system 3350 according to certain aspects of the present disclosure. Many elements of system 3350 are common to previously presented systems and their description is not repeated with respect to FIG. 3-8. This embodiment is similar to system 3250 except that the output from the oxidizer 224 is provided to the heat exchanger 3055 and then passes through the turbine 3110 before reaching the piston expander 3020, after which the gas is exhausted.

FIG. 3-9 is a schematic representation of another embodiment of a Schnepel cycle power generation system 3400 according to certain aspects of the present disclosure. Many elements of system 3400 are common to previously presented systems and their description is not repeated with respect to FIG. 3-9. This embodiment is similar to system 3200 except that the output from the oxidizer 224 is provided to the heat exchanger 3055 and then passes through the turbine 3110 before reaching the piston expander 3020, after which the gas is exhausted.

FIG. 3-10 is a schematic representation of another embodiment of a Schnepel cycle power generation system 3450 according to certain aspects of the present disclosure. Many elements of system 3450 are common to previously presented systems and their description is not repeated with respect to FIG. 3-10. This embodiment is similar to system 3200 except that the output from the oxidizer 224 is provided to the heat exchanger 3055 and then passes through the piston expander 3020 before reaching the turbine 3110, after which the gas is exhausted.

Process Equipment Using Gradual Oxidation

FIG. 4-1 is a schematic of a three-stage gradual oxidizer fluid heater system 4000 according to certain aspects of the present disclosure. A pre-mixed air-fuel mixture 4005 is provided to a series of three oxidizers 4010a, 4010b, and 4010c. In certain aspects, the three oxidizers 4010a, 4010b, and 4010c are different in size and configuration. In certain aspects, the three oxidizers 4010a, 4010b, and 4010c are substantially identical. The air-fuel mixture 4005 enters the first oxidizer 4010a where the fuel is consumed by a portion of the oxygen in the air and hot combustion products 4035a are produced. Products 4035a contain oxygen, as the proportion of fuel to oxidizer was lean, i.e. excess air. The hot combustion products 4035a are directed through a first fluid heat exchanger 4020a wherein heat is transferred from the hot combustion products 4035a to the heat transfer fluid, in this example water 430, which exits as a hotter fluid, in this example steam 4040. In certain aspects, a heat transfer fluid, such as an oil or a gas, is provided in place of the water 430 and the output is hot heat transfer fluid.

In certain aspects, the first oxidizer 4010a is referred to as a first reaction chamber that is configured to maintain gradual oxidation of the first fuel, i.e. the fuel component of the air-fuel mixture 4005, within the first reaction chamber without a catalyst while maintaining a first internal temperature within the first reaction chamber beneath a flameout temperature of the first fuel.

The product gases 4035a then pass into a second oxidizer 4010b and mixed with LEC fuel 4007. In certain aspects, the LEC fuel 4007 is mixed with one of an oxidant, a diluent or flue gas, and a HEC fuel (none of which are shown in FIG. 4-1) before being provided to oxidizer 4010b. The fuel of the resultant mixture is consumed by a portion of the oxygen in the mixture and hot combustion products 4035b are produced. The hot combustion products 4035b are directed into a second fluid heater 4020b wherein heat is transferred from the hot combustion products 4035b to a separate flow of water 430 that exits as steam 4040 that is mixed with the steam 4040 from the first heat exchanger 4020a.

In certain aspects, the second oxidizer 4010b is referred to as a second reaction chamber that is configured to maintain gradual oxidation of the second fuel, i.e. the remaining fuel in the hot combustion products 4035a and the newly introduced LEC fuel 4007, in a gradual oxidation process without a catalyst. In certain aspects, the second oxidizer 4010b comprises an oxygen sensor (not shown in FIG. 4-1) that is coupled to a processor that is part of a controller (not shown in FIG. 4-1), wherein the processor is configured to determine an oxygen content level.

The product gases 4035b, or flue gas, then pass into a third oxidizer 4010c and mixed with additional LEC fuel 4007. In certain aspects, the LEC fuel 4007 to be provided to oxidizer 4010c is mixed with one of an oxidant, a diluent or flue gas, and a HEC fuel (not shown in FIG. 4-1) before being provided to oxidizer 4010c. In certain aspects, the air-fuel mixture provided to oxidizer 4010c is different from the air-fuel mixture provided to oxidizer 4010b. The fuel in the resultant mixture in oxidizer 4010c is consumed by a portion of the oxygen in the mixture and hot combustion products 4035c are produced. These hot combustion products 4035c are directed into a third fluid heat exchanger 4020c wherein heat is transferred from the hot combustion products 4035c to a separate flow of water 430 that exits as steam 4040 that is mixed with the steam 4040 from the first and second heat exchangers 4020a and 4020b.

The multiple stages of gradual oxidation, heat transfer to a fluid to reduce the gas temperature, and introduction of new fuel (FIG. 4-1) can be used to limit the gas temperatures to below the thermal NOx temperature threshold, while reducing the amount of oxygen exhausting from the hot combustion products 4035c. High efficiency, as measured by the amount of energy transferred from the fuel 4005 and 4007 to the steam 4040, provides that oxygen content leaving system 4000 via hot combustion products 4035c be as low as possible, typically 3-5% by volume. It also provides that the exiting hot combustion products 4035c be as cool as possible. If one were to attempt to oxidize the fuel in one step, then the fuel-to-air ratio would be close to the stoichiometric value, which would yield high temperatures. For example, the adiabatic reaction temperature of methane at a stoichiometric apportionment is 3484° F., well above the threshold of 2300° F. for the formation of thermal NOx. The staged process of FIG. 4-1 cools the various gas flows 4035a, 4035b, 4035c from the three oxidizers 4010a, 4010b, and 4010c so that more fuel can be introduced and oxidized, and the majority of oxygen can be removed from the system in the form of $H_2O$ and $CO_2$, without creating high temperatures and thermal NOx.

Other configurations of fluid flow from the input source, in this example water 430, to the output, in this example steam 4040, will be apparent to those of skill in the art. The system 4000 may have fewer or greater numbers of oxidizers and heat exchangers. One or more heat exchanges 4020a, 4020b, etc. can be linked in series to increase the temperature of the output fluid. The air-fuel mixture provided to each oxidizer 4010a, 4010b, etc. can be different and adjustable in response to measurements of oxygen in the combustion products flow 4035a, 4035b, etc.

A gradual oxidizer fluid heater arrangement 4000 facilitates the efficient oxidation of fuel and air in three stages and the capture of thermal energy by a fluid. The first stage comprises a first gradual oxidizer which enables the gradual oxidation of a fuel and produces a hot, low-emission product gas stream that is directed into a first fluid heater where a first fluid stream is beneficially heated. In order to reduce or eliminate the likelihood of flashback and explosion of the fuel-air mixture 4005 entering the first-stage oxidizer 4010a, the concentration of fuel in the air-fuel mixture 4005 is limited to about 20-90% of the lower flammability limit concentration of the fuel. In certain aspects, it is desirable to limit the fuel content to 25-50%. In certain aspects, there may be applicable fire safety standards that limit the allowable fuel concentration of the air-fuel mixture 4005.

After oxidation of the fuel in the first oxidizer 4010a, the product gases 4035a contain about 11-19% oxygen, plus carbon dioxide and water vapor, at a temperature of approximately 1500-2300° F. In certain aspects, the oxidation process is controlled such that temperature of the product gases 4035a is 1600-2000° F. After transferring a portion of its heat to the heat transfer fluid in the heat exchanger 4020a, the product gas 4035a is at a temperature of 700-1300° F., and more preferably 900-1200° F. At such a reduced temperature, a fuel stream 4007 can be blended into the product gas 4035a without undergoing immediate reaction, which may occur at temperatures at or above 1400° F. The temperature of the mixed product gas 4035a and fuel 4007 is nonetheless high enough to initiate oxidation reactions after an ignition delay of 0.01 to 5 seconds. In certain aspects, the ignition delay is 0.1-0.5 seconds.

After the ignition delay has transpired, the mixture will have entered the second oxidizer 4010b that is the preferred location for efficient oxidation of the fuel to occur. The second oxidizer 4010b generates a hot product gas stream 4035b with 2-16% oxygen at a temperature preferably between 1600-2000° F. that is directed into a second fluid heater 4020b, where a portion of its thermal energy is transferred to the heat transfer fluid. The temperature of product gas 4035b is then reduced to 900-1200° F. and a second stream of LEC fuel 4007 is blended in product gas 4035b without a premature reaction. The mixture of fuel 4007 and product gas 4035b enters a third oxidizer 4010c, wherein the oxidation process repeats, producing an exhaust gas 4035c with 1.5-14% oxygen. In certain aspects, between two and eight stages of gradual oxidation followed by fluid heating can be combined, with the ultimate goal of producing a final product gas stream with 1.5-5% oxygen and a temperature of approximately 150-700° F. In certain aspects, the temperature of the final product gas stream is approximately 250-400° F. The heated fluid streams can be combined together, as shown in FIG. 4-1, or left apart.

FIG. 4-2 is a schematic of another embodiment of a three-stage gradual oxidizer fluid heater system 4100 according to certain aspects of the present disclosure. An air-fuel mixture 4005 enters a first oxidizer 4110a where the fuel is consumed by a portion of the oxygen in the air-fuel mixture 4005 producing heat which passes through a first steam coil 4120a and boils a stream of liquid water 4130a to make saturated steam 4105. The cooled product gases 4035a exit the first oxidizer 4110a and are mixed with additional LEC or HEC fuel and diluents 4007 whereupon the mixture enters a second gradual oxidizer 4110b. Similar to the reaction in the first oxidizer 4110a, the fuel in the fuel-product gas mixture is consumed by a portion of the oxygen in the mixture producing heat which passes through a second steam coil 4120b and boils a second stream of liquid water 4030 to make saturated steam 4105. The cooled gases 4035b exit the second oxidizer 4110b and are mixed with additional fuel 4007 whereupon the mixture enters a third oxidizer 4110c wherein the process repeats, heating the liquid water 4130 in the third steam coil 4120c to make saturated steam 4105.

It will be apparent to one of skill in the art that the fluid heater system 4100 may be used with a variety of heat transfer fluids. For example, an oil may be used to absorb heat from within one or more of the oxidizers 4110A, 4110b, etc. Separate flows of different types of heat exchange fluids may be individually provided to one or more of the oxidizers 4110a, 4110b, etc. and provided for separate use by external systems (not shown in FIG. 4-2). In certain aspects, one or more of the heat exchange coils 4120A, 4120B, etc. may be linked in series.

The partially-cooled product gases 4035c are directed into an economizer 4140 wherein the available heat in the product gas 4035c raises the temperature of a subcooled liquid water stream 4150 to a temperature slightly less than the water's saturation temperature. The cooled product gases 4035d are exhausted to the atmosphere.

While similar to the more generic fluid heater of FIG. 4-1, one distinguishing feature of system 4100 is the installation of a fluid heating element, i.e. a steam coil, into the same unit as the gradual oxidizer. The preferred temperature ranges and oxygen levels at the exit of each stage are the same as in the prior embodiment. A final heat recovery unit, i.e. economizer 4140, is added to the tail end of the product gas stream to extract as much heat as possible from the gases before they exhausted to atmosphere. The steam coils 4120a, 4120b, 4120c may be embedded in the porous ceramic bed of the oxidizers 4110a, 4110b, 4110c or suspended above the top of the bed. In certain aspects, additional bed height or a porous, partial radiation shield may be added between the gradual oxidation zone and the steam generation zone to help ensure the gases aren't quenched by the relatively cold surfaces of the steam coils 4120a, 4120b, 4120c before the gradual oxidation reactions are complete.

FIG. 4-3 is a schematic representation of a single-stage recuperative steam generation system 4200 according to certain aspects of the present disclosure. Air 4210 is directed into the cold side of a recuperator 3045 where it receives heat and exits as a preheated air stream that is combined with a reduced-oxygen, recirculated product gas stream 4225 to which is added an LEC fuel 4220. In certain aspects, the LEC fuel 4220 comprises a HEC fuel. In certain aspects, LEC or HEC fuel can be mixed with the air 4210 prior to entering the recuperator 3045.

The air-fuel-diluent mixture enters an oxidizer 224 where the fuel is consumed by a portion of the oxygen and produced heat.

A liquid water stream 4230 is heated in the economizer 3055 to create a hot water stream that is directed to the steam coil 4240. A portion of the heat from the oxidation process is transferred through the steam coil 4240 into the hot water, thereby creating steam 4242 for beneficial use. The partially-cooled product gases exit the oxidizer 224 and are divided into two streams. A portion of the product gases is directed through a recirculation blower 4245 where the product gases exit at a slightly higher pressure and are combined with the air-fuel stream as described above. The remaining portion of the product gases passes through the economizer 3055 where more heat is removed, thereby heating the incoming water 4230, and the cooled product gases then pass through the hot side of the recuperator 3045 where additional heat is removed, thereby heating the incoming air 4210, before the fully-cooled product gases exit to atmosphere.

System 4200 inhibits flashback and explosion of the pre-mixed air-fuel mixture by maintaining the oxygen concentration of the mixture entering the oxidizer 224 at less than 12%, and preferably less than 9%, through the recirculation of the product gases 4225. The recirculation provides for oxidizer inlet temperatures in the range of 700-1300° F., and preferably 900-1200° F. Through recirculation, this embodiment also generates a total hot gas flow rate through the oxidizer equal to 1.5-4.0 times, preferably 2.0-3.0 times, the exhaust flow. The greater hot gas flow rate permits the installation of more heat transfer surface area within the oxidizer 224 and the production of greater amounts of steam. The specific heat ($c_p$) of the gas stream performing the heat transfer to the steam coils is also greater than the specific heat of oxidation products that have less $CO_2$, less $H_2O$, and more $O_2$. Greater specific heat leads to greater potential for heat transfer, with a fixed temperature difference between the cold and hot streams.

System 4200 incorporates an economizer 3055 that recovers heat from the product gas stream by raising the temperature of the water 4230 to just below its boiling point. System 4200 also incorporates a recuperator 3045 that recovers additional heat by preheating the combustion air before it enters the oxidizer 224. This recuperator 3045 reduces or eliminates the amount of auxiliary heating that is added to initiate the gradual oxidation process within the oxidizer 224 and also reduces the loss of heat in the exhaust.

FIG. 4-4 is a schematic representation of a two-stage water-tube type of steam generation system 4300 according to certain aspects of the present disclosure. An air-fuel mixture 4005 is provided at a bottom inlet of an oxidizer 4321. The air-fuel mixture 4005 flows through the sparger tree 4322 and enters the porous media 512 where gradual oxidation occurs and all the fuel is consumed by a portion of the oxygen. A portion 4315 of the hot product flue gas exits the bed 512 and passes through steam coils 4325 where heat is removed from the gas, while a smaller portion 4314 of the hot gas passes through a core zone where no steam coils are located and no heat is removed. The first steam coils 4325 are arranged around the circumference of the enclosure, so that product gases 4314 flowing upward in the vicinity of the center axis of the enclosure will remain at a high temperature and serve as an ignition source for the $2^{nd}$ stage gradual oxidation occurring just in the upper section.

Additional LEC fuel or HEC fuel with diluents 4220 is injected into the middle zone of the oxidizer 4321 and mixes with the product gases 4315 to form an oxidant-diluent-fuel mixture 4316 that enters an inverted sparger cone 4324 through a plurality of horizontal spokes that penetrate through the walls of the cone 4324. These spokes have a plurality of injection holes to distribute mixture 4316 in a nearly uniform manner. The hot gas portion 4314 enters the inverted sparger cone 4324 through an opening at the bottom and serves to initiate gradual oxidation of the mixture streams 4316 thereby consuming the additional fuel and generating a reduced-oxygen, hot product stream 4317.

The product stream 4317 is directed through steam coils 4326 where heat is removed from the product stream 4317 that then exits the oxidizer 4321 as cooled product gases 4318. Water 4353 at near-saturated conditions is admitted into each of the steam coils 4325 and 4326 and exits as saturated steam streams 4354. A two-stage, water-tube-style, gradual oxidizer steam generator 4300 is arranged in a single enclosure, and equipped with a means for reducing gas pressure drop in the second stage. A vertical enclosure incorporates a first gradual oxidizer for oxidizing fuel and creating a hot product gas stream, followed by a first set of steam coils (water tubes) to remove heat from the product stream.

The quantity of water or steam directed to the final coils 4326 may be greater than the prior stages to remove as much heat as possible from the gas flow 4317 before it exits to the atmosphere as exhaust 4318. While it is desirable to maintain product gas temperature above 900° F. as it exits primary or intermediate stages (4316), dropping below 900° F. is not a concern in the very last stage of a multistage system because there is no subsequent gradual oxidizer that requires temperatures above 900° F. The steam generation surface area and or any economizer surface area can be as large as desired to achieve the objective of heat removal in the final stage.

FIG. 4-5 is a schematic representation of a two-stage fire-tube type of steam generation system 4400 according to certain aspects of the present disclosure. An air-fuel mixture 4005 enters the bottom zone of a sparger tree 4422. The air-fuel mixture 4005 flows through the sparger tree 4422 and enters the bed of porous ceramic 512 where gradual oxidation occurs and all the fuel is consumed by a portion of the oxygen. The hot product gas 4419 exits the porous media 512 and enters fire tubes 4425 where heat is removed from the gas by the surrounding water 4451.

Additional LEC or HEC fuel 4220 and optionally diluents (not shown) are mixed with the cooled product stream 4419 to form an oxidant-diluent-fuel mixture, which is admitted into the second sparger 4426 and the second bed of porous media 512 wherein the additional fuel is consumed and a reduced-oxygen, hot product stream 4415 is generated and directed through fire tubes 4429 where heat is removed by the surrounding water 4451. The cooled product gases 4415 collect in a plenum 4430 and exit the oxidizer as a cooled exhaust stream 4417. The two gradual oxidation zones have insulated walls 4424, 4428 to prevent excessive cooling of the reactant gases which leads to undesired quenching of the gradual oxidation reactions. Water 4451 at subcooled or near-saturated conditions is admitted into the gradual oxidizer enclosure 4401 and exits as saturated steam 4452. In certain aspects, additional heating surfaces are added for superheating the steam 4452 to a temperature substantially higher than its boiling point. In certain aspects, the water 4451 is pressurized leading to higher saturated steam temperatures.

By reducing the oxygen in the final exhaust gas stream to 1.5-5.0% while reducing the exit gas temperature to 250-400° F., the overall cycle efficiency is estimated to be 85-90%, which represents an improvement over conventional steam generators that operate at 80-86% cycle efficiency. Increased cycle efficiency corresponds to reduced fuel usage for the same useful heat output.

By maintaining gradual oxidation temperatures below about 2300° F., and preferably below 2000° F., the formation of thermal NOx is reduced. Conventional burners have flames with maximum reaction temperatures exceeding 2300° F. and generate substantially more NOx than a gradual oxidation process.

In certain aspects, electric heating elements (not shown in FIG. 4-5) are located at the inlet of one or both of the oxidizer stages to help initiate oxidation of the air-fuel mixture 4005 or oxidant-diluent-fuel mixture at that location.

In certain aspects, porous ceramic media 512 is reduced in amount or not present and the reaction temperature is allowed to go higher in the open volume. Furthermore, if the porous media is removed, a greater fraction of the total flow can be distributed to the final sparger 4426.

In certain aspects, the internal pressure is maintained low enough so fuel can be added at each stage using only line pressure, i.e. without a gas pressure booster.

In certain aspects, an economizer or recuperator (not shown in FIG. 4-4 or 4-5) is added to condense the moisture of combustion from the product gases, or alternatively to leave the water in the vapor phase.

In certain aspects, a fluidized bed (not shown in FIG. 4-4 or 4-5) similar to the system shown in FIG. 1-13 replaces the porous media 512 to facilitate heat feedback and ignition in the oxidizer 4321, 4401 as well as enhance heat transfer to the steam coils. Other options include flue-gas recirculation and structured media, similar to the systems shown in FIGS. 1-15 and 1-16A/16B.

FIG. 4-6 schematically depicts the flow through a gradual oxidation system 4600 having a sparger according to certain aspects of the present disclosure. The processes and elements of FIG. 4-6 are described in relation to the system 4500 of FIG. 1-12, wherein steps 1-6 are accomplished, which is shown as receiving the output from point A of system 4500. In certain aspects, air 4602 and fuel 4220 are mixed, for example using a mixer similar to mixer 4510 of system 4500, and provided in place of point A in FIG. 4-6. The gas mixture entering from point A undergo the following process steps:

7. The hot gas leaving the lower section is split into portions 4315 and 4314, wherein portion 4315 is passed through a heat exchanger, such as the coils 4325 of FIG. 4-4, and a portion of the heat extracted from the hot gas, thereby cooling the gas to temperatures proximate to the autoignition temperature. This stage uses the heat extracted to generate steam or vaporize another liquid.
8. In this example, fuel 4220 is injected into both streams 4314 and 4315. The 4314 portion is hot enough to initiate gradual oxidation in the portions that are mixed in each stage 4630.

Hybrid Cycles and Gradual Oxidation

FIG. 5-1 is a schematic diagram of an exemplary gradual oxidation system 5100 incorporating steam generation and additional fuel injection according to certain aspects of the present disclosure. A compressor 410 is coupled to a shaft that is further coupled to a turbine 414 and a power generator 416, as previously shown in FIG. 1-9. An air-fuel mixture 5102 is provided to a compressor 410 that provides a pressurized air-fuel mixture 206*f* to a heat exchanger 418 that heats this mixture 206*f* with heat from the turbine exhaust 420. The hot, pressurized mixture 206*g* is conveyed into the oxidizer 224. In certain aspects, an additional air-fuel mixture 5104, is injected into the oxidizer. In certain aspects, the air-fuel mixture 5104 comprises only LEC or HEC fuel. The air-fuel mixtures 206g and 5104 are gradually oxidized in the oxidizer 224 and the hot flue gas 226 is exhausted to the turbine 414. In passing through the turbine, energy is extracted from the hot flue gas 226 and the cooled, expanded turbine exhaust 420 is passed back to the heat exchanger 418. After passing through the heat exchanger 418, the flue gas 420 may still comprise free oxygen. Additional air-fuel mixture 5112 is injected into the flue gas 420 within a duct burner 5110 to reheat the flue gas to produce a hot flue gas 5111, which then passes through a heat exchanger 422 wherein heat is transferred from the hot flue gas 5111 to water 430 thereby producing steam 5108 which is provided to an end use (not shown in FIG. 5-1). The cooled flue gas is now exhausted as exhaust stream 5106 to the environment. In certain aspects, the air-fuel mixture 5102 comprises only air and fuel is provided from air-fuel mixture 5104.

FIG. 5-2 is a schematic diagram of an exemplary gradual oxidation system 5200 incorporating steam generation and cogeneration according to certain aspects of the present disclosure. Many elements of system 5200 are common to the system 5100 previously discussed and their description is not repeated with respect to FIG. 5-2. In system 5200, steam-generating coils 5220 are embedded in the oxidizer 224. Extraction of heat from the oxidation process within the oxidizer 224 reduces the maximum reaction temperature, thereby reducing NOx formation, while generating steam 5204. The air-fuel mixture 5104 is then injected into the cooled gas within the oxidizer 224 that is "downstream" of the coils 5220, thereby allowing additional combustion so as to reduce the oxygen level in the exhaust 226 going into the turbine 414. This injection of additional fuel and the further combustion that reduces the oxygen within the exhaust 226 increases the mass flow through the turbine 414, increases the specific heat of exhaust gas 226, and decreases the ratio of specific heats, thereby increasing the power output of the turbine 414. System 5200 eliminates the duct burner 5110 while still producing steam from the coils 5220. As the coils 5220 operate at the peak temperature of the system 5200, the steam 5204 will be at a higher temperature or pressure than the steam 5108 produced in system 5100.

In certain aspects, steam 5230 is injected into the working fluid within oxidizer 224. Injection of steam in the gradual oxidation process within oxidizer 224 could help reduce emissions while burning near-stoichiometric air-fuel ratios. In certain aspects, injection of steam 5230 allows pre-mixed air-fuel mixtures 206g to be closer to a stoichiometric ratio without exceeding the flammable range of the air-fuel mixture 206g due to the inert water vapor present. In certain aspects, the steam is injected in a manner to create a swirling flow pattern within the oxidizer 224, further aiding in the gradual oxidation process. In certain aspects, the steam 5230 is introduced through axial pipes (not shown in FIG. 5-2) having radial holes and positioned around the perimeter of the oxidizer 224. In certain aspects, steam 5204 from the coils 5220 is returned as steam 5230 and, if the steam 5204 is at a pressure equal to or greater than the pressure within oxidizer 224, there is less parasitic energy loss because the steam 5230 is already pressurized.

FIG. 5-3 is a schematic diagram of an exemplary gradual oxidation system 5300 incorporating dual compressors 410, 5308 with intercooling according to certain aspects of the present disclosure. Many elements of system 5300 are common to the systems 5100 and 5200 previously discussed and their description is not repeated with respect to FIG. 5-3. The use of intercooler 5304 allows a higher total compression across compressors 410 and 5308, thereby improving the efficiency of the system 5300. Intercooler 5304 cools stream 5302 which is further compressed by 5308. A lower temperature into compressor 5308 reduces the amount of thermodynamic work, i.e., power, used to compress the gas. The intercooler permits the flow at 5310 to be at a lower temperature than would exist without intercooler 5304. This permits more thermal energy to be recovered in recuperator 418. The amount of recovered energy in recuperator 418 is proportional to the temperature difference between the turbine exhaust 420 and the recuperator inlet temperature 5310.

FIG. 5-4 is a schematic diagram of an exemplary gradual oxidation system incorporating a starter gradual oxidizer according to certain aspects of the present disclosure. Many elements of system 5400 are common to the systems 5100, 5200, and 5300 previously discussed and their description is not repeated with respect to FIG. 5-4. The air-fuel mixture 5102 is provided as a flow of warmed, compressed air-fuel mixture 5408 to an inlet of oxidizer 224. Use of a starter oxidizer 5420 allows the main oxidizer 224 to be brought up to operating temperature, i.e. above the autoignition temperature of the warmed, compressed air-fuel mixture 5408, with a reduced amount of NOx formation compared to using a conventional combustor burning a HEC fuel in an open flame (for example, FIG. 1-10). The starter oxidizer 5420 is provided with a supply of an air-fuel mixture 5428 and, in certain embodiments, pressurized with a blower 5422. The hot combustion product gases, i.e. flue gas, is provided from an outlet of the starter oxidizer 5420 to an inlet on the oxidizer 224. In certain embodiments, the flue gas from the starter oxidizer 5420 enters the oxidizer 224 through the same inlet as the warmed, compressed air-fuel mixture 5408. A valve 5426 is provided to shut off this start-up subsystem when the main oxidizer 224 reaches operational temperature and the compressor/turbine 410/414 subsystem is started. In system 5400, filters 5402 and 5424 are provided to remove particulates and other undesired components from the respective air-fuel mixtures 5102 and 5428.

The advantages of using a starter gradual oxidizer of FIG. 5-4 include reduction of emissions of criteria pollutants, for example NOx, during start-up of the system. It also allows the use of the native LEC gas at the site, rather than retaining a separate HEC supply of fuel for start-up combustion systems.

FIG. 5-5 is a schematic diagram of an exemplary gradual oxidation system 5500 incorporating multiple points 5504, 5510, 5516, and 5522 of water 430 injection according to certain aspects of the present disclosure. Many elements of system 5500 are common to the systems 5100-5400 previously discussed and their description is not repeated with respect to FIG. 5-1 through FIG. 5-4. Processes subsequent to each injection point 5504, 5510, 5516, and 5522 will vaporize some amount of water in the process input to a gas while cooling the process output gas flow due to the latent heat of evaporation of the injected water. Water injection may be strategically performed at individual locations only, or in combination with other water injection locations.

Water injection at location 5504 can be used to cool the inlet flow stream temperature of compressor 410. Lower inlet temperatures increase the density of the fluid entering the gas turbine cycle, increasing the power output. Cooler compressor inlet temperatures also reduce the amount of work (power) used to compress gas 5508, leaving more shaft power 412 available to drive generator 416.

Water injection at locations 5510, 5516, and into heat exchanger 418 increase the power output of the turbine cycle. Compression of liquid water, as typically performed by a pump, can be more efficient than compressing a gaseous mixture in compressor 410. Turbine 414 will generate more work due to the higher amount of mass flow of flue gas. These cycles are sometimes referred to as "humid air cycles" in the art. System 5500 can therefore leverage the beneficial effects of water injection in a cycle, while not producing thermal NOx due to the gradual oxidizer process.

Injection and evaporation of water in recuperator 418 can present more than just the thermodynamic cycle performance advantages listed in the prior paragraph. Recuperator 418 is naturally being heated by the exhaust flow 5526. Evaporation of water can increase the effective heat transfer coefficient of the flow between 5512 and 5514, thereby enabling a smaller physical heat exchanger.

Other embodiments and methods of injecting water can also be used in accordance with the description provided herein. For example, other systems and methods of injecting water into the oxidation system are described in U.S. application Ser. No. 13/048,796, filed Mar. 15, 2011, the entirety of which is incorporated by reference herein to the extent the teachings of that application are not inconsistent with the present description.

FIG. 5-6 is a diagram 5600 of the gas content of the exhaust of various systems. It can be seen that conventional gas turbines generally operate with greater than approximately 9%, by mass, residual free oxygen in the exhaust stream. By using the gradual oxidation techniques in the oxidizer of FIG. 5-2 and FIG. 5-3 while generating simultaneous steam, the oxygen content exiting the oxidizers and gas turbine cycles will be lower, preferably in the 1.5-5% range. FIG. 5-6 shows this to be well below the range for conventional gas turbines. Hence, the simultaneous generation of pollutant-free flue gas and steam in a gradual oxidizer/steam generator, for example system 5200 of FIG. 5-2, is novel in the art. And as discussed previously in this document, lower oxygen and higher levels of $CO_2$ and $H_2O$ are beneficial to the Brayton gas turbine cycle.

Control of the gradual oxidation system can be performed in a number of ways. In certain aspects, a method of ensuring complete oxidation changes the residence time of the fuel and air mixture within the oxidizer vessel. In certain aspects, a gas turbine supplies the gradual oxidizer and the turbine is configured to vary its rotational speed using, for example, variable speed generators and power electronics or inverters, as are known to those of skill in the art. In certain aspects, a fan feeds a fuel and air mixture to an oxidizer, for example as shown in FIG. 2-1, and the fan is powered by a variable speed drive, with the fan speed reduced to increase residence time inside the oxidizer.

In some embodiments, the oxidation systems described herein can be used for oxidizing fuel in a flexible, efficient, and clean manner. The oxidation reactions described herein provides methods for the oxidation of waste materials and the prevention or minimization of air pollution thereby. For example, methods and systems of how the oxidation reactions can be used are provided in U.S. patent application Ser. No. 13/115,910, filed May 25, 2011, and Ser. No. 13/115,902, filed May 25, 2011, both of which are incorporated herein by reference in their entirety to the extent their teachings are not inconsistent with the descriptions provided herein.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Additionally, although various embodiments are described in different sections, paragraphs, and with respect to different figures, unless otherwise expressed, various embodiments may be combined with other described embodiments. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Headings and subheadings, if any, are used for convenience only and do not limit the disclosure.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

As used herein, listings that recite "at least one of A, B, and C" or "at least one of A, B, or C" are intended to mean only A, only B, only C, or any combination of A, B, and C, including all of A, B, and C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for oxidizing fuel, comprising:
receiving a gas comprising an oxidizable fuel into an oxidizer having a reaction chamber with an inlet and an outlet, the reaction chamber configured to maintain a gradual oxidation process of the fuel within the reaction chamber;

determining an adiabatic reaction temperature based on the oxidizable fuel and an oxidant within the reaction chamber; and drawing heat from the reaction chamber when the adiabatic reaction temperature within the reaction chamber exceeds a flameout temperature of the fuel, such that an actual temperature within the reaction chamber does not exceed the flameout temperature.

2. The method of claim 1, further comprising expanding gas from the reaction chamber in a turbine.

3. The method of claim 1, further comprising compressing the fuel with a compressor prior to introduction of the fuel mixture into the reaction chamber.

4. The method of claim 1, wherein drawing heat from the reaction chamber comprises introducing a fluid into the reaction chamber.

5. The method of claim 4, further comprising evacuating the fluid from the reaction chamber.

6. The method of claim 5, wherein the fluid is evacuated from the reaction chamber in the form of steam.

7. The method of claim 1, wherein the reaction chamber maintains gradual oxidation of the oxidizable fuel without a catalyst.

8. The method of claim 1, wherein heat is drawn out of the reaction chamber when the temperature within the reaction chamber exceeds 2300° F.

9. The method of claim 1, wherein the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

10. A method for oxidizing fuel, comprising:

receiving a gas comprising an oxidizable fuel into an oxidizer having a reaction chamber with an inlet and an outlet, the reaction chamber configured to maintain a temperature within the reaction chamber to gradually oxidize the fuel within the reaction chamber;

determining an adiabatic reaction temperature based on the oxidizable fuel and an oxidant within the reaction chamber;

determining a flameout temperature of the fuel;

reducing the temperature within the reaction chamber when the adiabatic reaction temperature within the reaction chamber exceeds the flameout temperature, such that an actual temperature within the reaction chamber remains below a flameout temperature.

11. The method of claim 10, wherein reducing the temperature comprises drawing heat from the reaction chamber.

12. The method of claim 10, further comprising expanding gas from the reaction chamber in a turbine.

13. The method of claim 10, further comprising compressing the fuel with a compressor prior to introduction of the fuel mixture into the reaction chamber.

14. The method of claim 10, wherein reducing the temperature comprises introducing a fluid into the reaction chamber.

15. The method of claim 14, further comprising evacuating the fluid from the reaction chamber.

16. The method of claim 15, wherein the fluid is evacuated from the reaction chamber in the form of steam.

17. The method of claim 10, wherein the reaction chamber maintains gradual oxidation of the oxidizable fuel without a catalyst.

18. The method of claim 10, wherein the temperature is reduced such that the temperature within the reaction chamber does not exceed 2300° F.

19. The method of claim 10, wherein the oxidizable fuel comprises at least one of hydrogen, methane, ethane, ethylene, natural gas, propane, propylene, propadiene, n-butane, iso-butane, butylene-1, butadiene, iso-pentane, n-pentane, acetylene, hexane, and carbon monoxide.

* * * * *